US011694149B2

(12) United States Patent
Bartlett

(10) Patent No.: US 11,694,149 B2
(45) Date of Patent: Jul. 4, 2023

(54) APPARATUS AND METHOD FOR SECURE TRANSPORT USING INTERNET OF THINGS (IOT) DEVICES

(71) Applicant: AFERO, INC., Los Altos, CA (US)

(72) Inventor: Scott Bartlett, Oakland, CA (US)

(73) Assignee: Afero, Inc., Los Altos, CA (US)

(*) Notice: Subject to any disclaimer, the term of this patent is extended or adjusted under 35 U.S.C. 154(b) by 107 days.

(21) Appl. No.: 16/663,180

(22) Filed: Oct. 24, 2019

(65) Prior Publication Data

US 2021/0125143 A1    Apr. 29, 2021

(51) Int. Cl.
*G06Q 10/0832* (2023.01)
*H04W 84/18* (2009.01)
(Continued)

(52) U.S. Cl.
CPC ....... *G06Q 10/0832* (2013.01); *G06Q 10/087* (2013.01); *G06Q 10/0833* (2013.01); *H04W 84/18* (2013.01)

(58) Field of Classification Search
CPC .......... G06Q 10/0832; G06Q 10/0833; G06Q 10/087; G06Q 50/30; H04W 84/18
(Continued)

(56) References Cited

U.S. PATENT DOCUMENTS

| 2004/0233054 A1* | 11/2004 | Neff | G06Q 20/203 340/539.1 |
| 2005/0055287 A1* | 3/2005 | Schmidtberg | G06Q 10/063 705/28 |

(Continued)

FOREIGN PATENT DOCUMENTS

WO    WO-2019168795 A1 *    9/2019    ......... G06K 19/0717

OTHER PUBLICATIONS

"Weaving the Wireless Web: Toward a Low-Power, Dense Wireless Sensor Network for the Industrial IoT." J. M. Williams et al. Oct. 10, 2017. IEEE Microwave Magazine, vol. 18, No. 7, pp. 40-63. (Year: 2017).*

*Primary Examiner* — Jeff Zimmerman
*Assistant Examiner* — Hunter A Molnar
(74) *Attorney, Agent, or Firm* — Nicholson De Vos Webster & Elliott LLP

(57) ABSTRACT

A system and method are described for ensuring that a product has been transported in acceptable environmental conditions. For example, one embodiment of the invention comprises: one or more sensors to measure environmental conditions during transport of the IoT device from an origin location to a destination location; a sensor interface coupled to the one or more sensors to communicate environmental values associated with the environmental conditions; a storage device to store monitor application program code; a processor coupled to the sensor interface and storage device, the processor to process the monitor application program code to perform operations based on the environmental values including storing the environmental values on the storage device; and a wireless communication interface to connect to an Internet of Things (IoT) service at one or more intermediate locations between the origin location and the destination location and/or at the destination location, the wireless communication interface to transmit the environmental values and/or event data associated with the environmental values to the IoT service; wherein the IoT service is to provide the environmental values and/or event data associated with the environmental values to one or more apps running on one or more client devices, the one or more apps associated with one or more accounts on the IoT service.

22 Claims, 52 Drawing Sheets

(51) Int. Cl.
*G06Q 10/087* (2023.01)
*G06Q 10/0833* (2023.01)

(58) Field of Classification Search
USPC .......................................................... 705/332
See application file for complete search history.

(56) References Cited

U.S. PATENT DOCUMENTS

| | | | | |
|---|---|---|---|---|
| 2007/0273507 | A1* | 11/2007 | Burchell | G01K 3/04 |
| | | | | 340/539.27 |
| 2015/0039529 | A1* | 2/2015 | Barakat | G01K 7/42 |
| | | | | 705/332 |
| 2015/0154555 | A1* | 6/2015 | Skaaksrud | G01C 21/362 |
| | | | | 705/333 |
| 2018/0010978 | A1* | 1/2018 | Bailey | G01K 13/02 |
| 2018/0039940 | A1* | 2/2018 | Varga | G06Q 10/0832 |
| 2018/0342032 | A1* | 11/2018 | Daigle | G06Q 50/28 |
| 2018/0357603 | A1* | 12/2018 | Wilkinson | G07C 5/008 |
| 2021/0272226 | A1* | 9/2021 | Shah | G06Q 10/0833 |

* cited by examiner

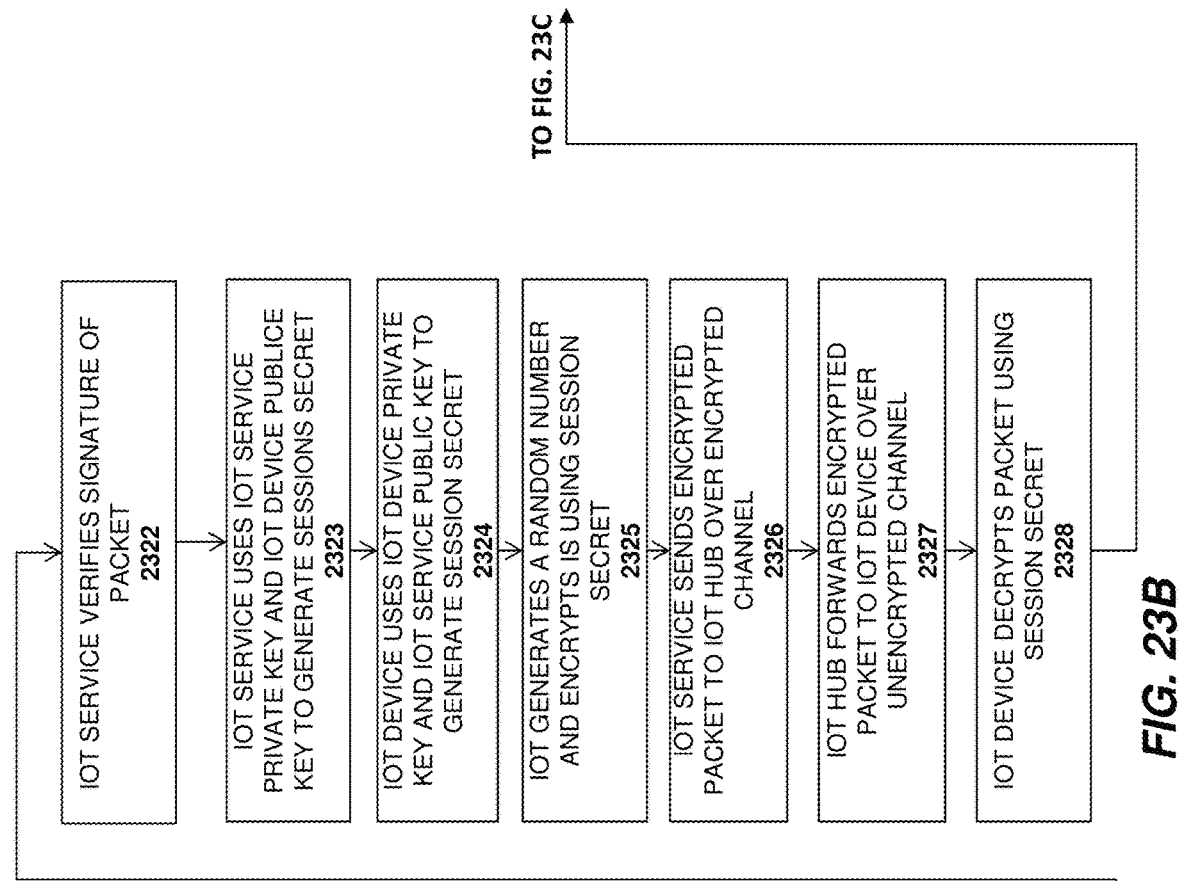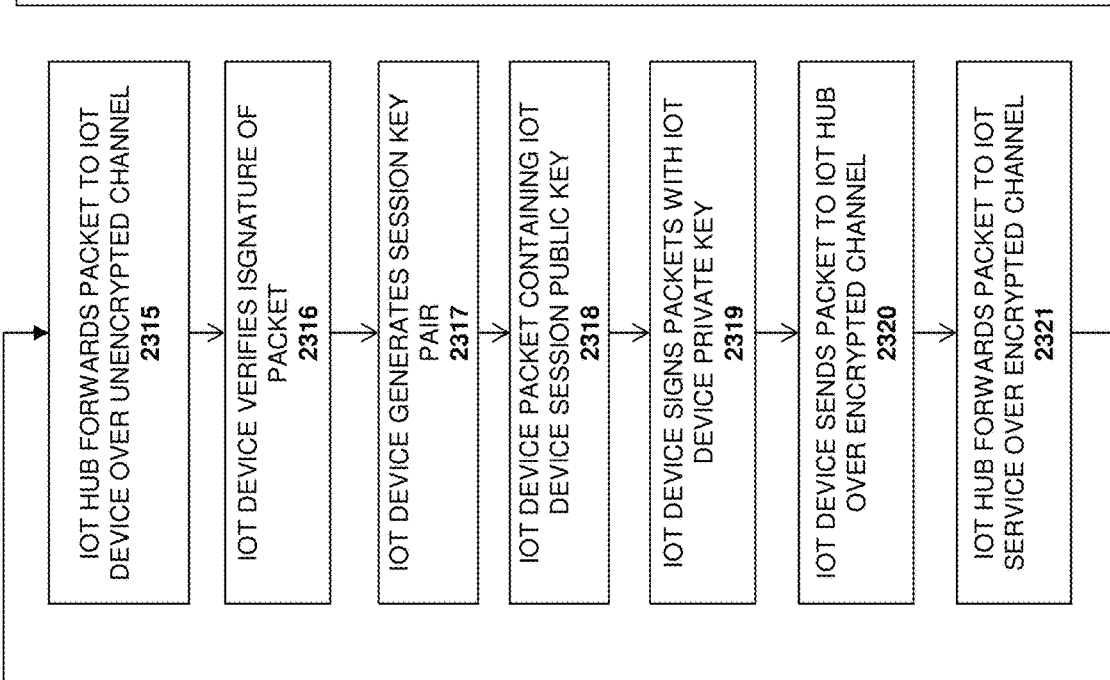
*FIG. 23B*

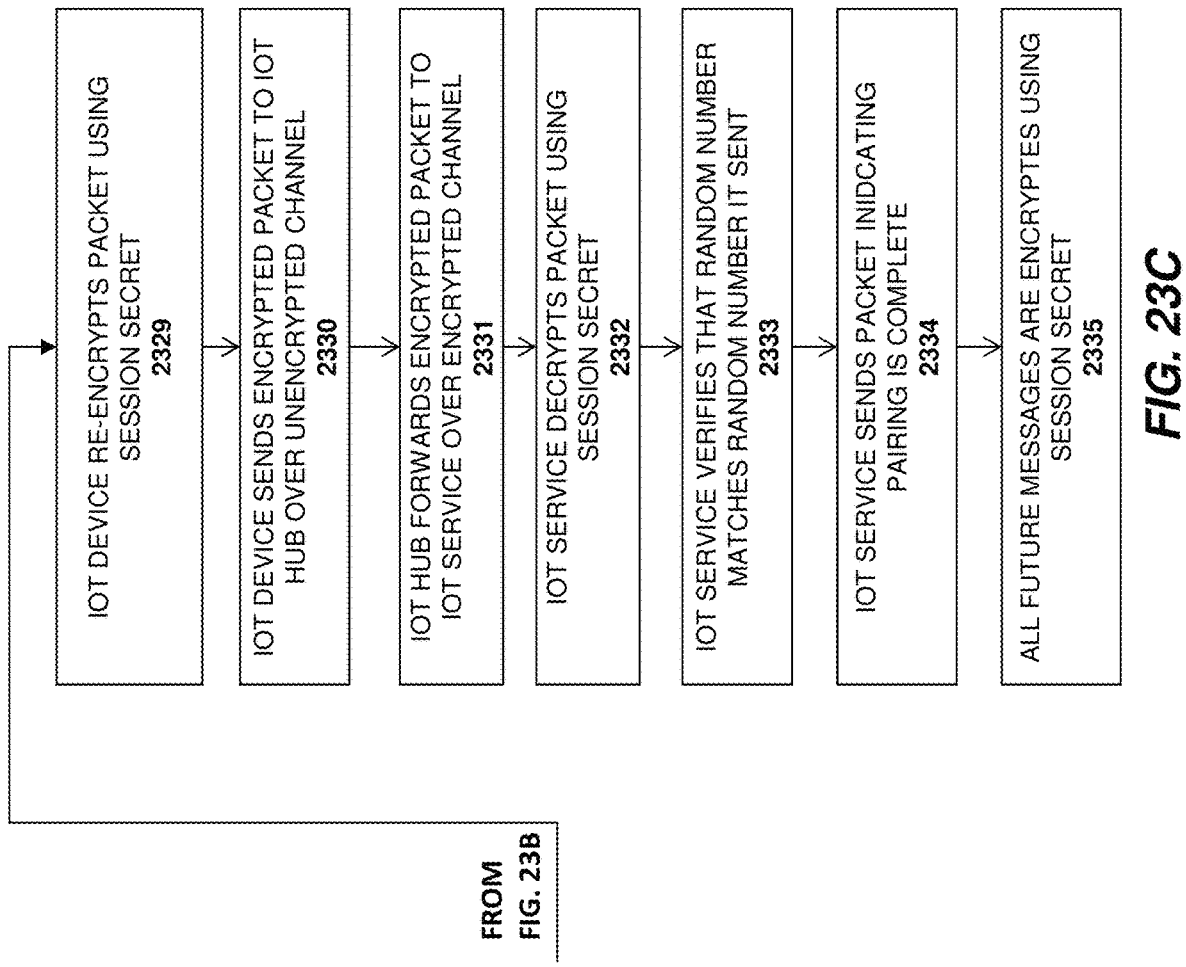

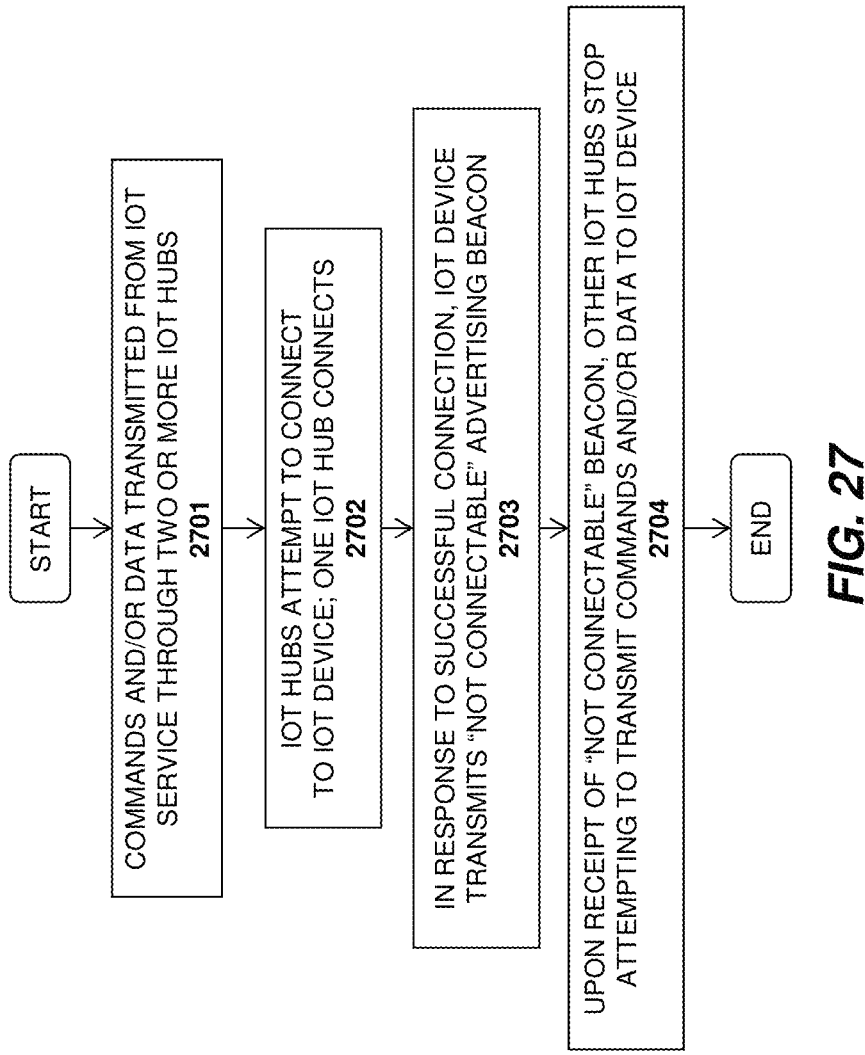

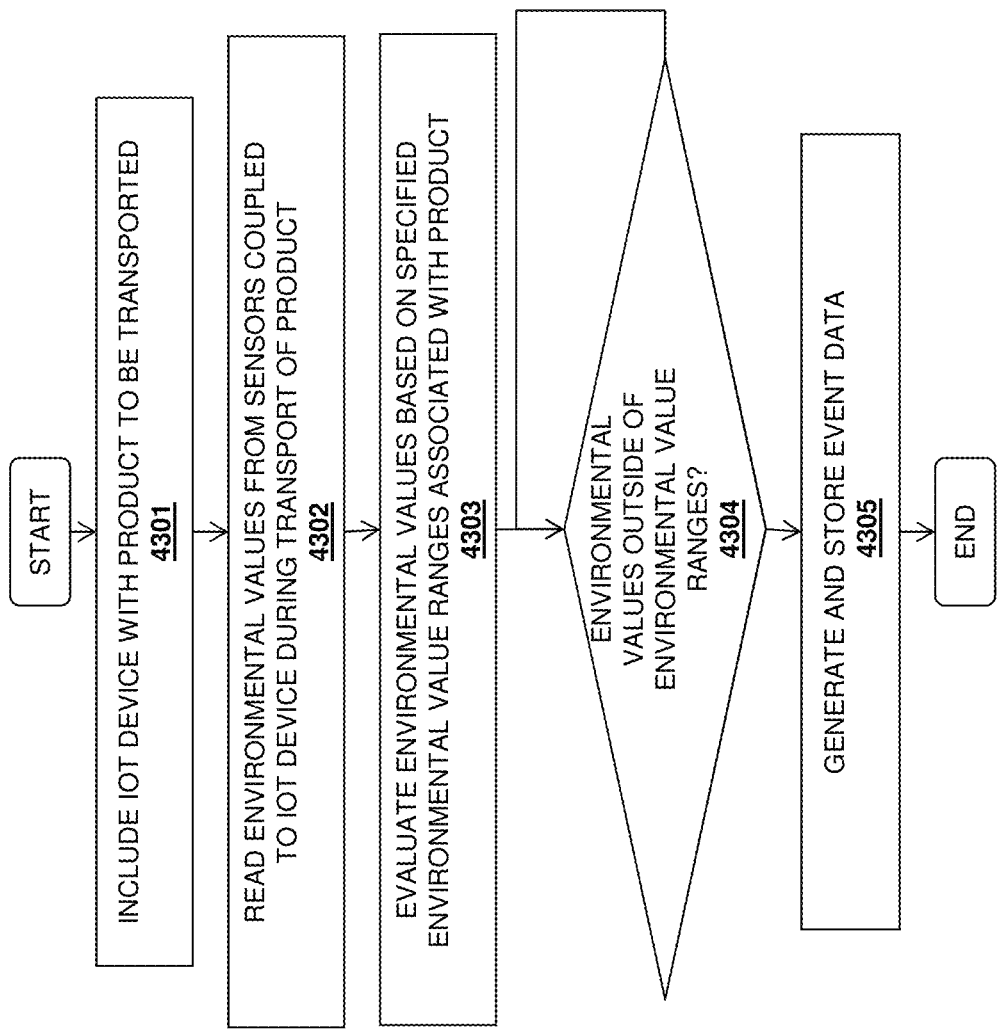

APPARATUS AND METHOD FOR SECURE TRANSPORT USING INTERNET OF THINGS (IOT) DEVICES

BACKGROUND

Field of the Invention

This invention relates generally to the field of computer systems. More particularly, the invention relates to an internet of things (IoT) system and method for cold chain validation.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

BRIEF DESCRIPTION OF THE DRAWINGS

A better understanding of the present invention can be obtained from the following detailed description in conjunction with the following drawings, in which:

FIGS. 23A-C illustrate a method for secure pairing in accordance with one embodiment of the invention;

FIG. 27 illustrates a method in accordance with one embodiment of the invention;

FIG. 43 illustrates one embodiment of a method for ensuring that a product is shipped in appropriate environmental conditions.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
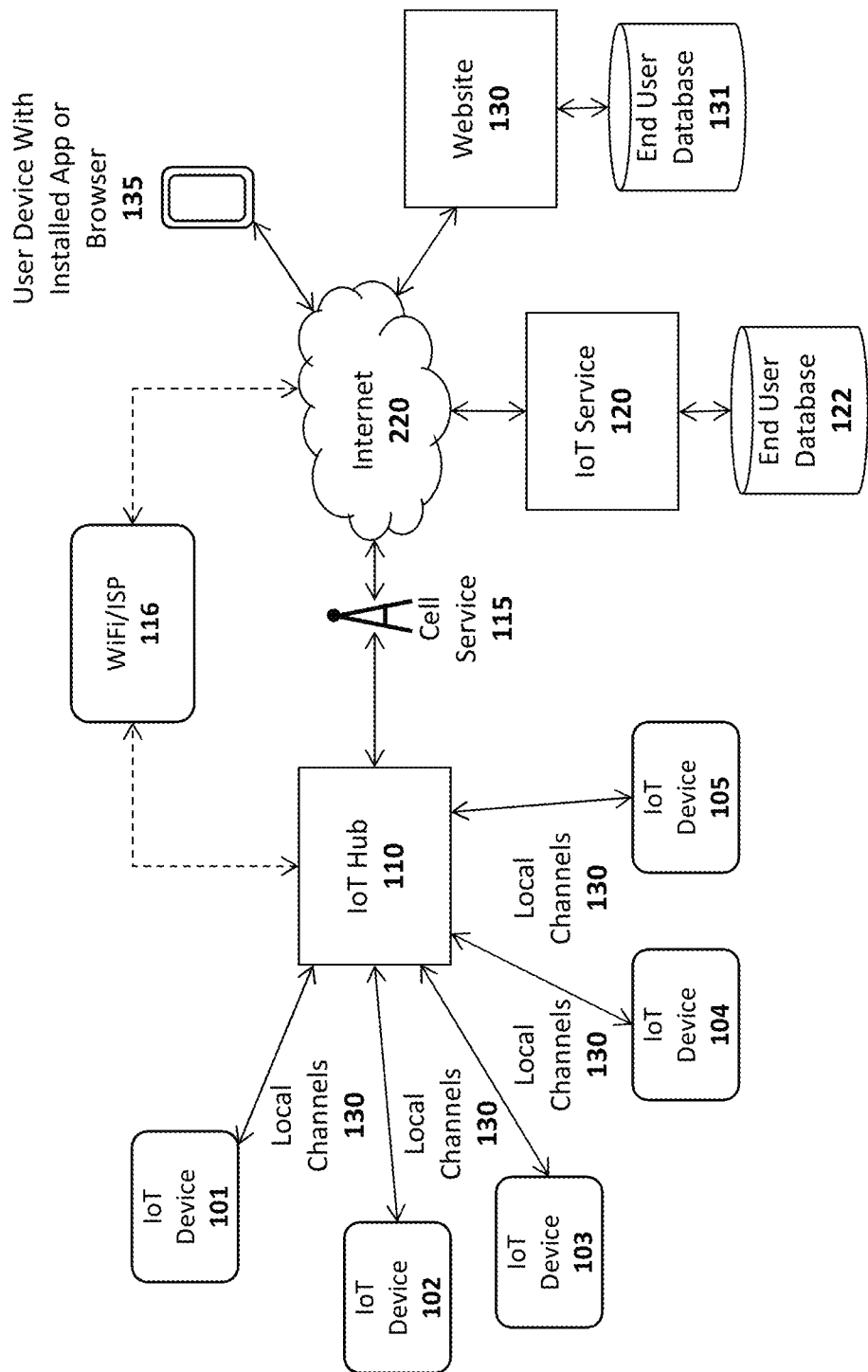
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
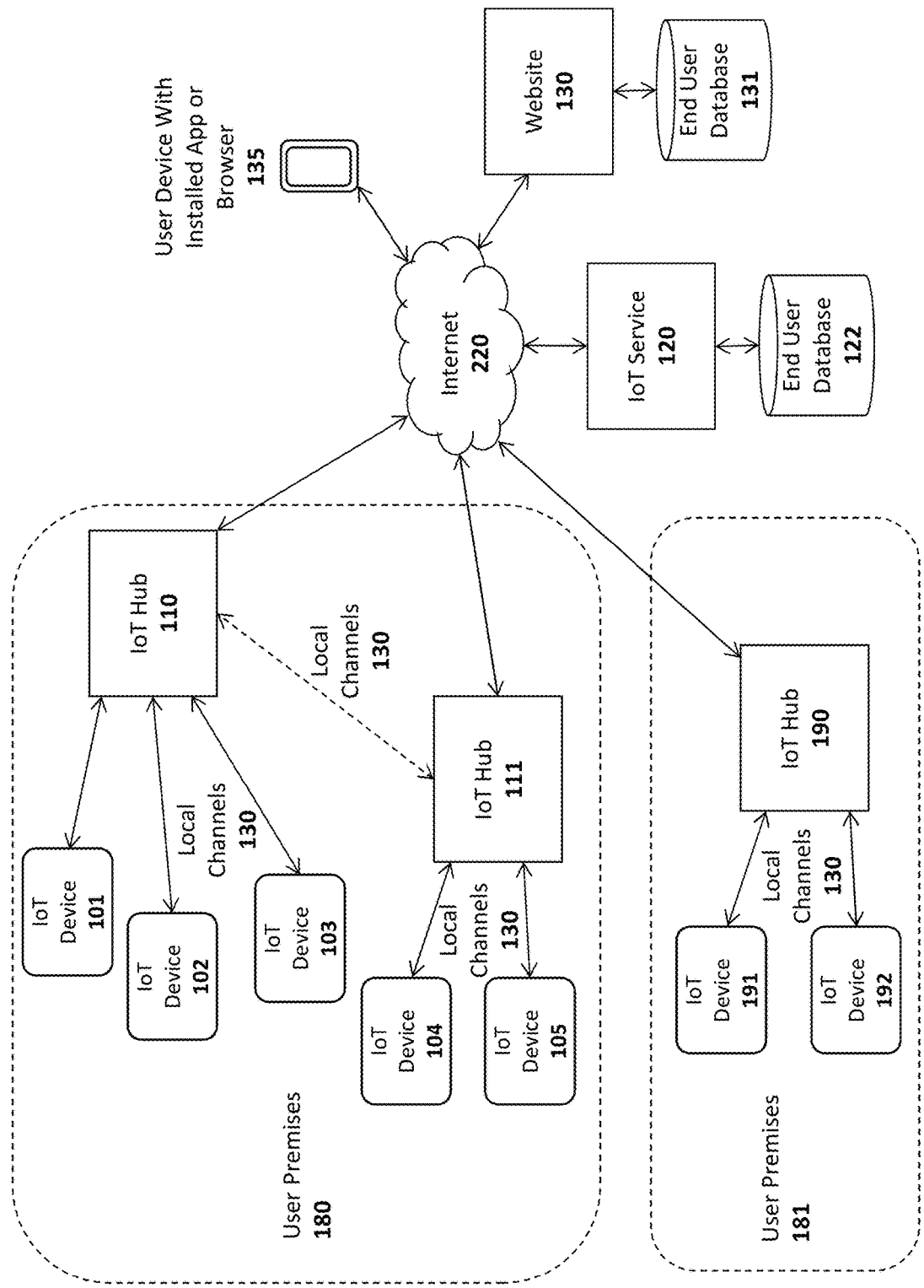

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
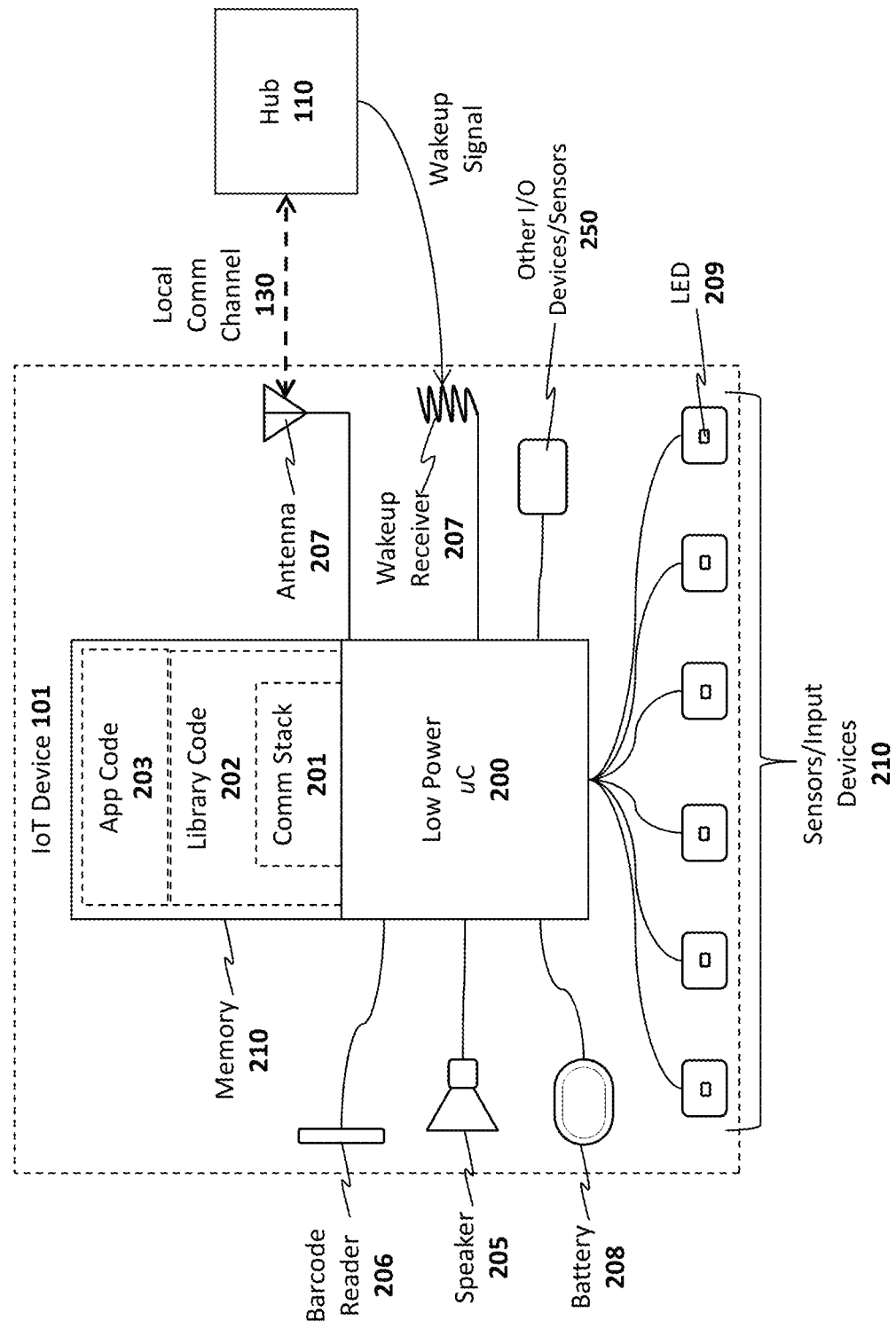
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
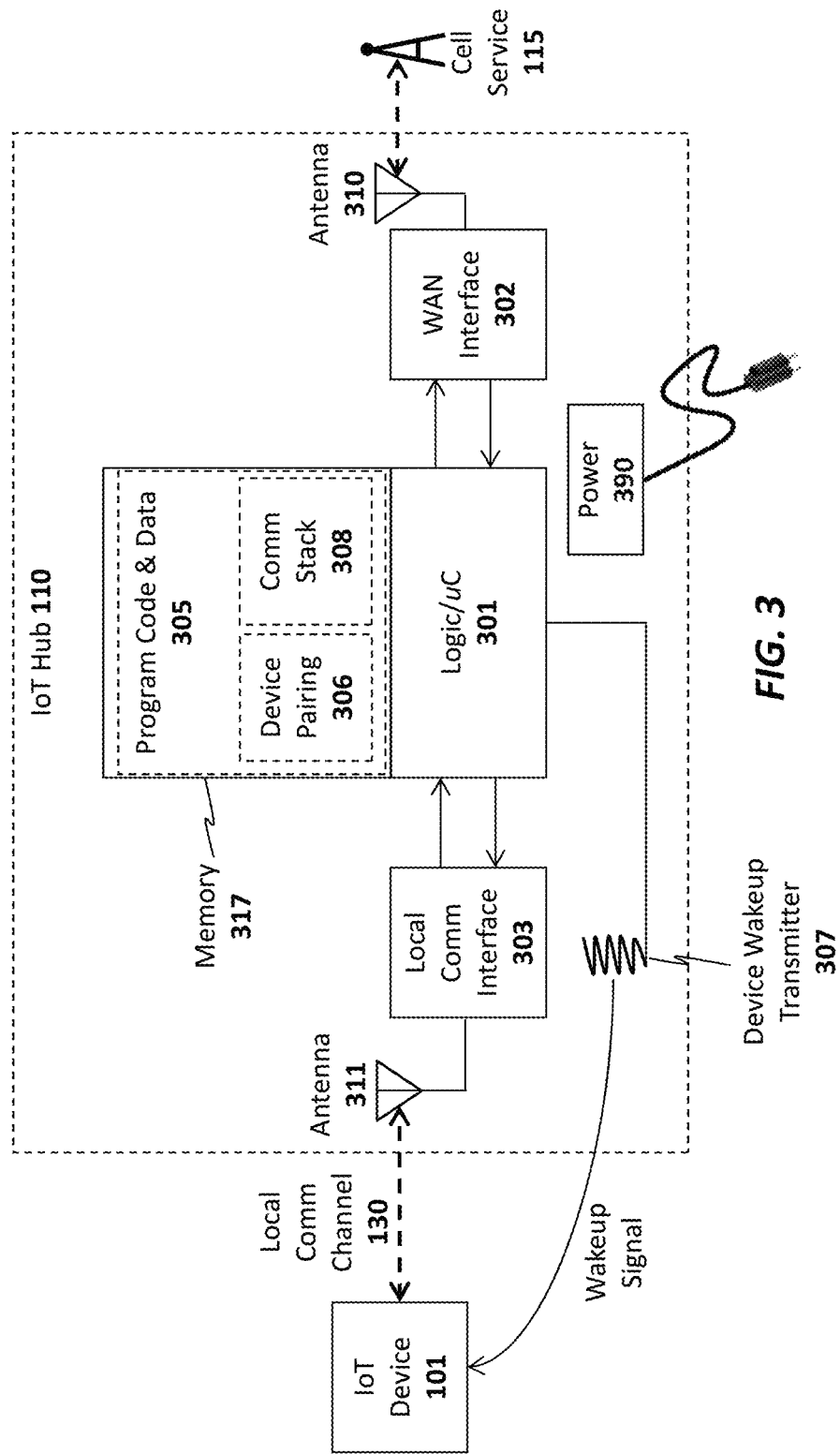
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
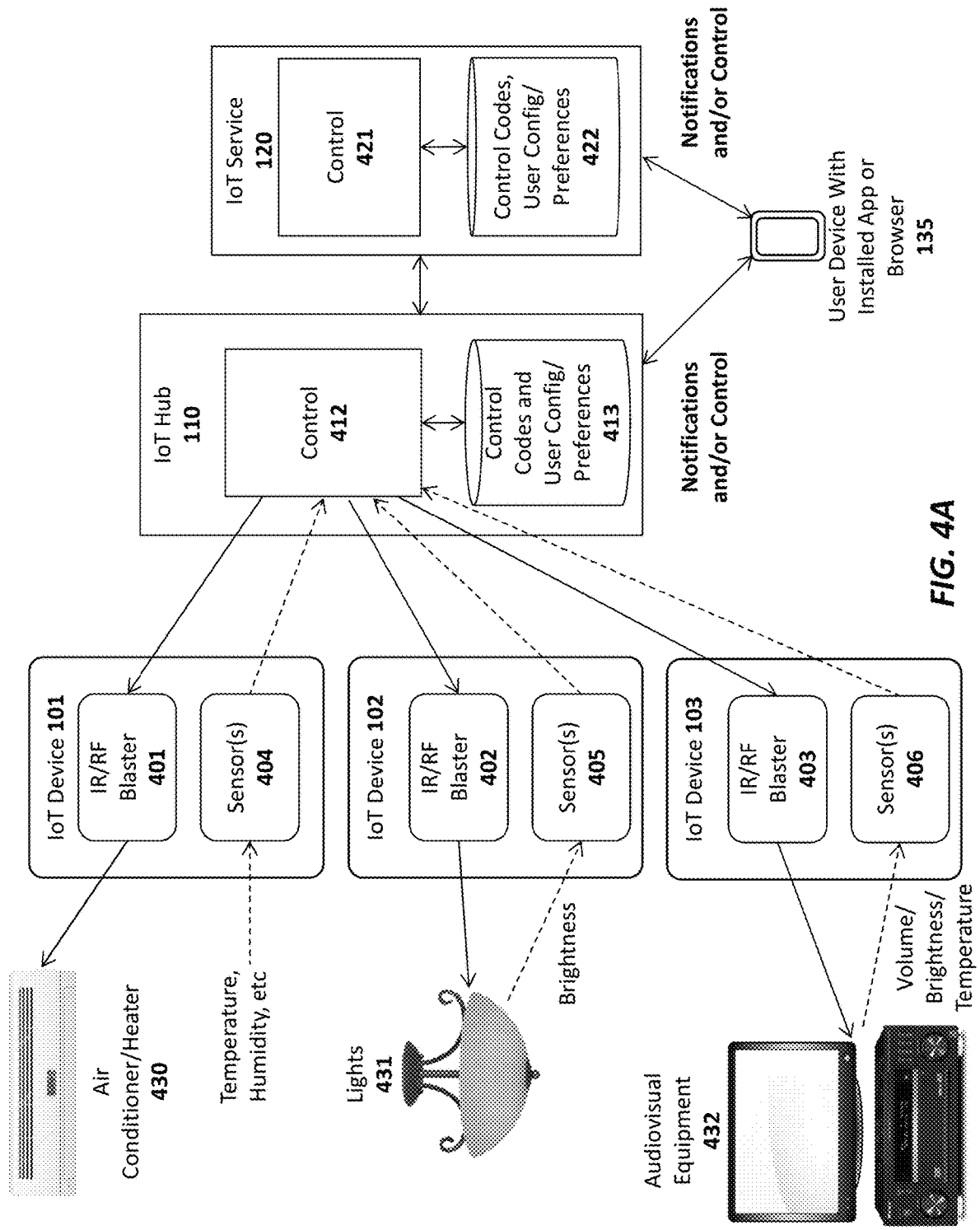
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
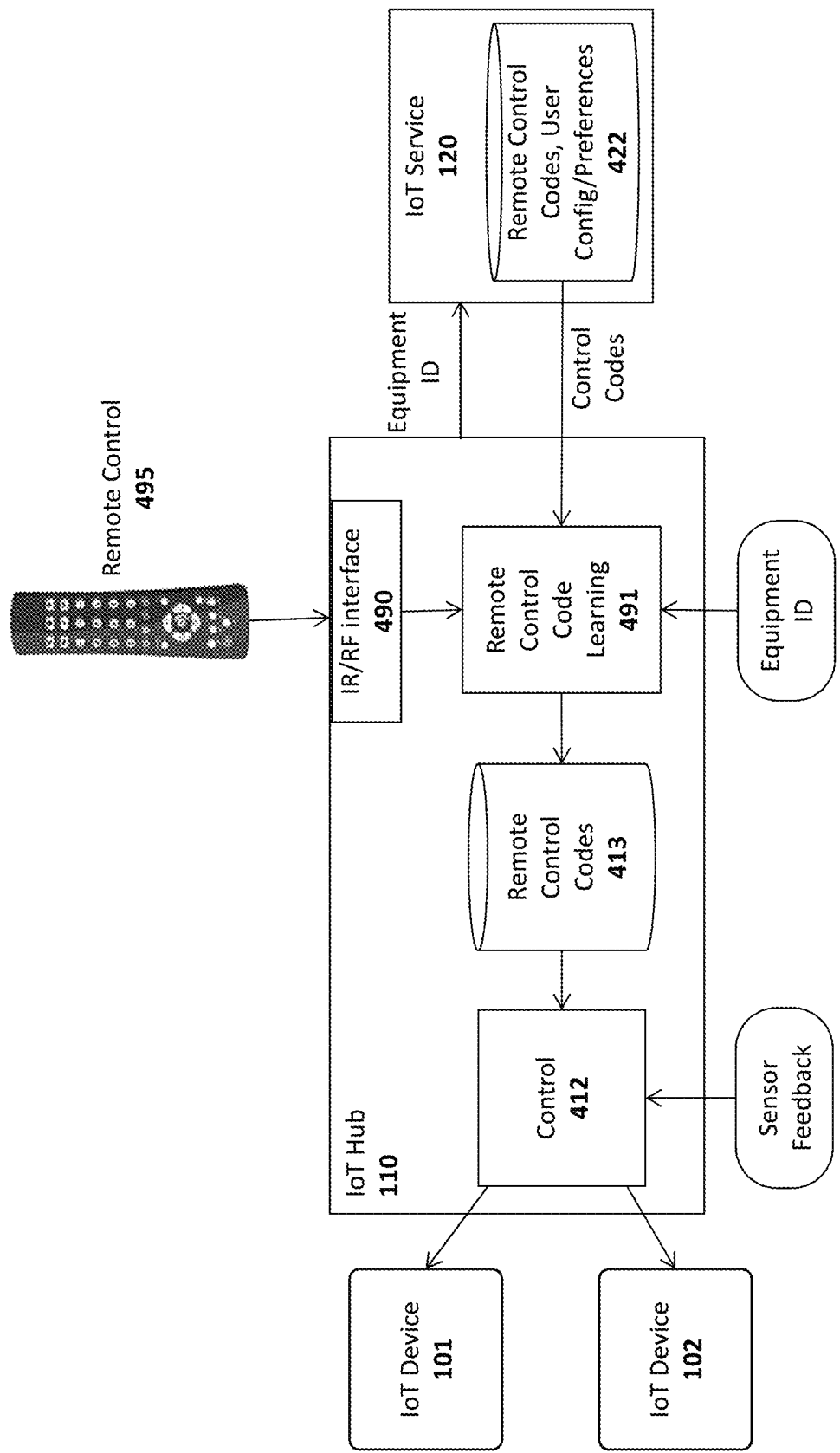

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
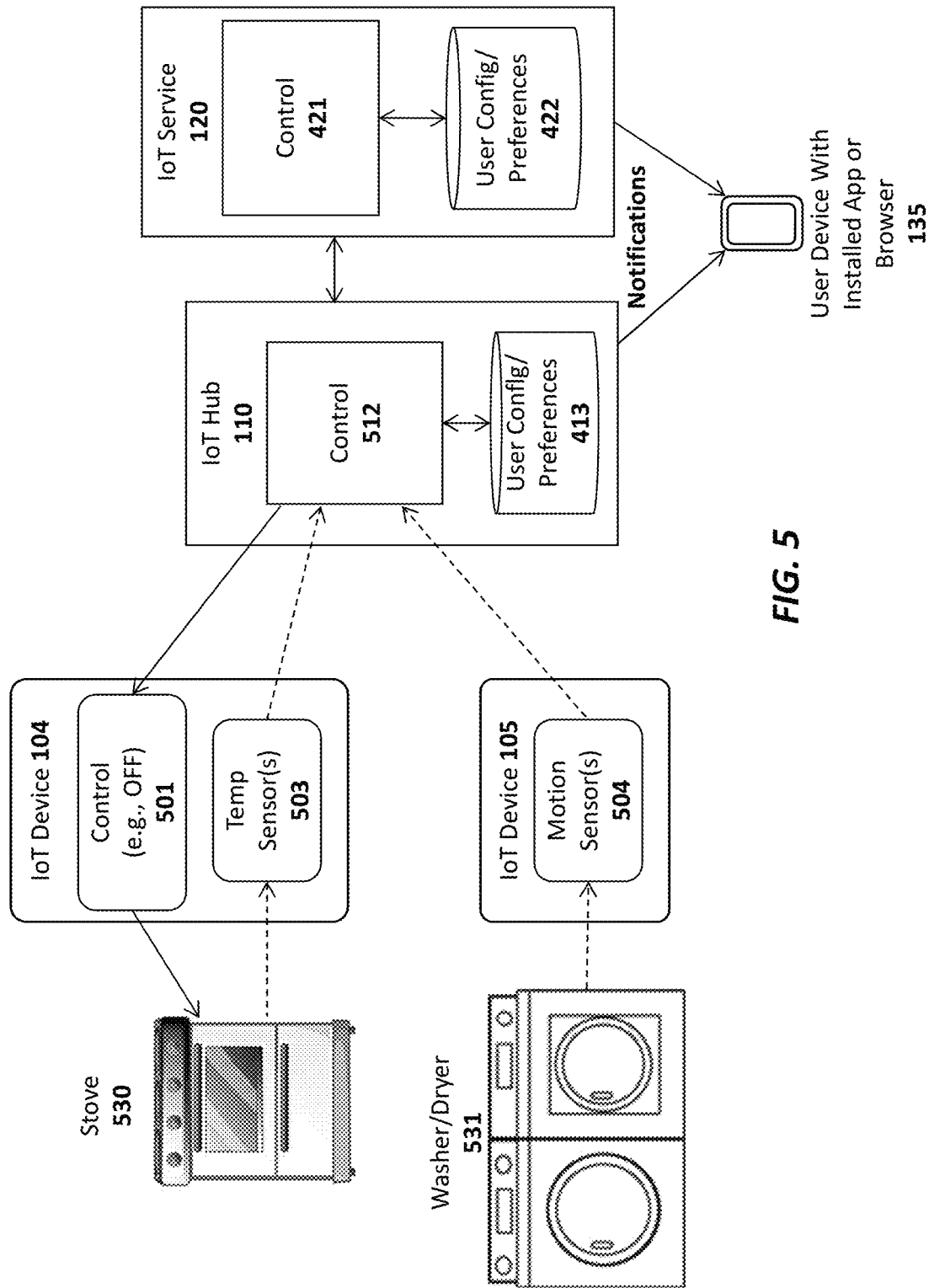
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

APPARATUS AND METHOD FOR COMMUNICATING DATA THROUGH AN INTERMEDIARY DEVICE

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 6:
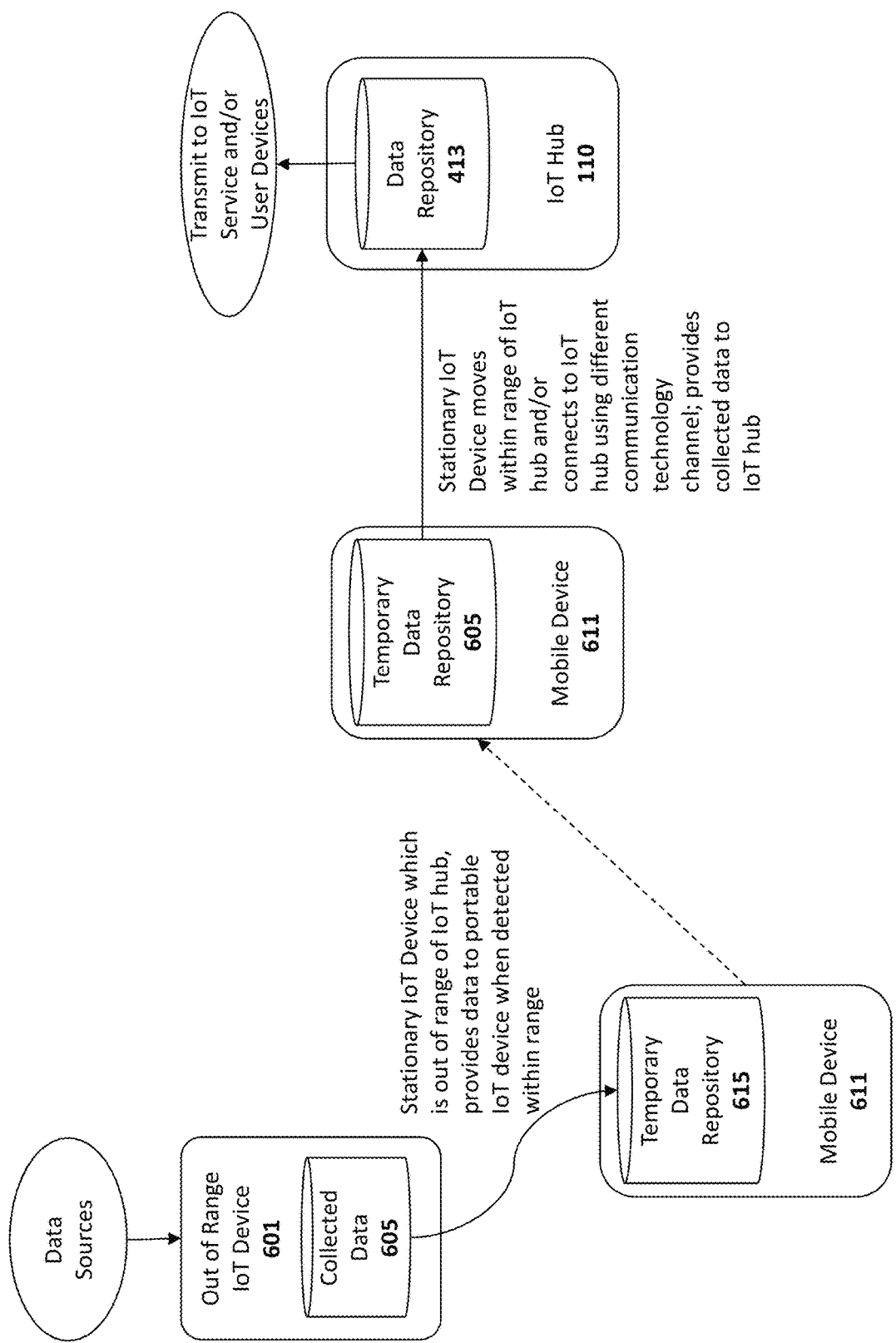
FIG. 6 illustrates one embodiment of a system in which an intermediary mobile device collects data from a stationary IoT device and provides the data to an IoT hub.

As illustrated in FIG. 6 one embodiment includes an IoT hub 110, an IoT device 601 which is out of range of the IoT hub 110 and a mobile device 611. The out of range IoT device 601 may include any form of IoT device capable of collecting and communicating data. For example, the IoT device 601 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 611 illustrated in FIG. 6 may be any form of mobile device capable of communicating and storing data. For example, in one embodiment, the mobile device 611 is a smartphone with an app installed thereon to facilitate the techniques described herein. In another embodiment, the mobile device 611 comprises a wearable device such as a communication token affixed to a neckless or bracelet, a smartwatch or a fitness device. The wearable token may be particularly useful for elderly users or other users who do not own a smartphone device.

In operation, the out of range IoT device 601 may periodically or continually check for connectivity with a mobile device 611. Upon establishing a connection (e.g., as the result of the user moving within the vicinity of the refrigerator) any collected data 605 on the IoT device 601 is automatically transmitted to a temporary data repository 615 on the mobile device 611. In one embodiment, the IoT device 601 and mobile device 611 establish a local wireless communication channel using a low power wireless standard such as BTLE. In such a case, the mobile device 611 may initially be paired with the IoT device 601 using known pairing techniques.

One the data has been transferred to the temporary data repository, the mobile device 611 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 611 may use a different type of communication channel to provide the data to the IoT hub 110 (potentially a higher power communication channel such as WiFi).

Figure 7:
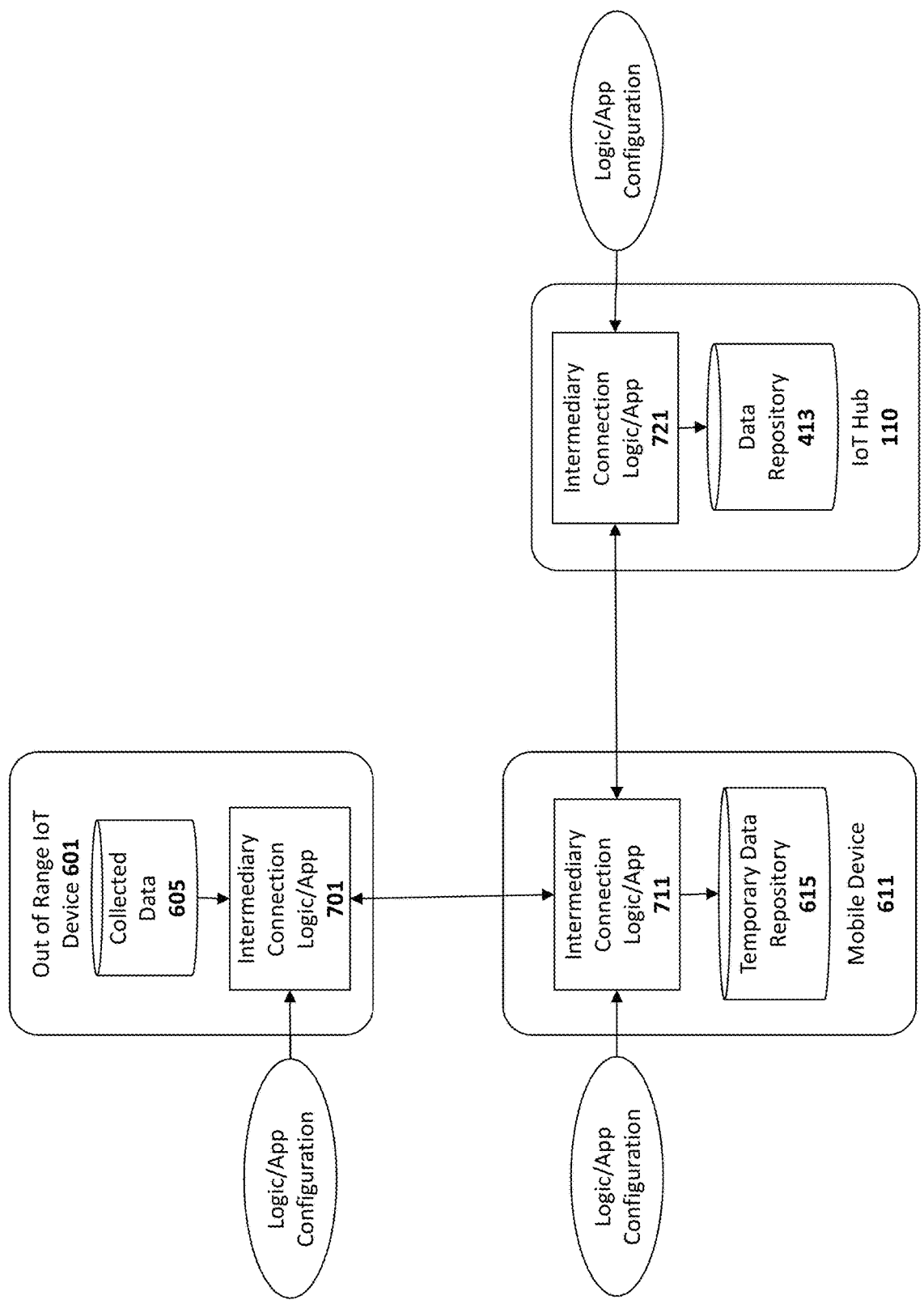
FIG. 7 illustrates intermediary connection logic implemented in one embodiment of the invention.

The out of range IoT device 601, the mobile device 611, and the IoT hub may all be configured with program code and/or logic to implement the techniques described herein. As illustrated in FIG. 7, for example, the IoT device 601 may be configured with intermediary connection logic and/or application, the mobile device 611 may be configured with an intermediary connection logic/application, and the IoT hub 110 may be configured with an intermediary connection logic/application 721 to perform the operations described herein. The intermediary connection logic/application on each device may be implemented in hardware, software, or any combination thereof. In one embodiment, the intermediary connection logic/application 701 of the IoT device 601 searches and establishes a connection with the intermediary connection logic/application 711 on the mobile device (which may be implemented as a device app) to transfer the data to the temporary data repository 615. The intermediary connection logic/application 701 on the mobile device 611 then forwards the data to the intermediary connection logic/application on the IoT hub, which stores the data in the central data repository 413.

As illustrated in FIG. 7, the intermediary connection logic/applications 701, 711, 721, on each device may be configured based on the application at hand. For example, for a refrigerator, the connection logic/application 701 may only need to transmit a few packets on a periodic basis. For other applications (e.g., temperature sensors), the connection logic/application 701 may need to transmit more frequent updates.

Rather than a mobile device 611, in one embodiment, the IoT device 601 may be configured to establish a wireless connection with one or more intermediary IoT devices, which are located within range of the IoT hub 110. In this embodiment, any IoT devices 601 out of range of the IoT hub may be linked to the hub by forming a "chain" using other IoT devices.

In addition, while only a single mobile device 611 is illustrated in FIGS. 6-7 for simplicity, in one embodiment, multiple such mobile devices of different users may be configured to communicate with the IoT device 601. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 611 connects with the IoT device 601, the identity of the user may be included with the collected data 605. In this manner, the IoT system may be used to track the behavior of different users within the home. For example, if used within a refrigerator, the collected data 605 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 611 may be a very small token worn by the elderly user to collect the information in different rooms of the user's home. Each time the user opens the refrigerator, for example, this data will be included with the collected data 605 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 605 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 8:
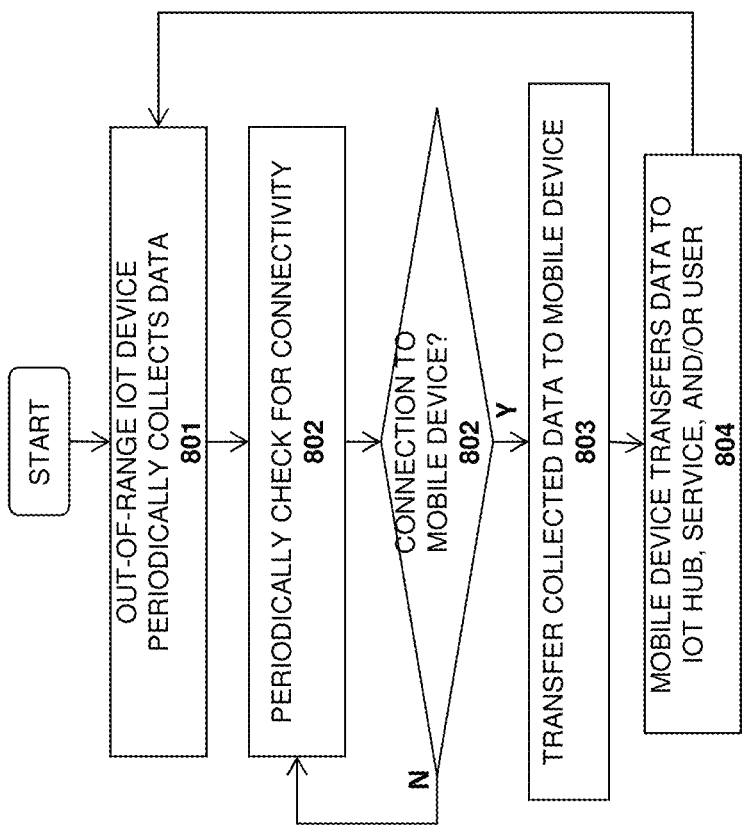
FIG. 8 illustrates a method in accordance with one embodiment of the invention.

A method in accordance with one embodiment of the invention is illustrated in FIG. 8. The method may be implemented within the context of the architectures described above, but is not limited to any particular architecture.

At 801, an IoT device which is out of range of the IoT hub periodically collects data (e.g., opening of the refrigerator door, food items used, etc). At 802 the IoT device periodically or continually checks for connectivity with a mobile device (e.g., using standard local wireless techniques for establishing a connection such as those specified by the BTLE standard). If the connection to the mobile device is established, determined at 802, then at 803, the collected data is transferred to the mobile device at 803. At 804, the mobile device transfers the data to the IoT hub, an external service and/or a user. As mentioned, the mobile device may transmit the data immediately if it is already connected (e.g., via a WiFi link).

Figure 9A:
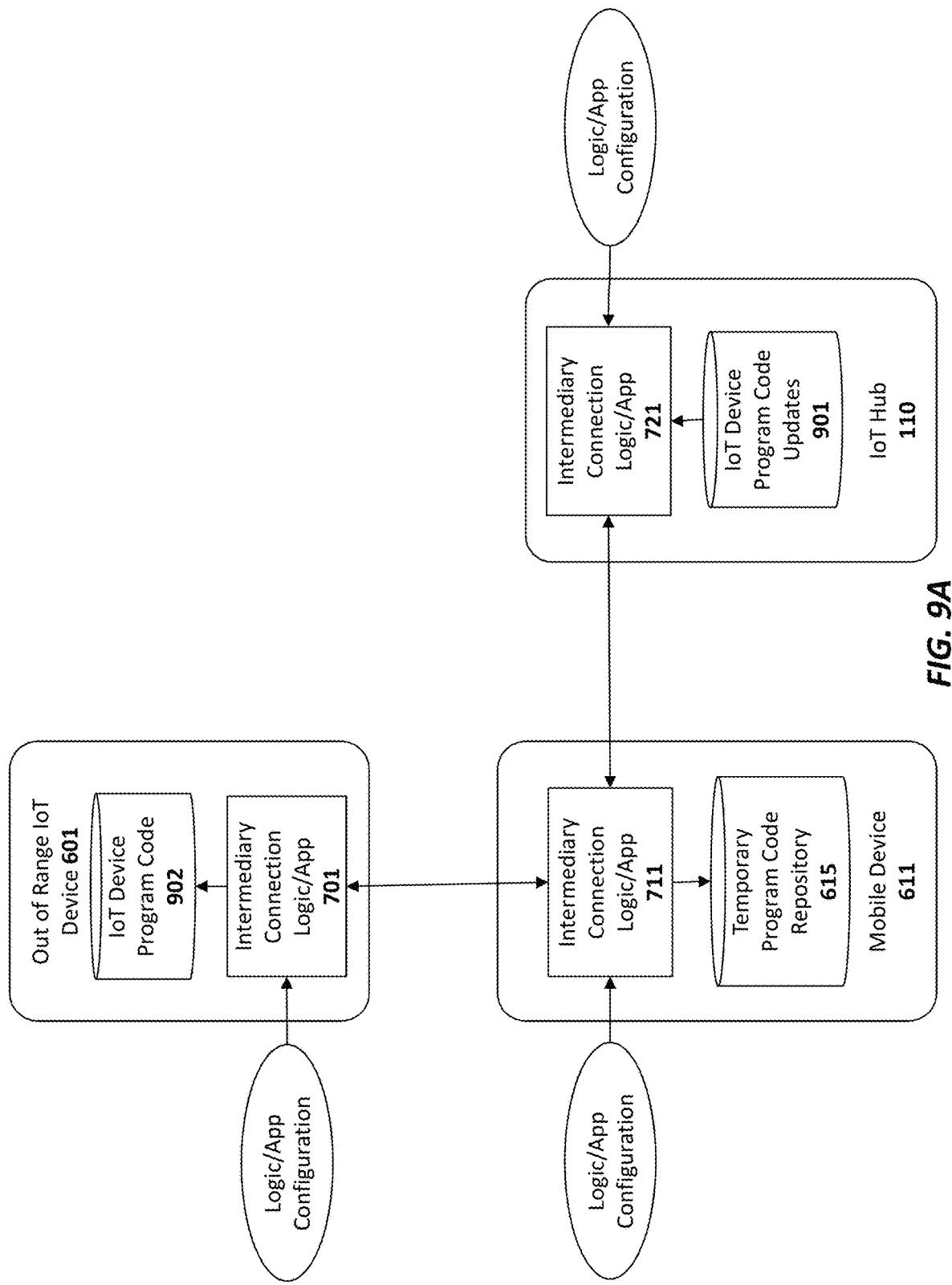
FIG. 9A illustrates an embodiment in which program code and data updates are provided to the IoT device.

In addition to collecting data from IoT devices, in one embodiment, the techniques described herein may be used to update or otherwise provide data to IoT devices. One example is shown in FIG. 9A, which shows an IoT hub 110 with program code updates 901 that need to be installed on an IoT device 601 (or a group of such IoT devices). The program code updates may include system updates, patches, configuration data and any other data needed for the IoT device to operate as desired by the user. In one embodiment, the user may specify configuration options for the IoT device 601 via a mobile device or computer which are then stored on the IoT hub 110 and provided to the IoT device using the techniques described herein. Specifically, in one embodiment, the intermediary connection logic/application 721 on the IoT hub 110 communicates with the intermediary connection logic/application 711 on the mobile device 611 to store the program code updates within a temporary storage 615. When the mobile device 611 enters the range of the IoT device 601, the intermediary connection logic/application 711 on the mobile device 611 connects with the intermediary/connection logic/application 701 on the IoT device 601 to provide the program code updates to the device. In one embodiment, the IoT device 601 may then enter into an automated update process to install the new program code updates and/or data.

Figure 9B:
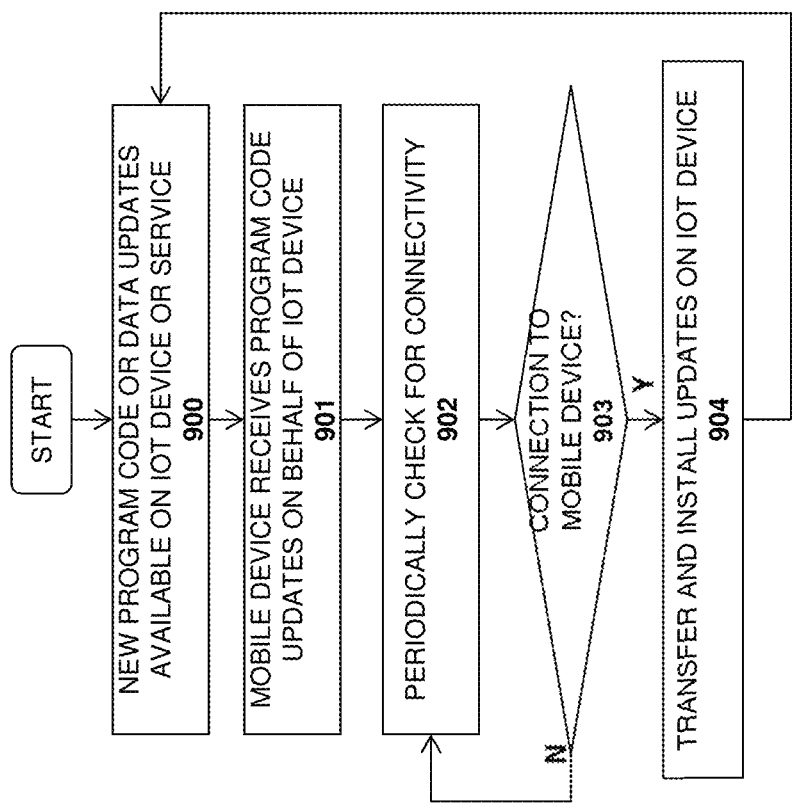
FIG. 9B illustrates an embodiment of a method in which program code and data updates are provided to the IoT device.

A method for updating an IoT device is shown in FIG. 9B. The method may be implemented within the context of the system architectures described above, but is not limited to any particular system architectures.

At 900 new program code or data updates are made available on the IoT hub and/or an external service (e.g., coupled to the mobile device over the Internet). At 901, the mobile device receives and stores the program code or data updates on behalf of the IoT device. The IoT device and/or mobile device periodically check to determine whether a connection has been established at 902. If a connection is established, determined at 903, then at 904 the updates are transferred to the IoT device and installed.

EMBODIMENTS FOR IMPROVED SECURITY

In one embodiment, the low power microcontroller 200 of each IoT device 101 and the low power logic/microcontroller 301 of the IoT hub 110 include a secure key store for storing encryption keys used by the embodiments described below (see, e.g., FIGS. 10-15 and associated text). Alternatively, the keys may be secured in a subscriber identify module (SIM) as discussed below.

Figure 10:
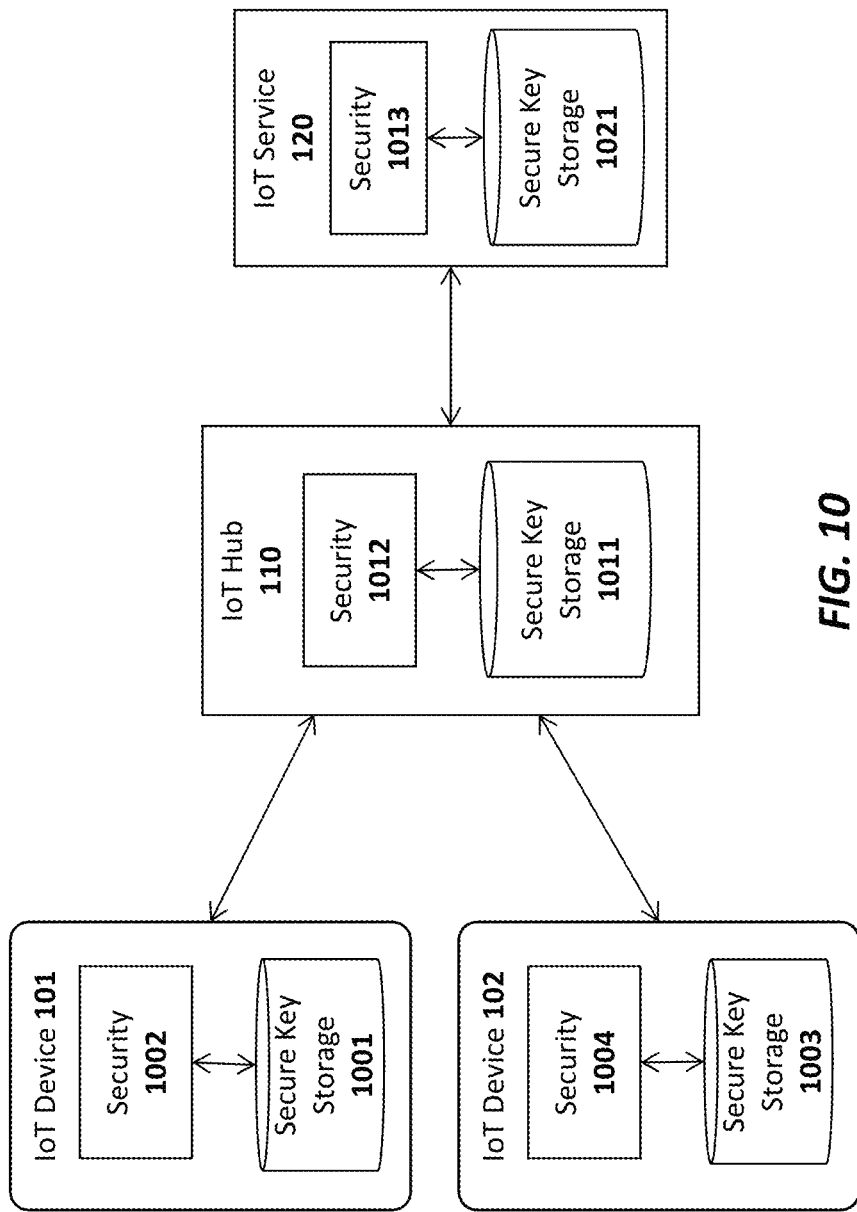
FIG. 10 illustrates a high level view of one embodiment of a security architecture.

FIG. 10 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1001, 1003, respectively, for security storing each device's private key. Security logic 1002, 1304 then utilizes the securely stored private keys to perform the encryption/decryption operations described herein. Similarly, the IoT hub 110 includes a secure storage 1011 for storing the IoT hub private key and the public keys of the IoT devices 101-102 and the IoT service 120; as well as security logic 1012 for using the keys to perform encryption/decryption operations. Finally, the IoT service 120 may include a secure storage 1021 for security storing its own private key, the public keys of various IoT devices and IoT hubs, and a security logic 1013 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1011.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1013 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1012 in the IoT hub is trusted, the service 120 could negotiate a session key with the hub security module 1312 and then the security module 1012 would negotiate a session key with each device 120. Messages from the service 120 would then be decrypted and verified in the hub security module 1012 before being re-encrypted for transmission to the device 101.

In one embodiment, to prevent a compromise on the hub security module 1012 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1002 on the IoT device 101 uses the public key of the IoT hub 110 to encrypt data packets sent to the IoT hub 110. The security logic 1012 on the IoT hub 110 may then decrypt the data packets using the IoT hub's private key. Similarly, the security logic 1002 on the IoT device 101 and/or the security logic 1012 on the IoT hub 110 may encrypt data packets sent to the IoT service 120 using the public key of the IoT service 120 (which may then be decrypted by the security logic 1013 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 11:
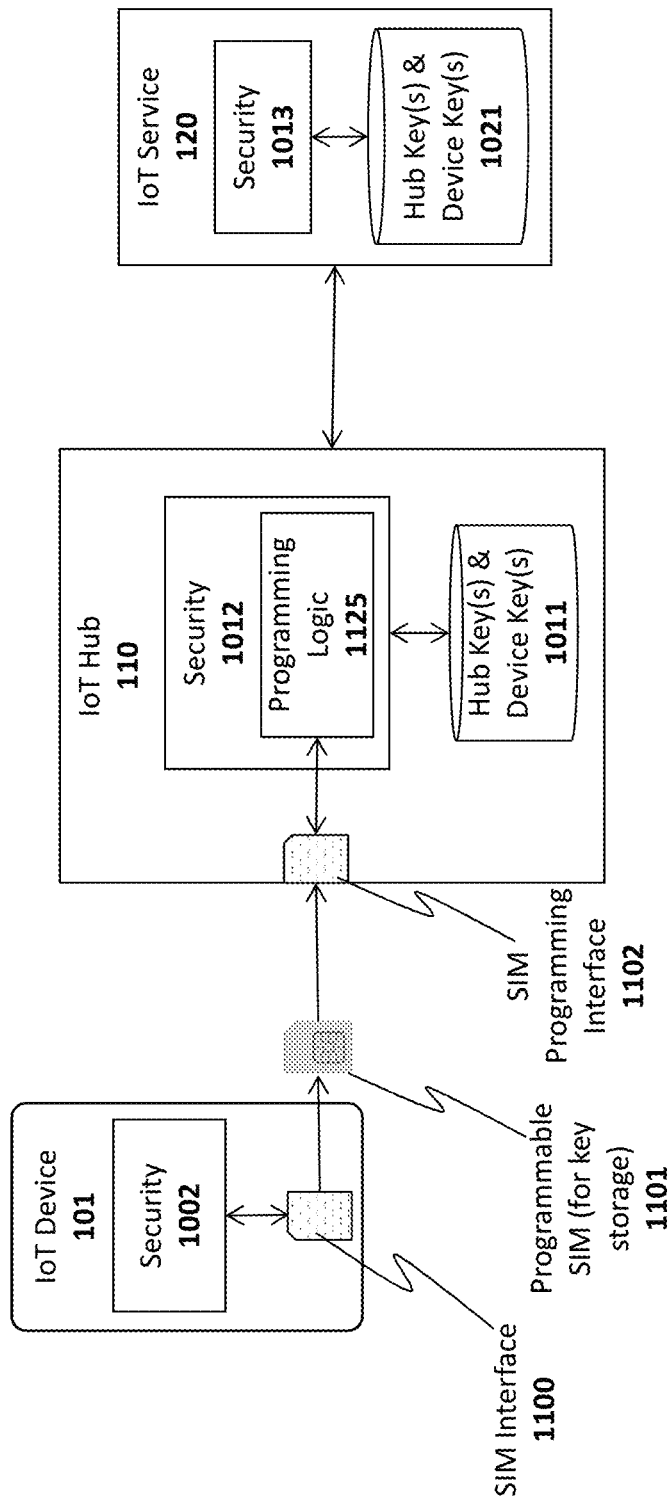
FIG. 11 illustrates one embodiment of an architecture in which a subscriber identity module (SIM) is used to store keys on IoT devices.

As illustrated in FIG. 11, in one embodiment, the secure key storage on each IoT device 101 is implemented using a programmable subscriber identity module (SIM) 1101. In this embodiment, the IoT device 101 may initially be provided to the end user with an un-programmed SIM card 1101 seated within a SIM interface 1100 on the IoT device 101. In order to program the SIM with a set of one or more encryption keys, the user takes the programmable SIM card 1101 out of the SIM interface 500 and inserts it into a SIM programming interface 1102 on the IoT hub 110. Programming logic 1125 on the IoT hub then securely programs the SIM card 1101 to register/pair the IoT device 101 with the IoT hub 110 and IoT service 120. In one embodiment, a public/private key pair may be randomly generated by the programming logic 1125 and the public key of the pair may then be stored in the IoT hub's secure storage device 411 while the private key may be stored within the programmable SIM 1101. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1101 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 11 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1102 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 12A:
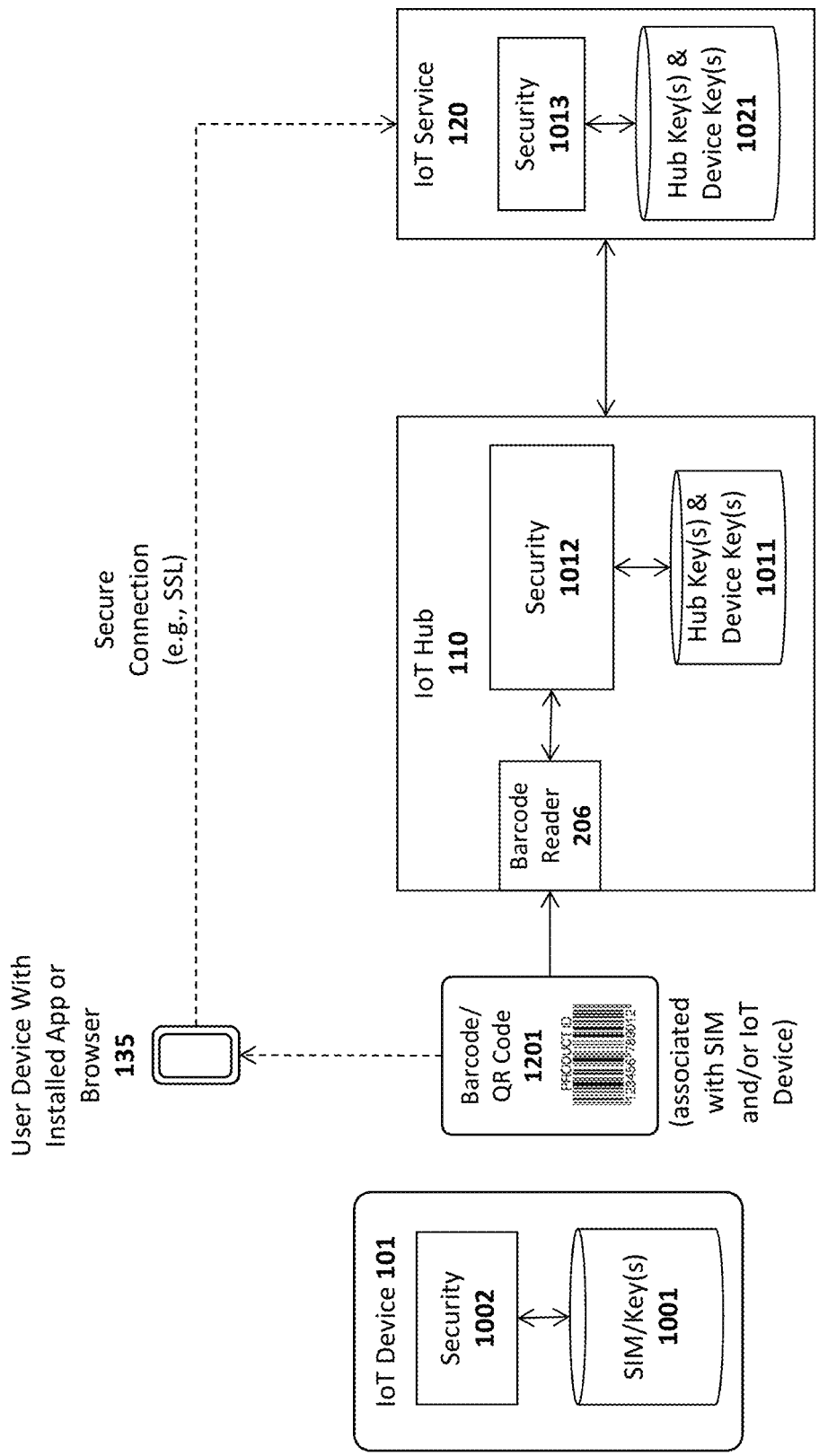
FIG. 12A illustrates one embodiment in which IoT devices are registered using barcodes or QR codes.

For example, as illustrated in FIG. 12A each IoT device 101 or SIM 401 may be packaged with a barcode or QR code 1501 uniquely identifying the IoT device 101 and/or SIM 1001. In one embodiment, the barcode or QR code 1201 comprises an encoded representation of the public key for the IoT device 101 or SIM 1001. Alternatively, the barcode or QR code 1201 may be used by the IoT hub 110 and/or IoT service 120 to identify or generate the public key (e.g., used as a pointer to the public key which is already stored in secure storage). The barcode or QR code 601 may be printed on a separate card (as shown in FIG. 12A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1201 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 12B:
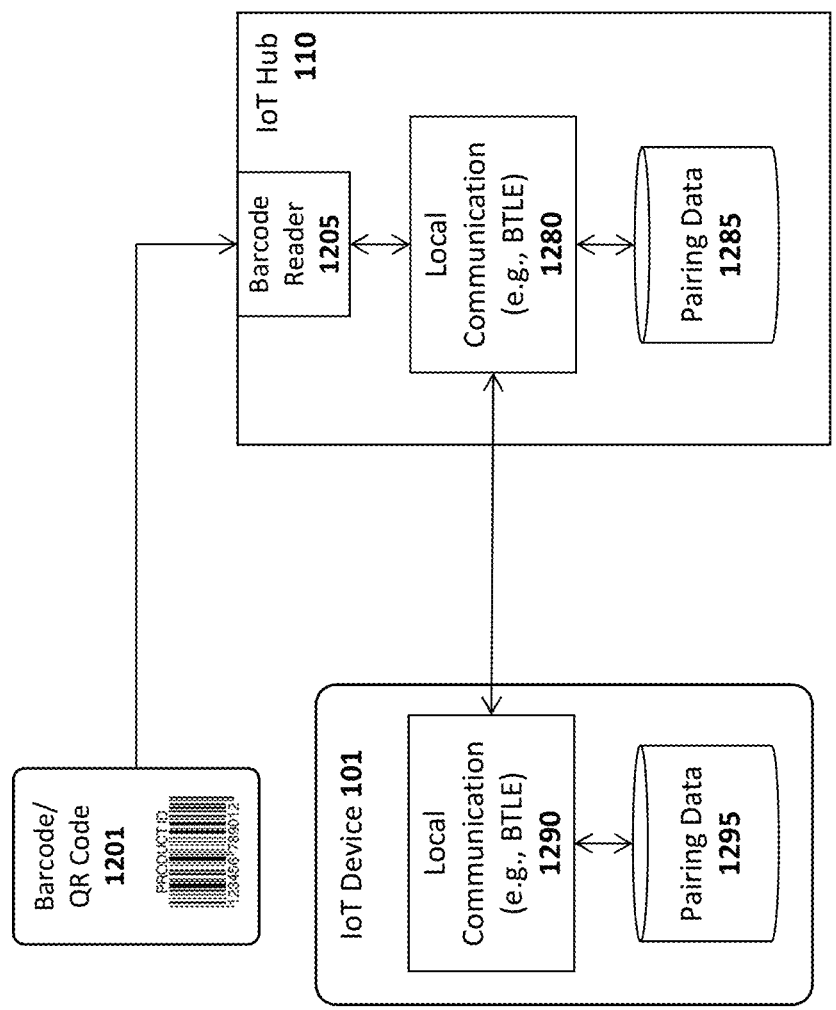
FIG. 12B illustrates one embodiment in which pairing is performed using barcodes or QR codes.

FIG. 12B illustrates one embodiment in which the barcode reader 206 on the IoT hub 110 captures the barcode/QR code 1201 associated with the IoT device 101. As mentioned, the barcode/QR code 1201 may be printed directly on the IoT device 101 or may be printed on a separate card provided with the IoT device 101. In either case, the barcode reader 206 reads the pairing code from the barcode/QR code 1201 and provides the pairing code to the local communication module 1280. In one embodiment, the local communication module 1280 is a Bluetooth LE chip and associated software, although the underlying principles of the invention are not limited to any particular protocol standard. Once the pairing code is received, it is stored in a secure storage containing pairing data 1285 and the IoT device 101 and IoT hub 110 are automatically paired. Each time the IoT hub is paired with a new IoT device in this manner, the pairing data for that pairing is stored within the secure storage 685. In one embodiment, once the local communication module 1280 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1295 may include the pre-programmed pairing code identified in the barcode/QR code 1201. The pairing data 1295 may also include pairing data received from the local communication module 1280 on the IoT hub 110 required for establishing a secure local communication channel (e.g., an additional key to encrypt communication with the IoT hub 110).

Thus, the barcode/QR code 1201 may be used to perform local pairing in a far more secure manner than current wireless pairing protocols because the pairing code is not transmitted over the air. In addition, in one embodiment, the same barcode/QR code 1201 used for pairing may be used to identify encryption keys to build a secure connection from the IoT device 101 to the IoT hub 110 and from the IoT hub 110 to the IoT service 120.

Figure 13:
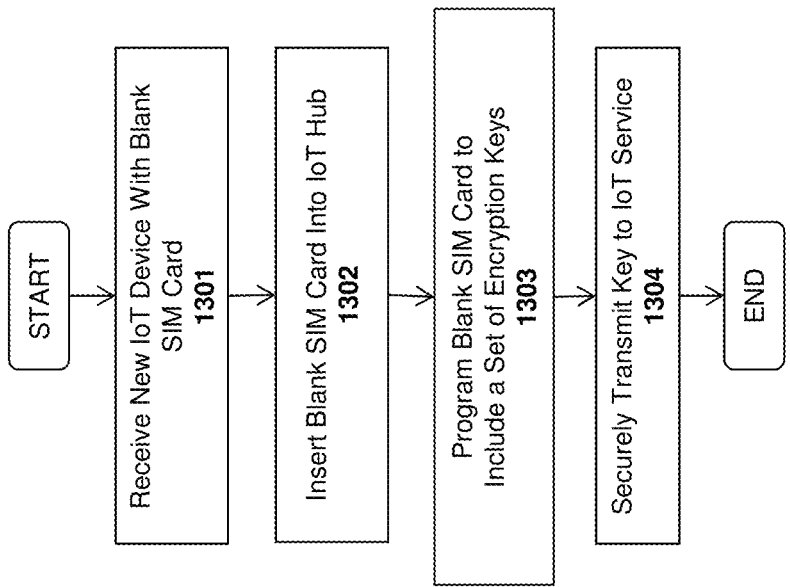
FIG. 13 illustrates one embodiment of a method for programming a SIM using an IoT hub.

A method for programming a SIM card in accordance with one embodiment of the invention is illustrated in FIG. 13. The method may be implemented within the system architecture described above, but is not limited to any particular system architecture.

At 1301, a user receives a new IoT device with a blank SIM card and, at 1602, the user inserts the blank SIM card into an IoT hub. At 1303, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1304, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 13.

Figure 14:
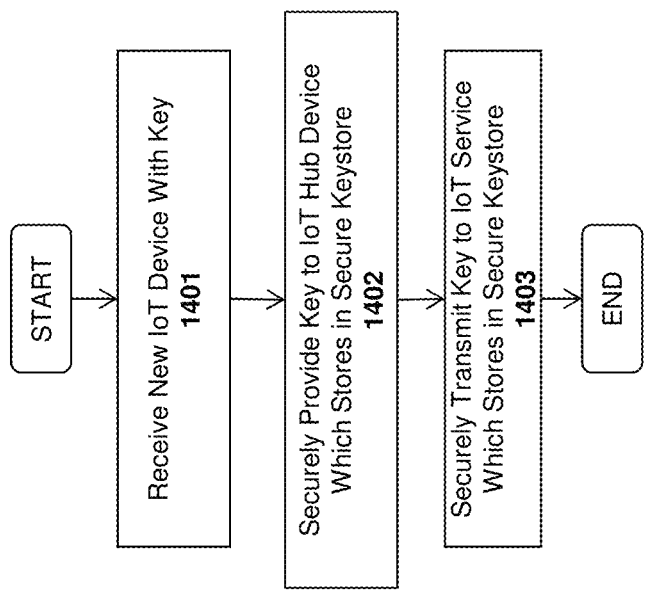
FIG. 14 illustrates one embodiment of a method for registering an IoT device with an IoT hub and IoT service.

A method for integrating a new IoT device into a network is illustrated in FIG. 14. The method may be implemented within the system architecture described above, but is not limited to any particular system architecture.

At 1401, a user receives a new IoT device to which an encryption key has been pre-assigned. At 1402, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 15:
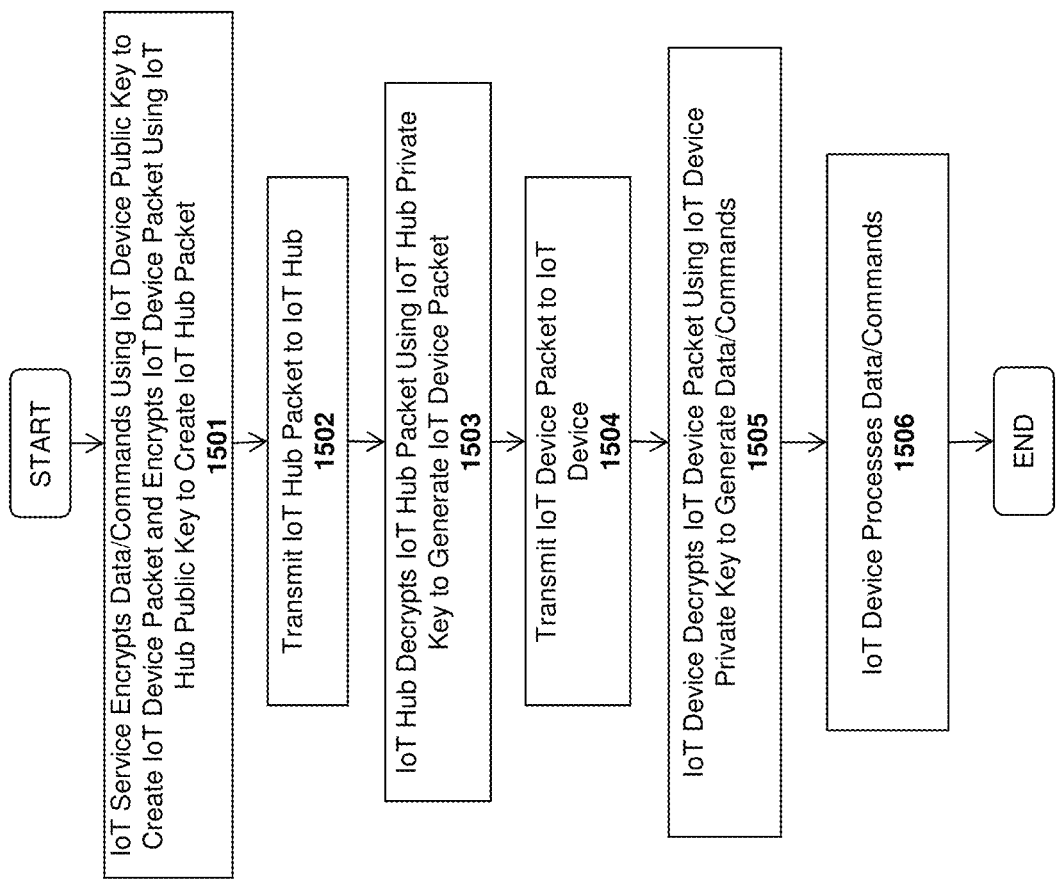
FIG. 15 illustrates one embodiment of a method for encrypting data to be transmitted to an IoT device.

A method for securely communicating commands/data to an IoT device using public/private keys is illustrated in FIG. 15. The method may be implemented within the system architecture described above, but is not limited to any particular system architecture.

At 1501, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1502, the IoT service transmits the IoT hub packet to the IoT hub. At 1503, the IoT hub decrypts the IoT hub packet using the IoT hub's private key to generate the IoT device packet. At 1504 it then transmits the IoT device packet to the IoT device which, at 1505, decrypts the IoT device packet using the IoT device private key to generate the data/commands. At 1506, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

APPARATUS AND METHOD FOR ESTABLISHING SECURE COMMUNICATION CHANNELS IN AN INTERNET OF THINGS (IoT) SYSTEM

In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
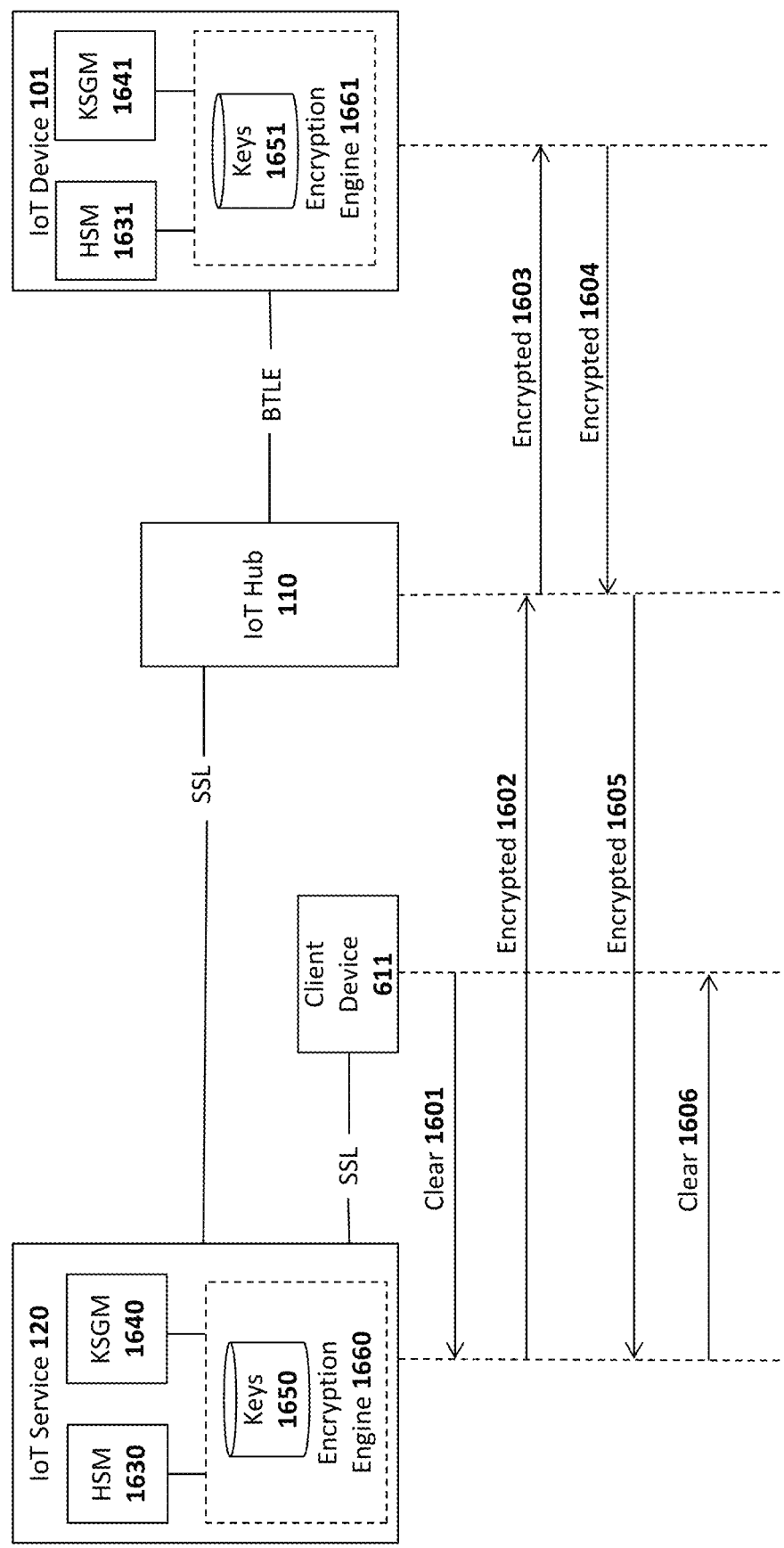
FIGS. 16A-B illustrate different embodiments of the invention for encrypting data between an IoT service and an IoT device.
Figure 16B:
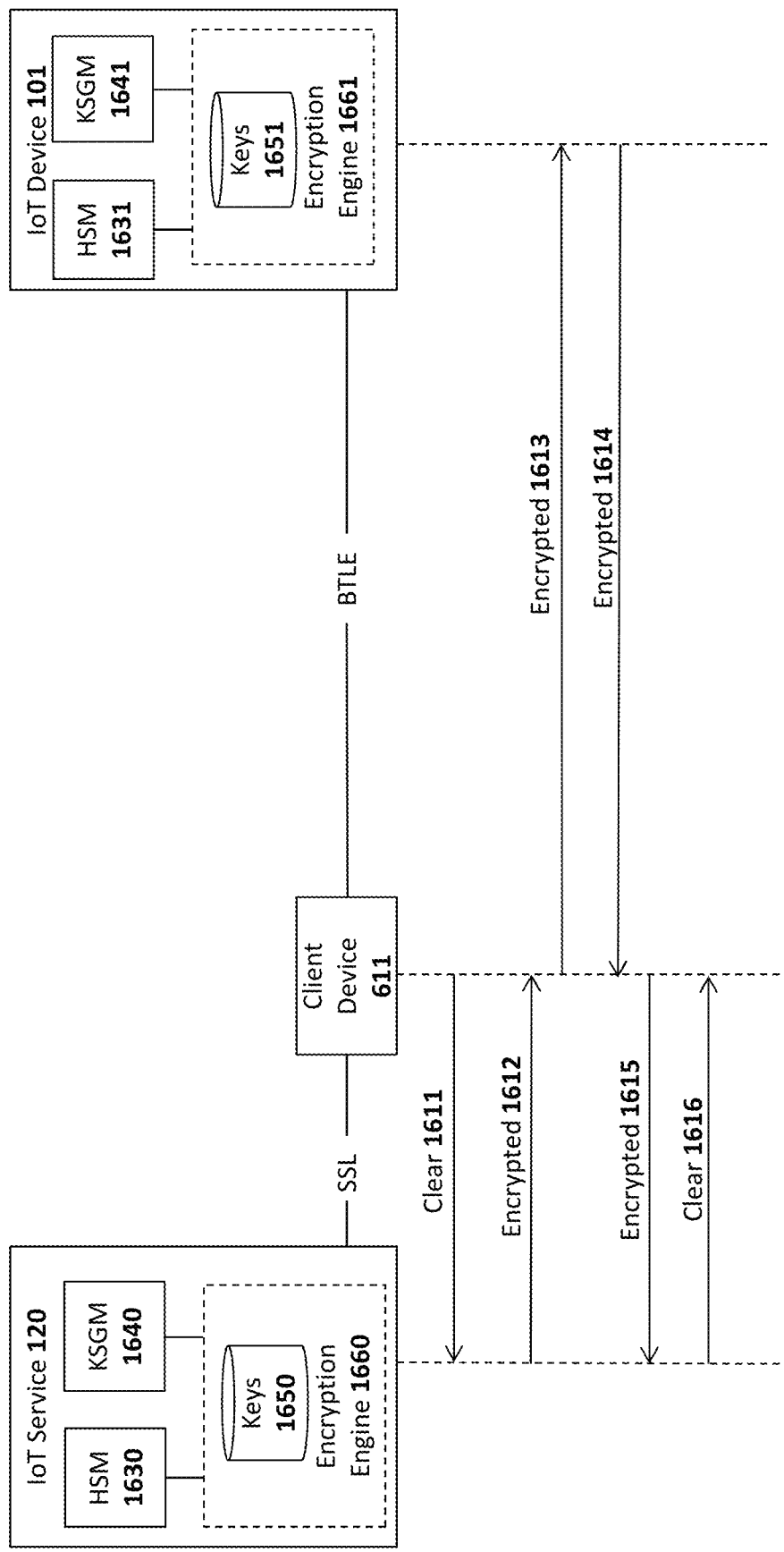

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
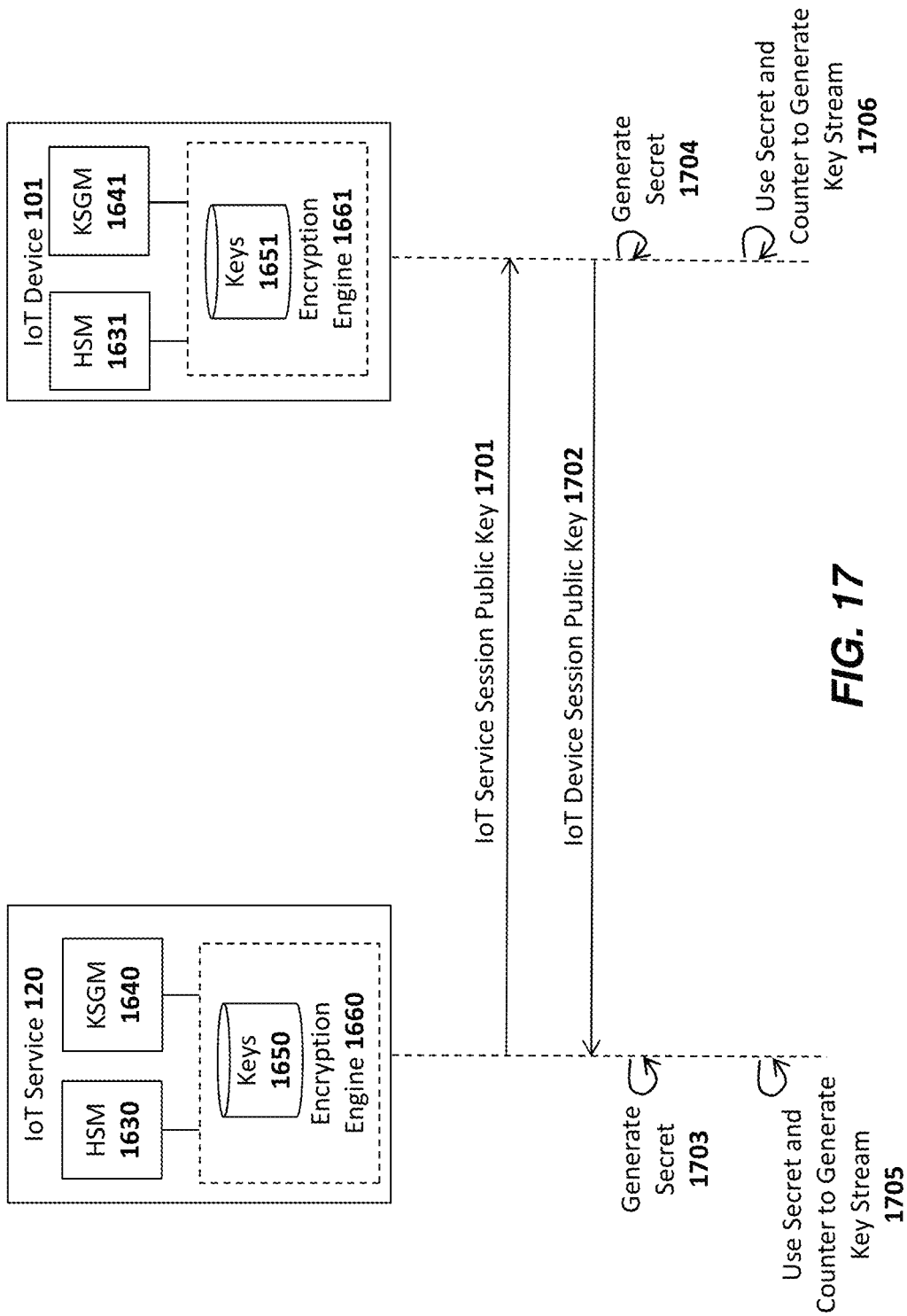
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public-private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key * IoT service session private key, where "*" means that the IoT device session public key is point-multiplied by the IoT service session private key. The encryption engine 1661 on the IoT device 101 generates the secret according to the formula secret=IoT service session pub key * IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
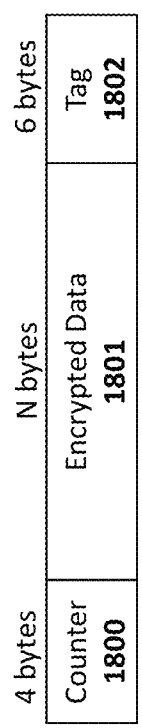
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
 1. The IoT service's unique ID:
  The IoT service's serial number;
  a Timestamp;
  The ID of the factory key used to sign this unique ID;
  a Class of the unique ID (i.e., a service);
  IoT service's public key
  The signature over the unique ID.
 2. The Factory Certificate including:
  A timestamp
  The ID of the master key used to sign the certificate
  The factory public key
  The signature of the Factory Certificate
 3. IoT service session public key (as described above with respect to FIGS. 16A-B)
 4. IoT service session public key signature (e.g., signed with the IoT service's private key)

B. In one embodiment, the message is sent to the IoT device on the negotiation channel (described below). The IoT device parses the message and:
 1. Verifies the signature of the factory certificate (only if present in the message payload)
 2. Verifies the signature of the unique ID using the key identified by the unique ID
 3. Verifies the IoT service session public key signature using the IoT service's public key from the unique ID
 4. Saves the IoT service's public key as well as the IoT service's session public key
 5. Generates the IoT device session key pair C. The IoT device then generates a message containing the following:
1. IoT device's unique ID
   IoT device serial number
   Timestamp
   ID of factory key used to sign this unique ID
   Class of unique ID (i.e., IoT device)
   IoT device's public key
   Signature of unique ID
2. IoT device's session public key
3. Signature of (IoT device session public key+IoT service session public key) signed with IoT device's key D. This message is sent back to the IoT service. The IoT service parses the message and:
1. Verifies the signature of the unique ID using the factory public key
2. Verifies the signature of the session public keys using the IoT device's public key
3. Saves the IoT device's session public key E. The IoT service then generates a message containing a signature of (IoT device session public key+IoT service session public key) signed with the IoT service's key.

F. The IoT device parses the message and:
1. Verifies the signature of the session public keys using the IoT service's public key
2. Generates the key stream from the IoT device session private key and the IoT service's session public key
3. The IoT device then sends a "messaging available" message.

G. The IoT service then does the following:
1. Generates the key stream from the IoT service session private key and the IoT device's session public key
2. Creates a new message on the messaging channel which contains the following:
   Generates and stores a random 2 byte value
   Set attribute message with the boomerang attribute Id (discussed below) and the random value H. The IoT device receives the message and:
1. Attempts to decrypt the message
2. Emits an Update with the same value on the indicated attribute Id I. The IoT service recognizes the message payload contains a boomerang attribute update and:
1. Sets its paired state to true
2. Sends a pairing complete message on the negotiator channel J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

TECHNIQUES FOR EXCHANGING DATA AND COMMANDS WITHOUT FORMALLY PAIRING DEVICES

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-*bit* Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
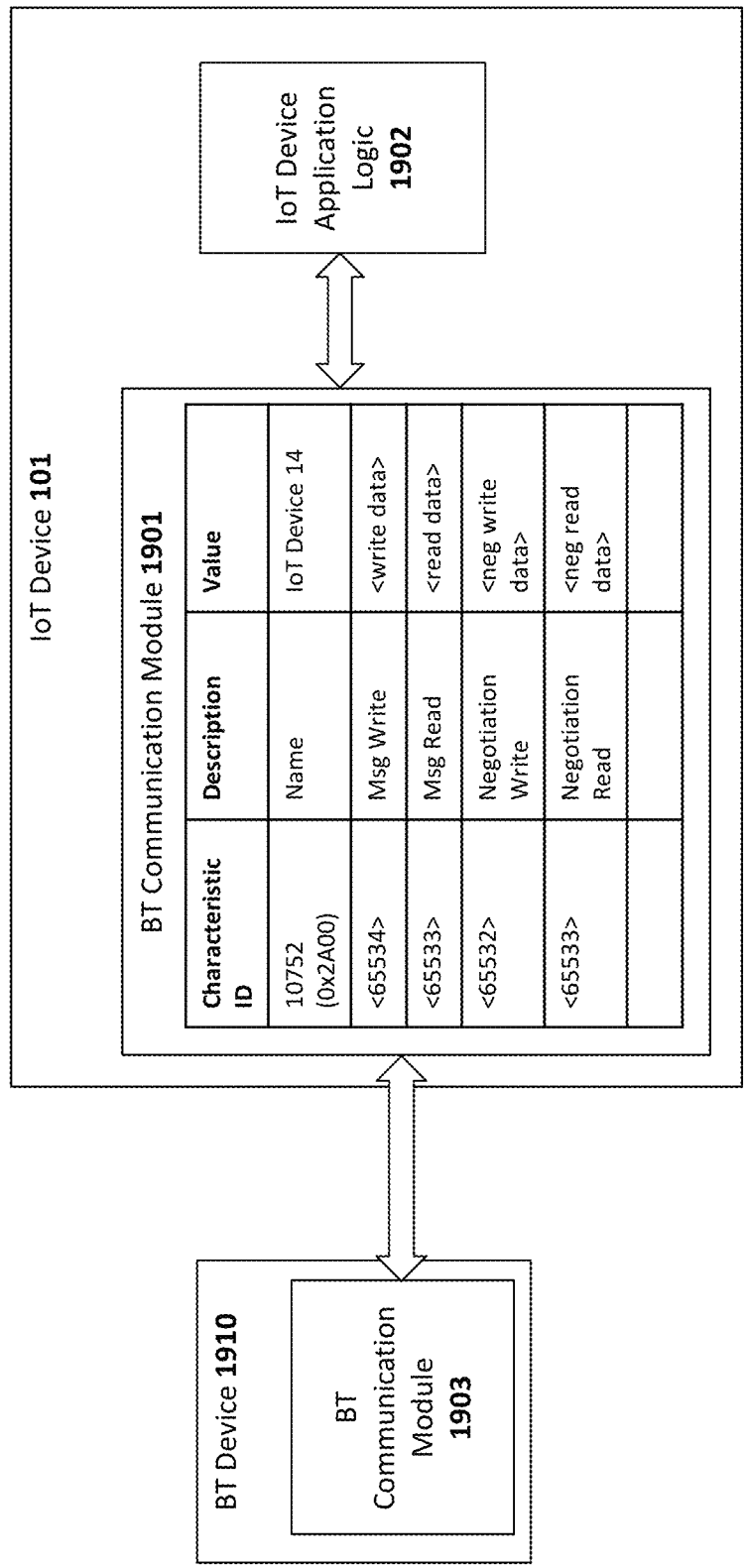
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
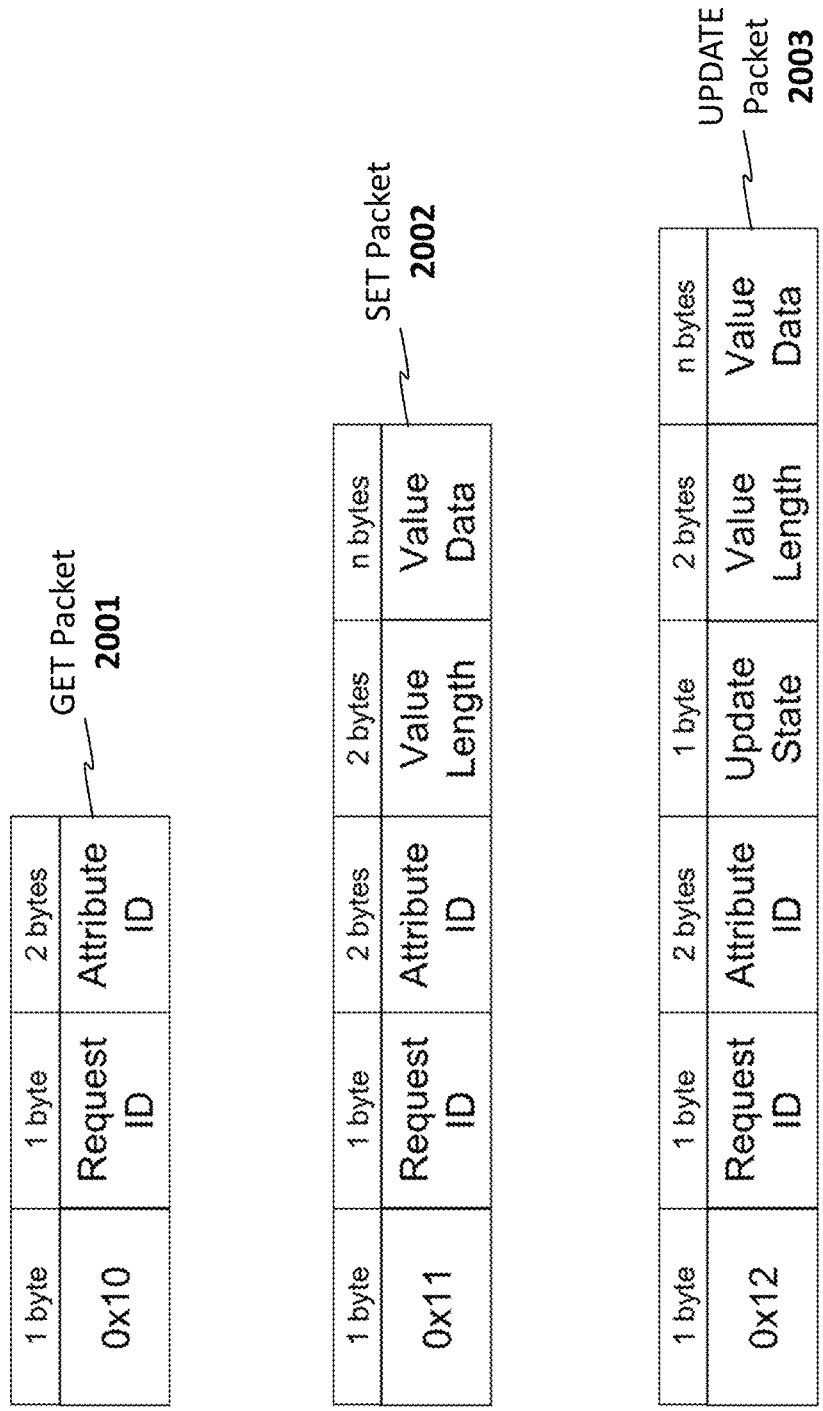
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0X10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
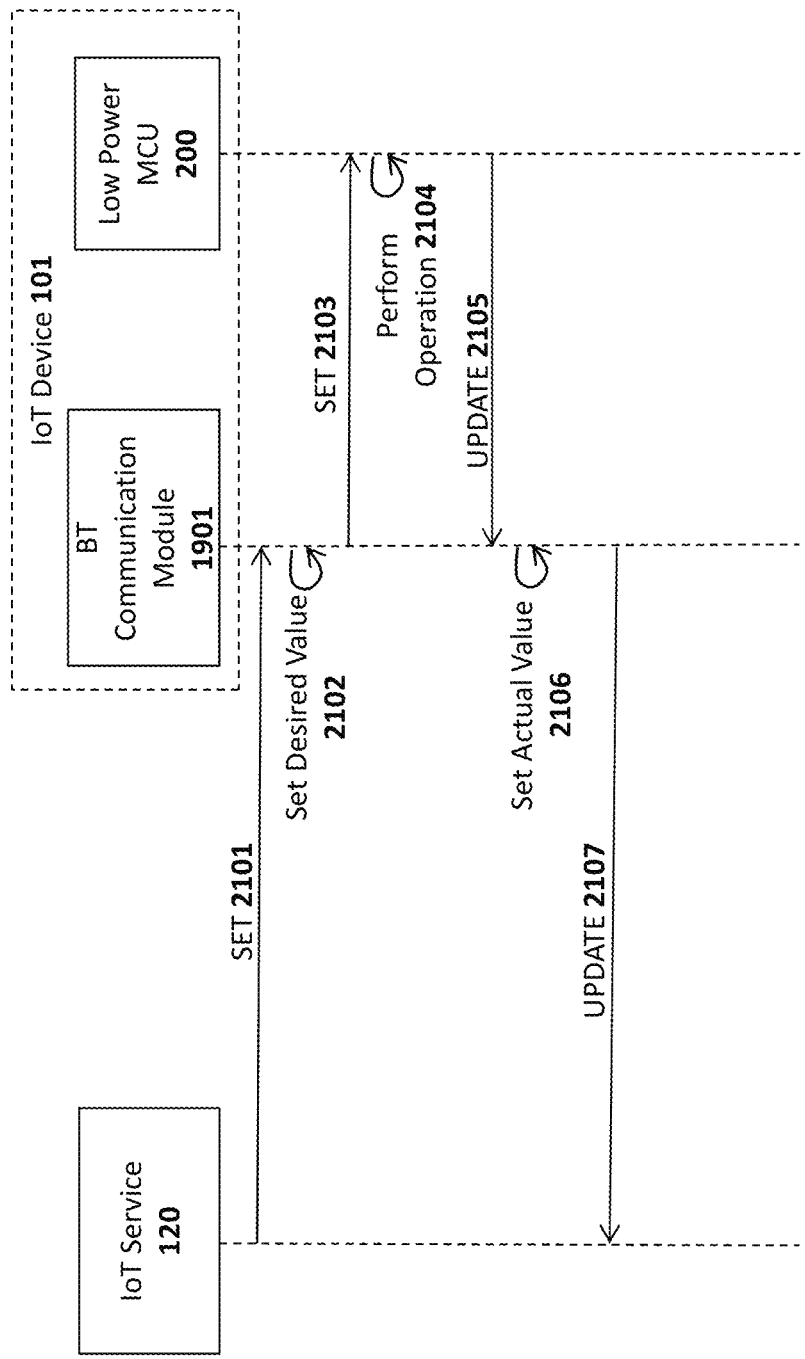
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19). At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

Figure 22:
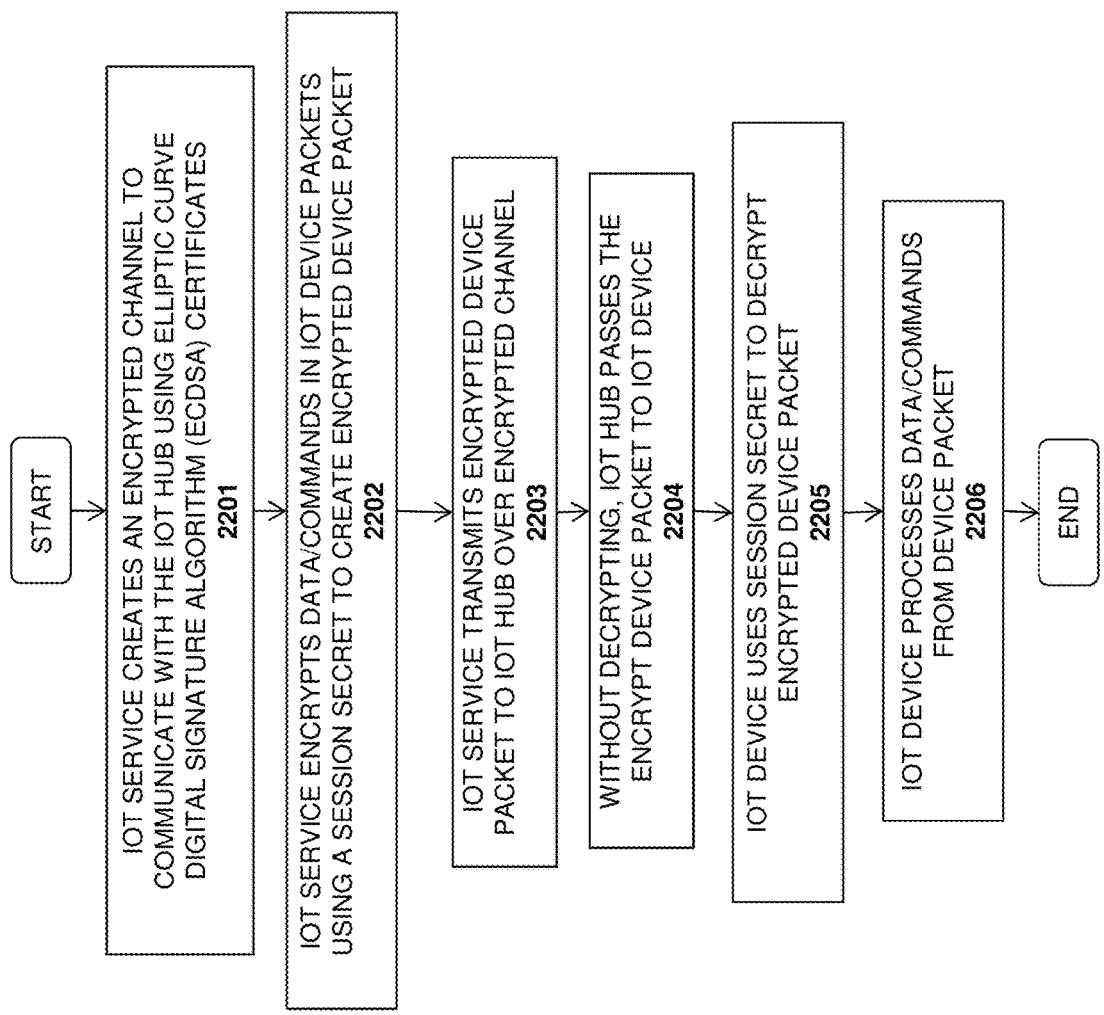
FIG. 22 illustrates a method in accordance with one embodiment of the invention.

FIG. 22 illustrates a method for implementing a secure communication channel between an IoT service and an IoT device in accordance with one embodiment of the invention. The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted devic packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23A:
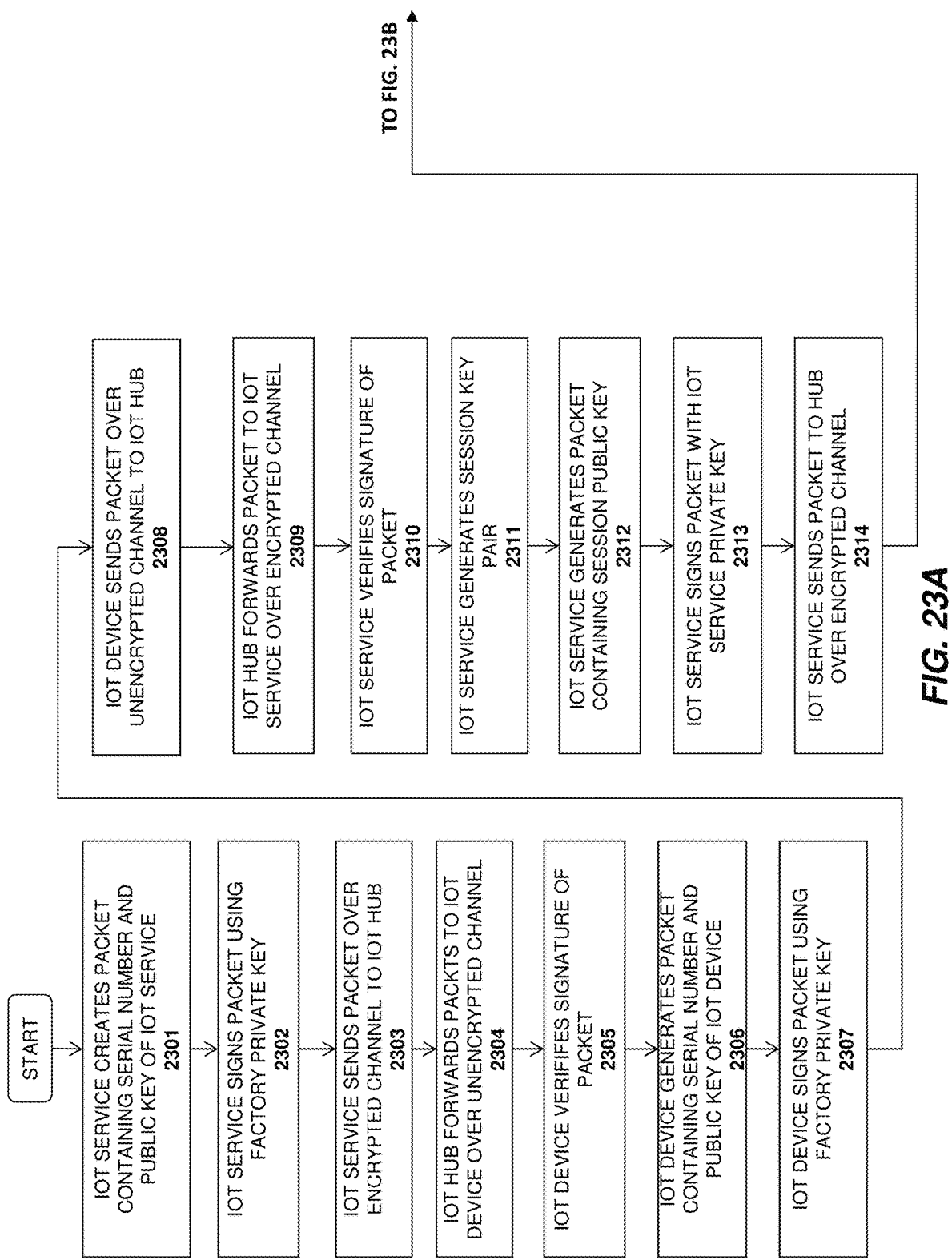

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

APPARATUS AND METHOD FOR MODIFYING PACKET
INTERVAL TIMING TO IDENTIFY A DATA TRANSFER CONDITION

Bluetooth Low Energy (BTLE) devices send advertising packets separated by an "advertising interval" to establish connections between devices. A BTLE peripheral device broadcasts advertising packets to every device around it using the advertising interval. A receiving BTLE device can then act on this information or connect to receive more information.

The 2.4 GHz spectrum for BTLE extends from 2402 MHz to 2480 MHz and uses 40 1 MHz wide channels, numbered 0 to 39. Each channel is separated by 2 MHz. Channels 37, 38, and 39 are used only for sending advertisement packets. The rest are used for data exchange during a connection. During a BTLE advertisement, a BTLE peripheral device transmits packets on the 3 advertising channels one after the other. A central device scanning for devices or beacons will listen to those channels for the advertising packets, which helps it discover devices nearby. Channels 37, 38 and 39 are intentionally spread across the 2.4 GHz spectrum (i.e., channels 37 and 39 are the first and last channels in the band and channel 38 is in the middle). If any single advertising channel is blocked, the other channels are likely to be free since they are separated by several MHz of bandwidth.

When an IoT device has data to be transmitted, it would normally include a flag as part of its advertisement packets to indicate that data is ready to be sent. In one embodiment of the invention, rather than using this flag, an IoT device adjusts the advertising interval to indicate that it has pending data. For example, if T is the time between advertisement packets when no data is pending, a different advertising interval such as 0.75 T, 0.5 T, or 1.25 T may be selected to indicate that data is pending. In one embodiment, the two different intervals are programmable based on the specific requirements of the application and to make it harder to determine which interval means which state.

Figure 24:
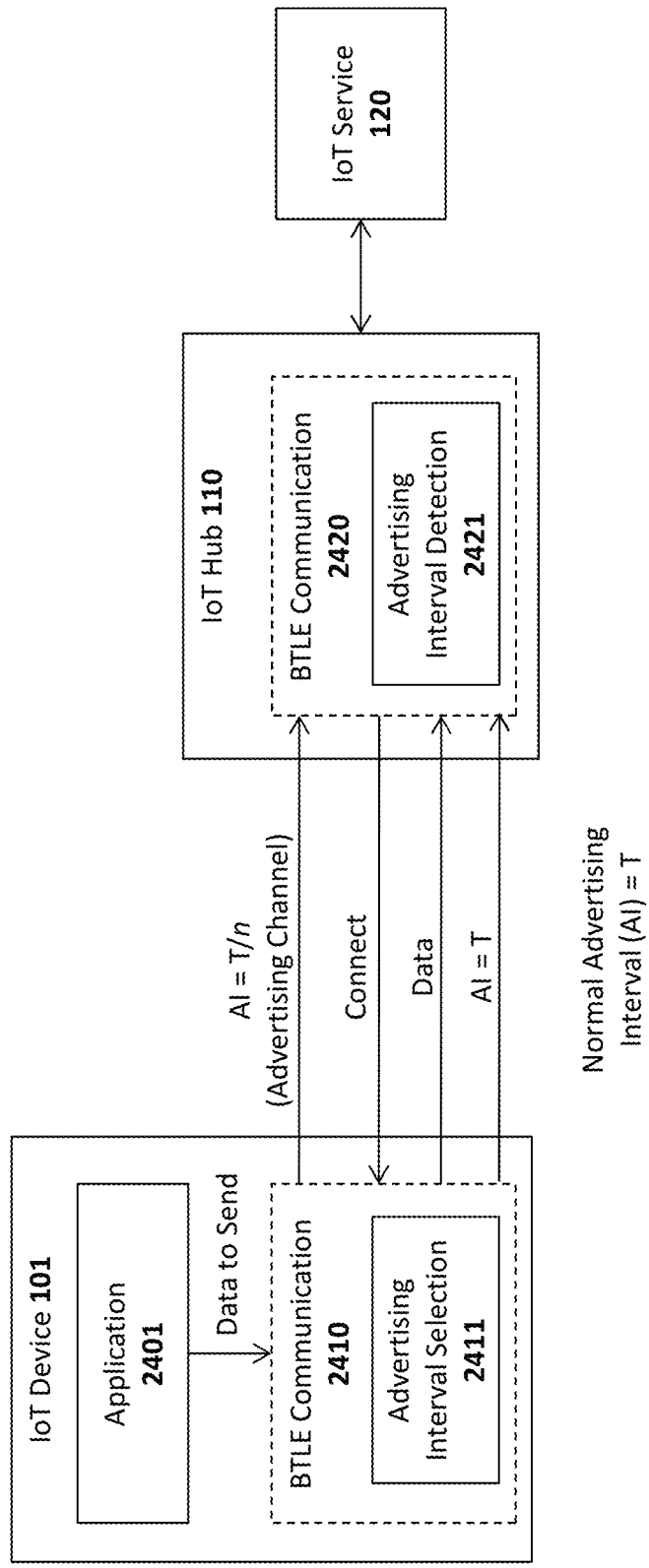
FIG. 24 illustrates one embodiment of the invention for adjusting an advertising interval to identify a data transmission condition.

FIG. 24 illustrates one embodiment of an IoT device 101 in which the BTLE communication interface 2410 includes advertising interval selection logic 2411 which adjusts the advertising interval when data is ready to be transmitted. In addition, the BTLE communication interface 2420 on the IoT hub 110 includes advertising interval detection logic 2421 to detect the change in the advertising interval, provide an acknowledgement, and receive the data.

In particular, in the illustrated embodiment, an application 2401 on the IoT device 101 indicates that it has data to be sent. In response, the advertising interval selection logic 2411 modifies the advertising interval to notify the IoT hub 110 that data is to be transmitted (e.g., changing the interval to .75T or some other value). When the advertising interval detection logic 2421 detects the change, the BTLE communication interface 2420 connects to the BTLE communication interface 2410 of the IoT device 101, indicating that it is ready to receive the data. The BTLE communication interface 2410 of the IoT device 101 then transmits the data to the BTLE communication interface 2420 of the IoT hub. The IoT hub may then pass the data through to the IoT service 120 and/or to the user's client device (not shown). After the data has been transmitted, the advertising interval selection logic 2411 may then revert back to the normal advertising interval (e.g., AI=T).

In one embodiment of the invention, a secure communication channel is established between the IoT device 101 and the IoT service 120 using one or more of the security/encryption techniques described above (see, e.g., FIGS. 16A-23C and associated text). For example, in one embodiment, the IoT service 120 performs a key exchange with the IoT device 101 as described above to encrypt all communication between the IoT device 101 and the IoT service 120.

Figure 25:
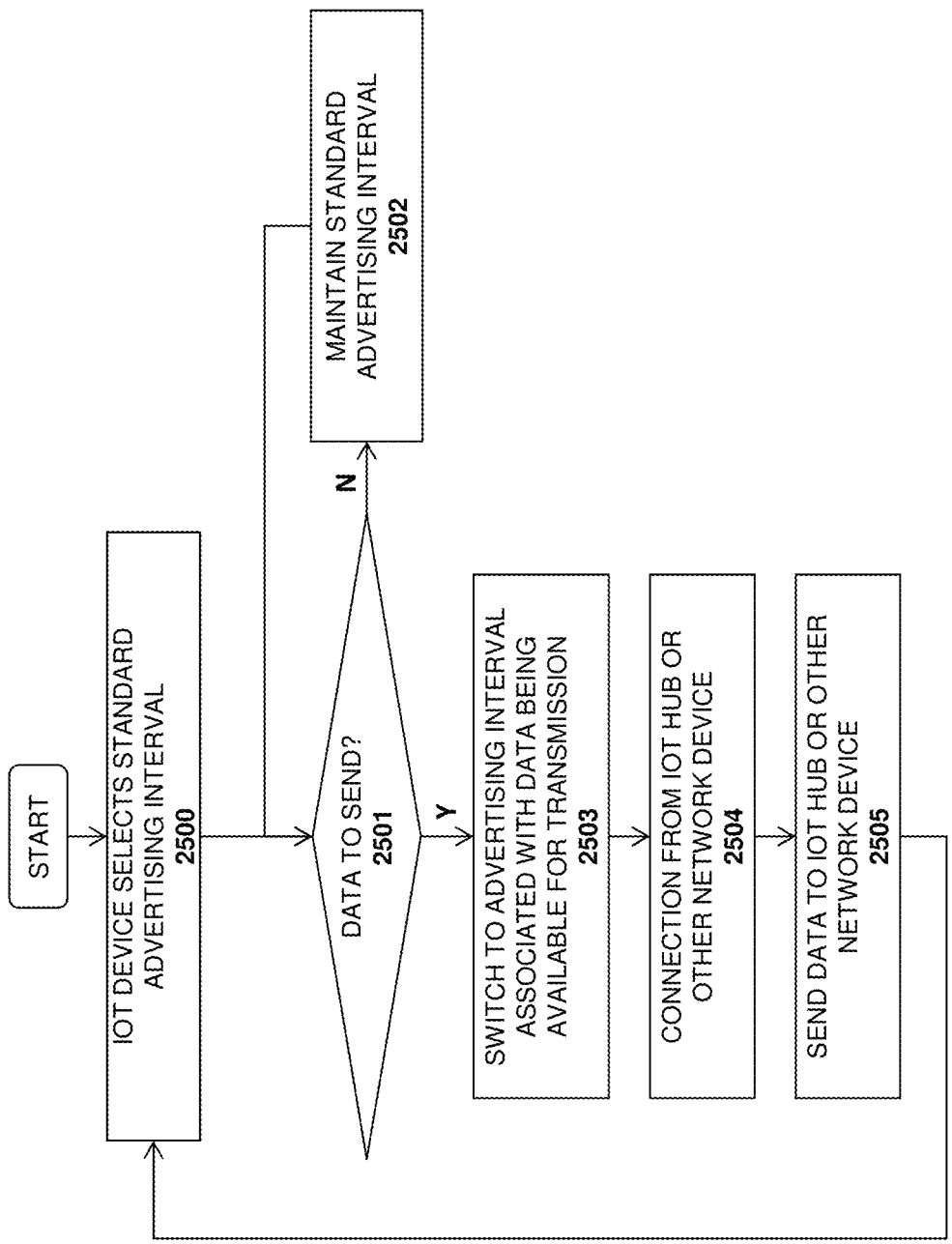
FIG. 25 illustrates a method in accordance with one embodiment of the invention.

A method in accordance with one embodiment of the invention is illustrated in FIG. 25. The method may be implemented within the context of the system architectures described above, but is not limited to any particular system architectures.

At 2500, the IoT device uses the standard advertising interval when generating advertising packets (e.g., separated by time T). The IoT device maintains the standard advertising interval at 2502 until it has data to send, determined at 2501. Then, at 2503, the IoT device switches the advertising interval to indicate that it has data to transmit. At 2504, the IoT hub or other network device establishes a connection with the IoT device, thereby allowing the IoT device to transmit its data. Finally, at 2505, the IoT device transmits its pending data to the IoT hub.

It should be noted that while the advertising interval techniques are described herein within the context of the BTLE protocol, the underlying principles of the invention are not limited to BTLE. In fact, the underlying principles of the invention may be implemented on any system which selects an advertising interval for establishing wireless communication between devices.

In addition, while a dedicated IoT hub 110 is illustrated in many embodiments above, a dedicated IoT hub hardware platform is not required for complying with the underlying principles of the invention. For example, the various IoT hubs described above may be implemented as software executed within various other networking devices such as iPhones® and Android® devices. In fact, the IoT hubs discussed above may be implemented on any device capable of communicating with IoT devices (e.g., using BTLE or other local wireless protocol) and establishing a connection over the Internet (e.g., to an IoT service using a WiFi or cellular data connection).

SYSTEM AND METHOD FOR REDUCING WIRELESS TRAFFIC WHEN CONNECTING AN IOT HUB TO AN IOT DEVICE

When multiple IoT hubs are configured in a particular location, a single IoT device may have the ability to connect with each IoT hub within range. As mentioned, an IoT device may use an advertising channel to notify any IoT hubs within range that it is "connectable" so that an IoT hub may connect to it to transmit commands and/or data. When multiple IoT hubs are within range of an IoT device, the IoT service may attempt to transmit commands/data addressed to the IoT device through each of these IoT hubs, thereby wasting wireless bandwidth and reducing performance (e.g., due to interference resulting from the multiple transmissions).

To address this issue, one embodiment of the invention implements techniques to ensure that once a particular IoT hub has successfully connected to the IoT device, the other IoT hubs will be notified to stop attempting to transmit the commands/data. This embodiment will be described with respect to FIGS. 26A-C which shows an exemplary set of IoT hubs 110-112 all of which are within range of an IoT device 101. As a result, the secure wireless communication module 2610 of the IoT device 101 is capable of seeing and connecting to the secure wireless communication modules 2650-2652 of each of the IoT hubs 110-112. In one embodiment, the secure wireless communication modules comprise the secure BTLE modules described above. However, the underlying principles of the invention are not limited to any particular wireless standard.

Figure 26A:
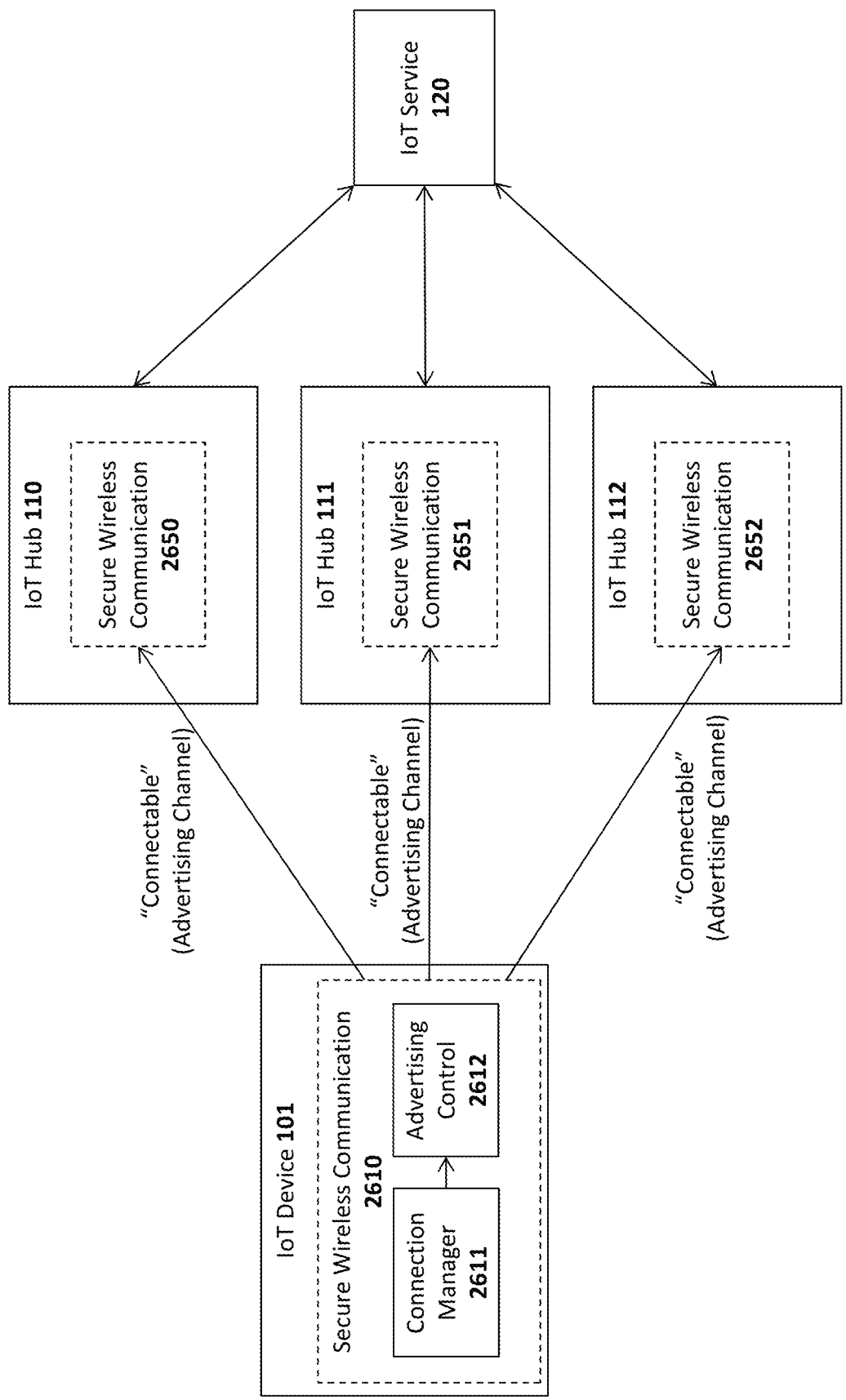
FIGS. 26A-C illustrate the operation of one embodiment in which multiple IoT hubs attempt to transmit data/commands to an IoT device.

As illustrated in FIG. 26A, in one embodiment, the secure wireless communication module 2610 of the IoT device 101 includes advertising control logic 2610 to periodically transmit an advertising beacon to nearby wireless communication devices indicating that it is "connectable" (i.e., may be connected to by any devices within range). Any IoT hubs 110-112 which receive the advertising beacon are then aware of the IoT device 101 and the secure wireless communication modules 2650-2652 may connect to the secure wireless communication module 2610 of the IoT device 101 when commands/data have been addressed to the IoT device 101 by the IoT service.

Figure 26B:
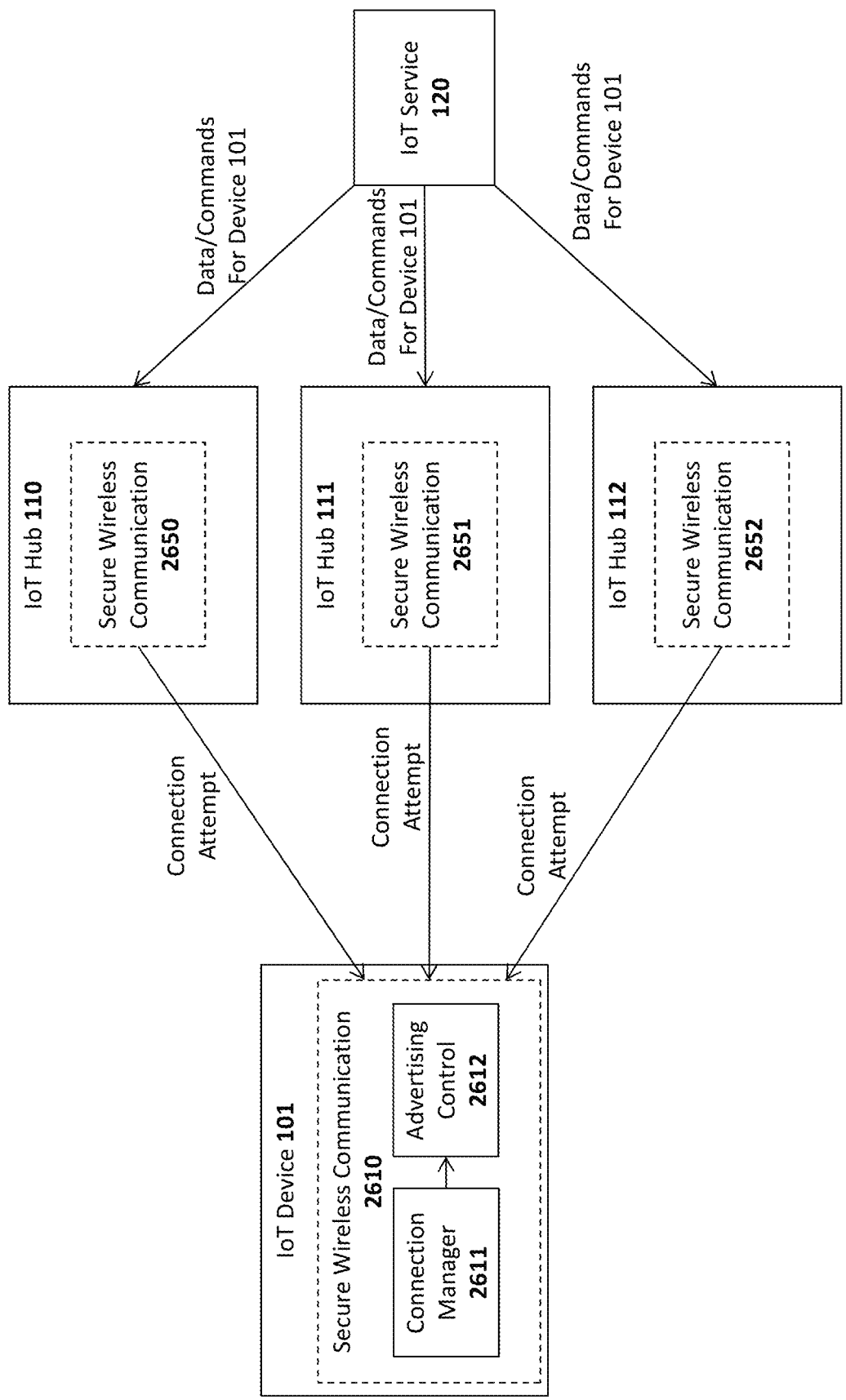

As illustrated in FIG. 26B, in one embodiment, when the IoT service has data/commands for the IoT device 101 it may transmit the data/commands to all of the IoT hubs 110-112 within the particular location (e.g., all IoT hubs associated with the user's account and/or within range of the IoT device 101). As illustrated, each of the IoT hubs 110-112 may then attempt to connect with the IoT device 101 to provide the commands/data.

Figure 26C:
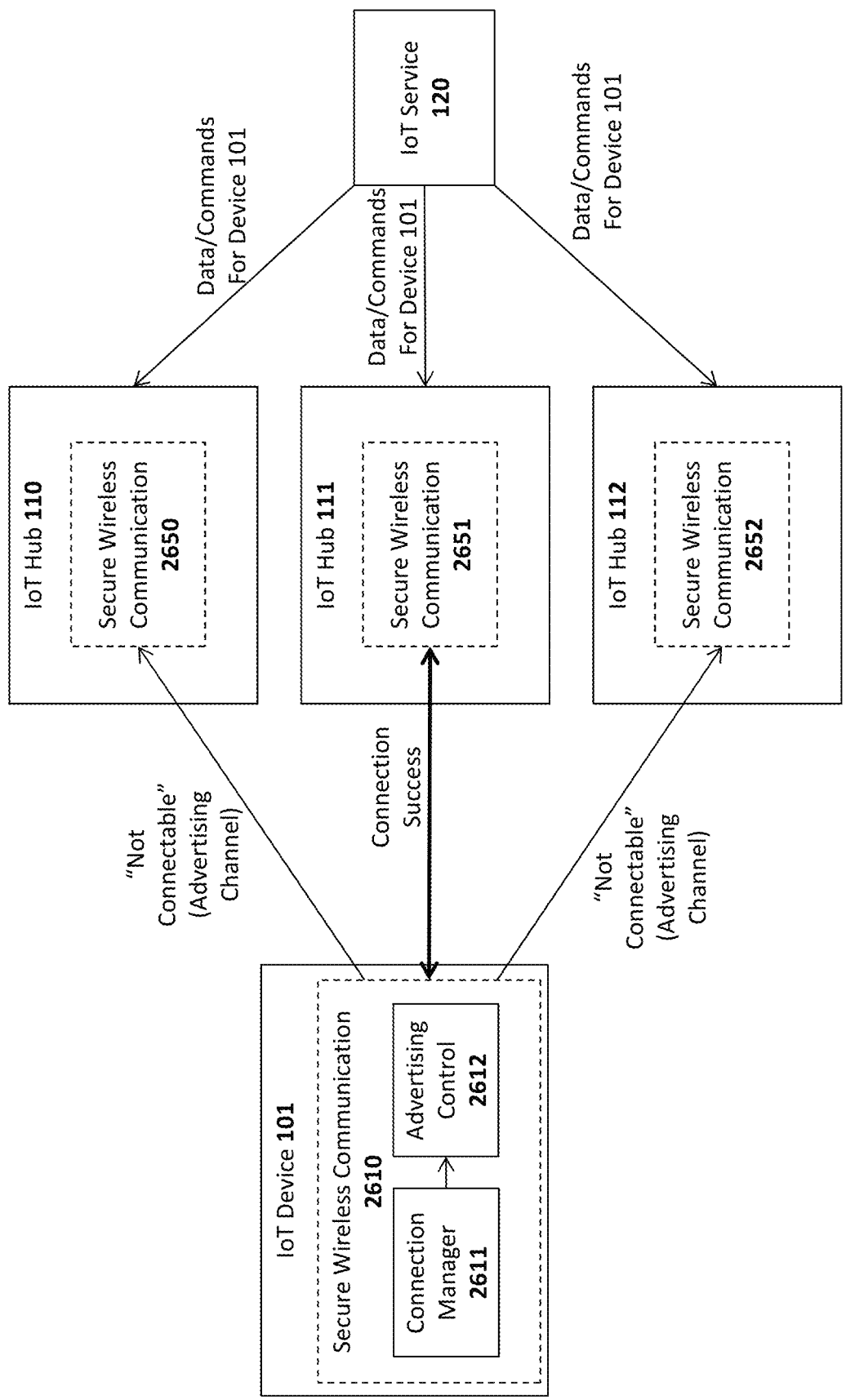

As illustrated in FIG. 26C, in one embodiment, only a single IoT hub 111 will successfully connect to the IoT device 101 and provide the commands/data for processing by the IoT device 101. With certain wireless communication protocols such as BTLE, once a connection has been made, the secure wireless communication module 2610 will stop transmitting advertising beacons. As such, the other IoT hubs 110, 112 will not have any way of knowing that the IoT device 101 has successfully received the data from IoT hub 111 and will continue to attempt to transmit the commands/data, thereby consuming wireless bandwidth and creating interference.

To address this limitation, one embodiment of the secure wireless communication module 2610 includes a connection manager 2611 which, upon detecting a successful connection with the secure wireless communication module 2651 of the IoT hub 111, causes the advertising control module 2612 to continue transmitting advertising beacons. However, instead of indicating that the IoT device 101 is "connectable," the new advertising beacons indicate that the IoT device 101 is "not connectable." In one embodiment, in response to the "not connectable" indication, the secure wireless communication modules 2650, 2652 of the IoT hubs 110, 112 will stop attempting to transmit the commands/data to the IoT device, thereby reducing unnecessary wireless traffic.

The above techniques provide an elegant solution to undesirable wireless traffic using techniques which may be readily implemented on top of existing wireless protocols. For example, in one embodiment, the "connectable" and "not connectable" indications are implemented within the context of the BTLE standard. However, as mentioned, the underlying principles of the invention may be implemented using a variety of different wireless network protocols.

A method in accordance with one embodiment of the invention is illustrated in FIG. 27. The method may be implemented within the context of the system architectures described above, but is not limited to any particular system architecture.

At 2701, commands and/or data are transmitted from the IoT service through two or more IoT hubs. For example, the user may be attempting to control an IoT device via an app on the user's mobile device, which is connected to the IoT service. At 2702, the IoT hubs attempt to connect to the IoT device and one of the IoT hubs successfully connects and provides the commands/data to the IoT device. As mentioned, the IoT hubs may be aware of the IoT device as a result of the IoT device transmitting a "connectable" indication in an advertising beacon.

At 2703, in response to a successful connection, the IoT device begins transmitting a "not connectable" advertising beacon, thereby informing any IoT hubs within range that the IoT device is no longer connectable. At 2704, upon receipt of the "not connectable" beacon, the other IoT hubs stop attempting to transmit the commands/data to the IoT device.

SYSTEM AND METHOD FOR SECURE INTERNET OF THINGS (IoT) DEVICE PROVISIONING

As mentioned above, in one embodiment, when device advertises to an IoT hub, it uses an 8-byte "device ID" which the hub and the IoT service uses to uniquely identify the IoT device. The device ID may be included within the unique barcode or QR code printed on the IoT device which is read and transmitted to the IoT service to provision/register the IoT device in the system. Once provisioned/registered, the device ID is used to address the IoT device in the system.

One security concern with this implementation is that because the barcode/QR code data may be transmitted without encryption, it may be possible to sniff the wireless transmission of the device ID to compromise the system, thereby allowing another user to associate the device ID with his/her account.

Figure 28:
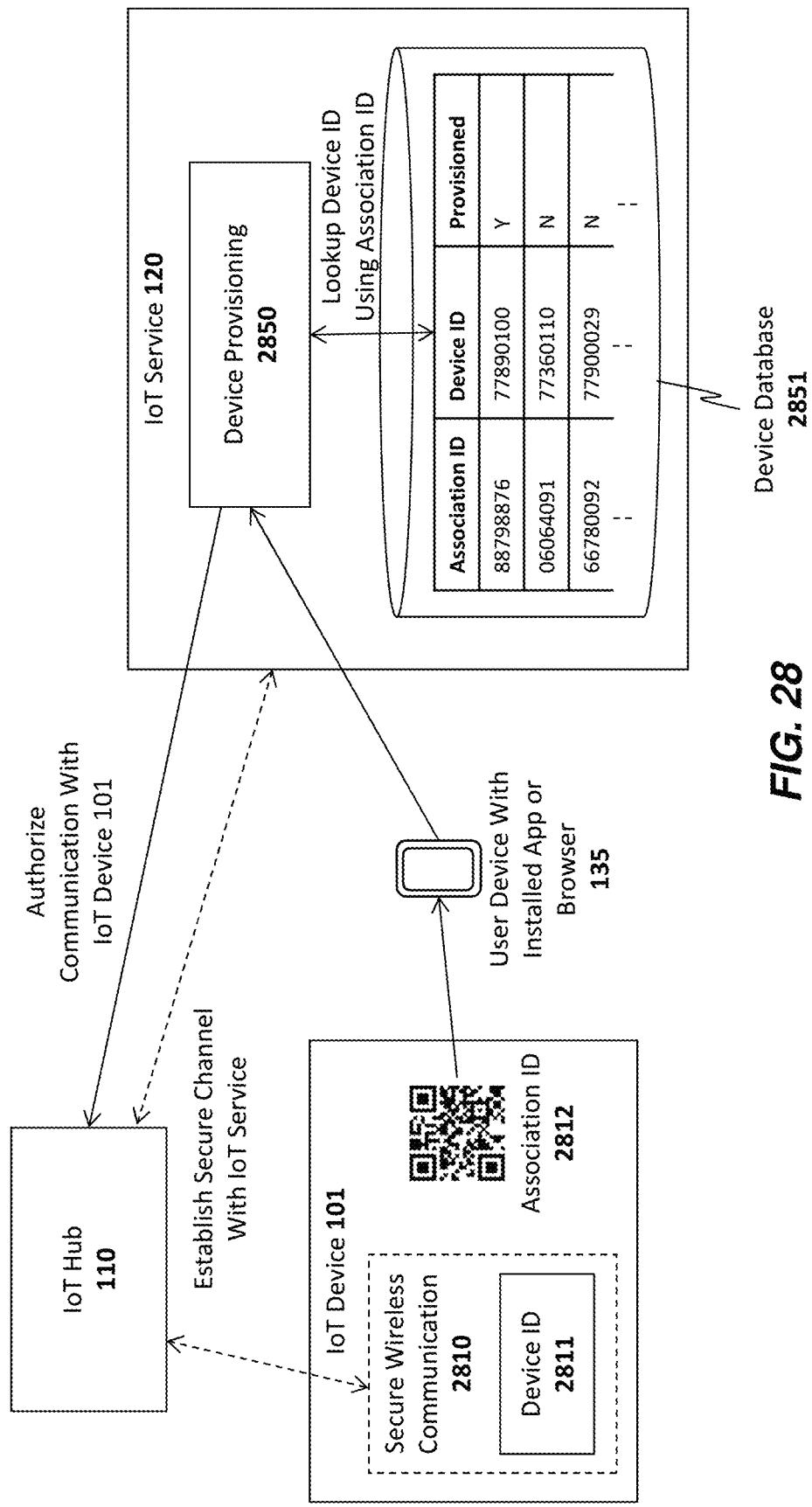
FIG. 28 illustrates one embodiment of a system for secure IoT device provisioning.

In one embodiment, to address this concern, an "association ID" is associated with each device ID and used during the provisioning process to ensure that the device ID is never transmitted in the clear. As illustrated in FIG. 28, in this embodiment, the association ID 2812 is included in the barcode/QR code printed on the IoT device 101 while the device ID 2811 is maintained securely within the secure wireless communication module 2810 which implements the techniques described above to ensure secure communication with the IoT service 120. In one embodiment, the association ID 2812 is an 8 byte ID like the device ID and is unique per IoT device. When a new IoT device 101 is provisioned in the system, the user scans the barcode/QR code containing the association ID 2812 with a user device 135 having an IoT app or application installed thereon. Alternatively, or in addition, the IoT hub 110 may be used to capture the barcode/QR code including the association ID.

In either case, the association ID is transmitted to a device provisioning module 2850 on the IoT service 120 which performs a lookup in a device database 2851 which includes an association between each association ID and each device ID. The device provisioning module 2850 uses the association ID 2812 to identify the device ID 2811 and then uses the device ID to provision the new IoT device 101 in the system. In particular, once the device ID has been determined from the device database 2851, the device provisioning module 2850 transmits a command to the IoT hubs 110 (which may include the user device 135) authorizing the IoT hubs 110 to communicate with the IoT device 101 using the device ID 2811.

In one embodiment, the association ID 2812 is generated at a factory when the IoT device 101 is manufactured (i.e., when the secure wireless communication module 2810 is provisioned). Both the device ID 2811 and the association ID 2812 may then be provided to the IoT service and stored within the device database 2851. As illustrated, the device database 2851 may include an indication specifying whether each device has been provisioned. By way of example, this may be a binary value with a first value (e.g., 1) indicating that the IoT device 101 is provisioned and a second value (e.g., 0) indicating that the IoT device is not provisioned. Once the system has provisioned/registered the IoT device 101, the device ID may be used because the communication between the IoT service 120 and IoT device 101 is protected using the security techniques described above.

In one embodiment, when a user sells an IoT device, the user may release the device ID by logging in to the IoT service 120 and releasing the IoT device from the user's account. The new user may then provision the IoT device and associate the IoT device with his/her account using the device provisioning techniques described herein.

Figure 29:
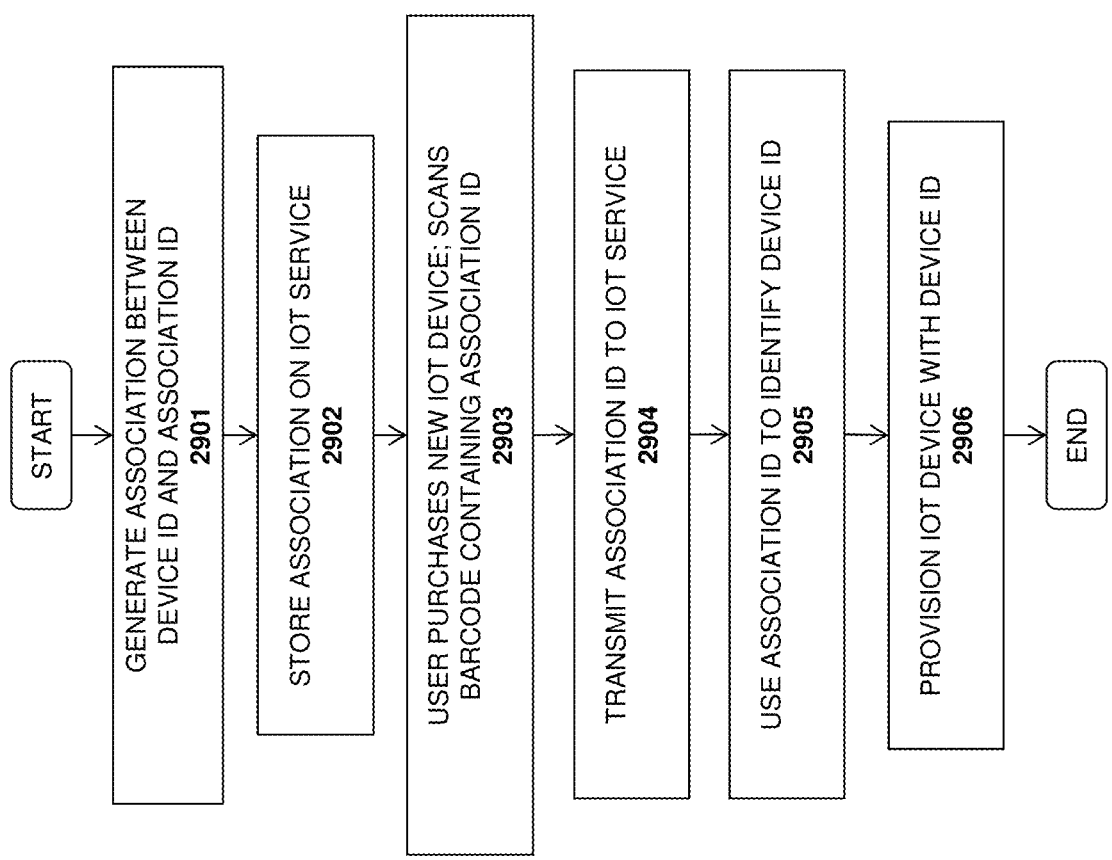
FIG. 29 illustrates a method in accordance with one embodiment of the invention.

A method in accordance with one embodiment of the invention is illustrated in FIG. 29. The method may be implemented within the context of the system architectures described above, but is not limited to any particular system architecture.

At 2901, an association is generated between a device ID and an association ID of an IoT device (e.g., at the factory at which the IoT device is manufactured). The association ID may be embedded within a barcode/QR code which is stamped on the IoT device. At 2902, the association between the device ID and association ID is stored on the IoT service. At 2903, the user purchases the new IoT device and scans the barcode/QR code containing the association ID (e.g., via the user's mobile device with an app or application installed thereon or via an IoT hub with a barcode reader).

At 2904, the association ID is transmitted to the IoT service and, at 2905, the association ID is used to identify the device ID. At 2906, the IoT device is provisioned using the device ID. For example, the IoT device database may be updated to indicate that this particular device ID has been provisioned and the IoT service may communicate the device ID to IoT hubs, instructing the IoT hubs to communicate with the new IoT device.

SYSTEM AND METHOD FOR PERFORMING FLOW CONTROL IN AN INTERNET OF THINGS (IO) SYSTEM

Local wireless network traffic will increase based on the number of IoT devices within a given location. Moreover, in some instances, an IoT device may be transmitting more data than is reasonable given the function being performed by the IoT device. For example, software/hardware on the IoT device may malfunction, or the IoT device may be hacked, causing the IoT device to continually transmit unneeded data to the IoT service.

One embodiment of the invention addresses these issues by performing flow control at the IoT hubs, effectively ignoring data traffic when specified data thresholds have been reached by a particular IoT device. In one embodiment, each IoT device is configured with a specified set of flow control parameters indicating the amount of data over a period of time which the IoT device is permitted to transmit. The flow control parameters may be based on the type of IoT device. For example, certain IoT devices such as door locks and thermostats should typically only transmit short packets of data periodically whereas other IoT device such as video cameras may transmit a significantly greater amount of data, potentially in a non-periodic manner. Thus, the flow control parameters may be set to provide a sufficient amount of bandwidth based on the expected operation of the IoT device in question. In one embodiment, each IoT device is assigned to a particular flow control "class" based on the data requirements of that IoT device.

Figure 30:
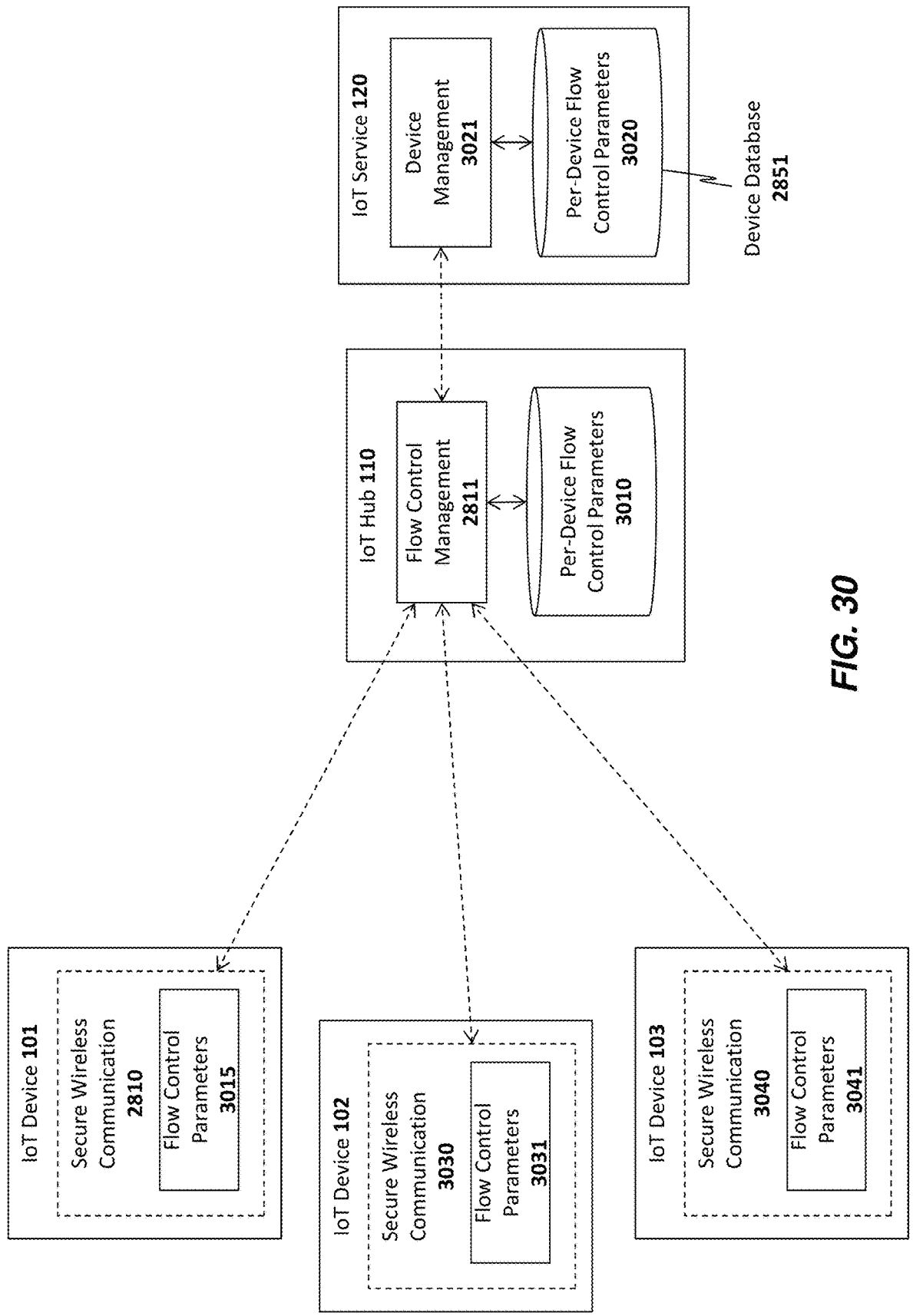
FIG. 30 one embodiment of a system for performing flow control for a plurality of IoT devices.

Once such embodiment is illustrated in FIG. 30, which shows a plurality of IoT device 101-103 with secure wireless communication modules 2810, 3030, 3040 configured with different sets of flow control parameters 3015, 3031, 3041, respectively. In one embodiment, the flow control parameters specify the frequency and/or amount of data which each IoT device is expected to transmit over a specified period of time (e.g., 0.25 Mbytes/hour, 50 Mbytes/hour, 100 Mbytes/day, 10 communication attempts/day, etc). In one embodiment, the flow control parameters 3015, 3031, 3041, may be specified by the IoT service 120 which, as illustrated, includes device management module 3021 to manage a set of per-device flow control parameters 3020 within an IoT device database 2851. For example, once the data transmission requirements for each IoT device are determined, the per-flow control parameters 3020 may be updated to reflect these requirements.

As mentioned, in one embodiment, the device database 2851 includes data transmission requirements for a plurality of different flow control "classes" (e.g., audiovisual device, temperature device, control device, security device, etc). When a new IoT device is introduced in the system, it is then associated with a particular flow control class based on the requirements of the IoT device and/or the type of IoT device.

The per-device flow control parameters 3020 may be distributed to IoT hubs 110 which include flow control management logic 2811 to store a copy of the per-device flow control parameters 3010 within a local database. In one embodiment, the flow control management 2811 may monitor the amount of data traffic received from and/or transmitted to each IoT device 101-103. If the amount of data traffic reaches a specified threshold (as indicated by the per-device flow control parameters 3010) then the IoT hub 110 may instruct the IoT device to stop transmitting for a period of time and/or may simply block traffic from the IoT device.

If a particular IoT device is transmitting/receiving at a level above the specified threshold, then this may indicate that the IoT device is malfunctioning. As such, in one embodiment, the IoT service 120 may transmit a command to reset the IoT device. If the device is still communicating at a level above the threshold, then the IoT service 120 may transmit a software update such as a patch to the IoT device. Once the software updated is installed, the IoT device is reset and initialized with the new software. In addition, a notification may be sent from the IoT service to the user device to inform the user that the IoT device is malfunctioning.

In one embodiment, the IoT hub 110 may allow certain types of data traffic notwithstanding the fact that data communication thresholds have been reached. For example, in one embodiment, the IoT hub 110 will permit certain types of "high priority" notifications even if an IoT device has reached its thresholds. By way of example, if the IoT device is a door lock or door entry detector, then under certain conditions (e.g., when the house is being monitored), the IoT hub 110 may pass through data indicating that someone has opened the door in which the IoT device is being used. Similarly, if the IoT device is a heat and/or smoke detector, then the IoT hub 110 may pass through data indicating an alarm condition (e.g., because the temperature has reached a threshold value). Various other types of "high priority" notifications (e.g., such as those representing a potentially hazardous condition) may be passed through by the IoT hub 110 regardless of the current flow control status. In one embodiment, these "high priority" notifications are identified using different attributes as described below.

Figure 31:
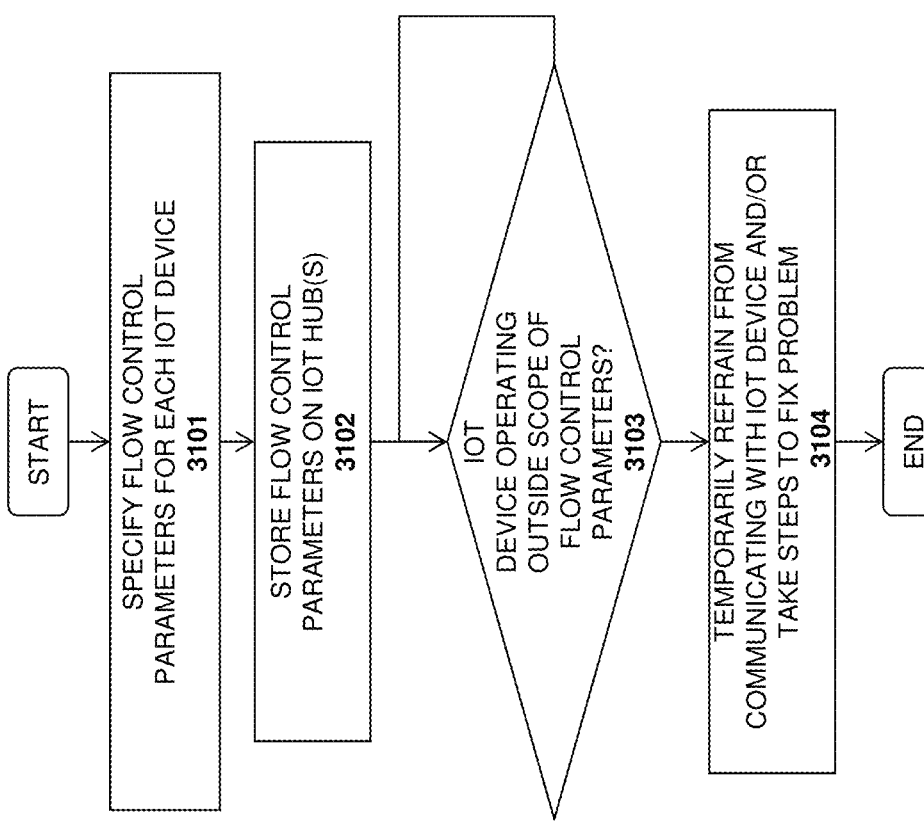
FIG. 31 illustrates a method in accordance with one embodiment of the invention.

A method in accordance with one embodiment of the invention is illustrated in FIG. 31. The method may be implemented within the context of the system architectures described above, but is not limited to any particular system architecture.

At 3101, flow control parameters are specified for each IoT device. In one embodiment, and IoT device may be assigned to a particular IoT device "class" which has a specified set of flow control parameters associated therewith. At 3102, the flow control parameters are stored on IoT hubs within the IoT system. In one embodiment, each hub may store a subset of all of the IoT device parameters (e.g., only those parameters for IoT devices that have been provisioned locally).

If an IoT hub detects that a particular IoT device is operating outside of the specified flow control parameters, determined at 3103, then AT 3104 the IoT hub will temporarily refrain from further communication with the IoT device (e.g., blocking communication between the IoT device and the IoT service). In addition, as mentioned, the IoT service and/or IoT hub may take steps to remedy the problem by rebooting the IoT device and/or installing a software update on the IoT device.

SYSTEM AND METHOD FOR MANAGING INTERNET OF THINGS (IoT) DEVICES AND TRAFFIC USING ATTRIBUTE CLASSES

Different IoT devices may be used to perform different functions in a given location. For example, certain IoT devices may be used to collect data such as temperature and status (e.g., on/off status) and report this data back to the IoT service, where it may be accessed by an end user and/or used to generate various types of alert conditions. To enable this implementation, one embodiment of the invention manages collected data, system data, and other forms of data using different types of attribute classes.

Figure 32:
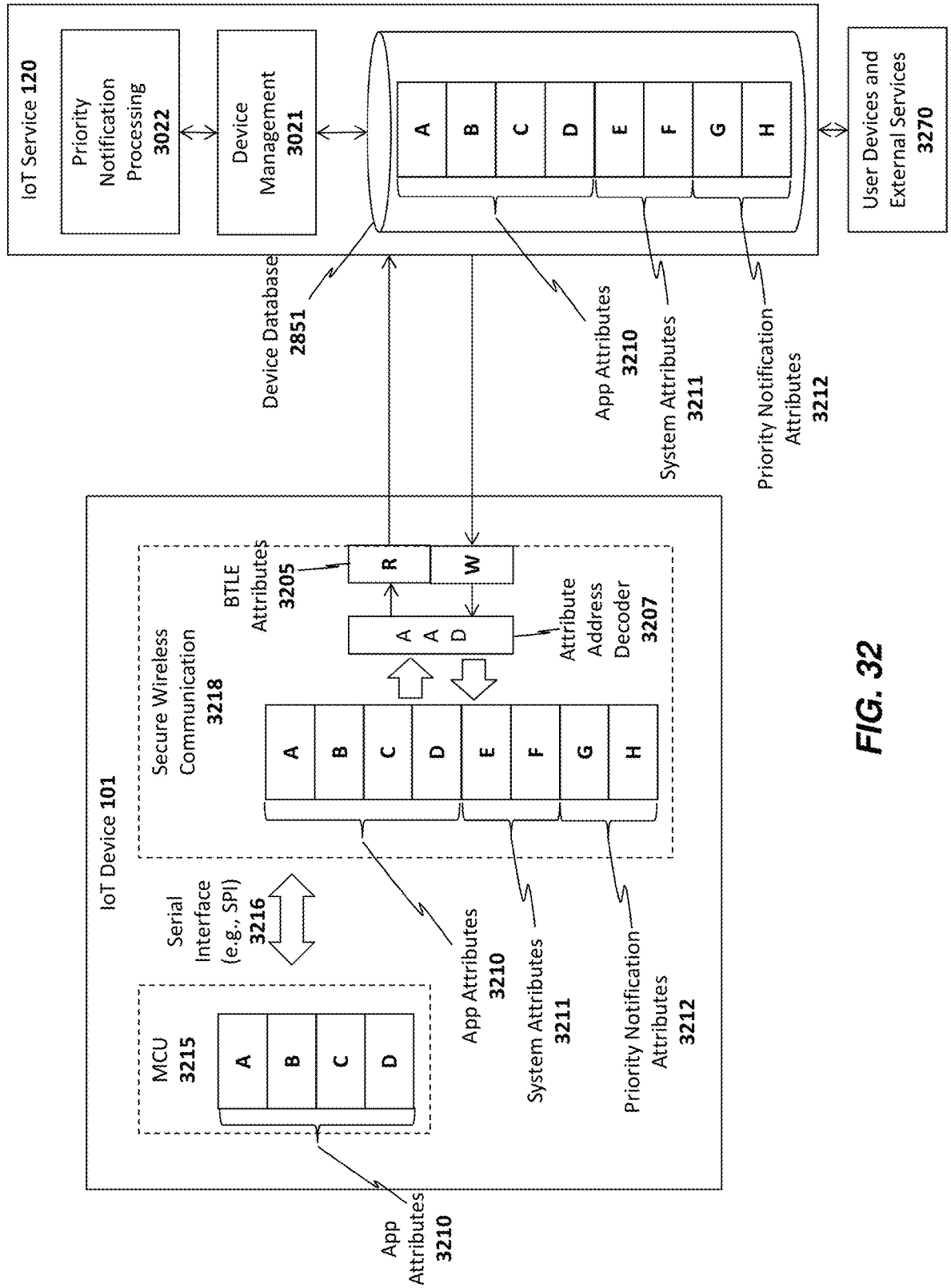
FIG. 32 illustrates one embodiment of a system for managing application attributes, system attributes, and priority notification attributes.

FIG. 32 illustrates one embodiment of an IoT device which includes a secure wireless communication module 3218 which communicates with a microcontroller unit (MCU) 3215 over a serial interface 3216 such as an Serial Peripheral Interface (SPI) bus. The secure wireless communication module 3218 manages the secure communication with the IoT service 120 using the techniques described above and the MCU 3215 executes program code to perform an application-specific function of the IoT device 101.

In one embodiment, various different classes of attributes are used to manage the data collected by the IoT device and the system configuration related to the IoT device. In particular, in the example shown in FIG. 32, the attributes include application attributes 3210, system attributes 3211, and priority notification attributes 3212. In one embodiment, the application attributes 3210 comprise attributes related to the application-specific function performed by the IoT device 101. For example, if the IoT device comprises a security sensor, then the application attributes 3210 may include a binary value indicating whether a door or window has been opened. If the IoT device comprises a temperature sensor, then the application attributes 3210 may include a value indicating a current temperature. A virtually unlimited number of other application-specific attributes may be defined. In one embodiment, the MCU 3215 executes application-specific program code and is only provided with access to the application-specific attributes 3210. For example, an application developer may purchase the IoT device 101 with the secure wireless communication module 3218 and design application program code to be executed by the MCU 3215. Consequently, the application developer will need to have access to application attributes but will not need to have access to the other types of attributes described below.

In one embodiment, the system attributes 3211 are used for defining operational and configuration attributes for the IoT device 101 and the IoT system. For example, the system attributes may include network configuration settings (e.g., such as the flow control parameters discussed above), the device ID, software versions, advertising interval selection, security implementation features (as described above) and various other low level variables required to allow the IoT device 101 to securely communicate with the IoT service.

In one embodiment, a set of priority notification attributes 3212 are defined based on a level of importance or severity associated with those attributes. For example, if a particular attribute is associated with a hazardous condition such as a temperature value reaching a threshold (e.g., when the user accidentally leaves the stove on or when a heat sensor in the user's home triggers) then this attribute may be assigned to a priority notification attribute class. As mentioned above, priority notification attributes may be treated differently than other attributes. For example, when a particular priority notification attribute reaches a threshold, the IoT hub may pass the value of the attribute to the IoT service, regardless of the current flow control mechanisms being implemented by the IoT hub. In one embodiment, the priority notification attributes may also trigger the IoT service to generate notifications to the user and/or alarm conditions within the user's home or business (e.g., to alert the user of a potentially hazardous condition).

As illustrated in FIG. 32, in one embodiment, the current state of the application attributes 3210, system attributes 3211 and priority notification attributes 3212 are duplicated/mirrored within the device database 2851 on the IoT service 120. For example, when a change in one of the attributes is updated on the IoT device 101, the secure wireless communication module 3218 communicates the change to the device management logic 3021 on the IoT service 120, which responsively updates the value of the attribute within the device database 2851. In addition, when a user updates one of the attributes on the IoT service (e.g., adjusting a current state or condition such as a desired temperature), the attribute change will be transmitted from the device management logic 3021 to the secure wireless communication module 3218 which will then update its local copy of the attribute. In this way, the attributes are maintained in a consistent manner between the IoT device 101 and the IoT service 120. The attributes may also be accessed from the IoT service 120 via a user device with an IoT app or application installed and/or by one or more external services 3270. As mentioned, the IoT service 120 may expose an application programming interface (API) to provide access to the various different classes of attributes.

In addition, in one embodiment, priority notification processing logic 3022 may perform rule-based operations in response to receipt of a notification related to a priority notification attribute 3212. For example, if a priority notification attribute indicates a hazardous condition (e.g., such as an iron or stove being left on by the user), then the priority notification processing logic 3022 may implement a set of rules to attempt to turn off the hazardous device (e.g., sending an "off" command to the device if possible). In one embodiment, the priority notification processing logic 3022 may utilize other related data such as the current location of the user to determine whether to turn off the hazardous device (e.g., if the user is detected leaving the home when the hazardous device in an "on" state). In addition, the priority notification processing logic 3022 may transmit an alert condition to the user's client device to notify the user of the condition. Various other types of rule sets may be implemented by the priority notification processing logic 3022 to attempt to address a potentially hazardous or otherwise undesirable condition.

Also shown in FIG. 32 is a set of BTLE attributes 3205 and an attribute address decoder 3207. In one embodiment, the BTLE attributes 3205 may be used to establish the read and write ports as described above with respect to FIGS. 19-20. The attribute address decoder 3207 reads a unique ID code associated with each attribute to determine which attribute is being received/transmitted and process the attribute accordingly (e.g., identify where the attribute is stored within the secure wireless communication module 3218).

SYSTEM AND METHOD FOR ESTABLISHING SECURE COMMUNICATION CHANNELS WITH INTERNET THINGS (IOT) DEVICES

A. Fake Advertising

In certain instances, it may be possible for It is possible for an attacker to use a fake IoT device to advertise the same advertising data as a real IoT device that is in a steady state (i.e., no data to send). If this advertising packet is sent using a stronger signal than the real one, a hub may be controlled to never attempt to connect to the real IoT device. In the case of the door sensor, for example, the attacker can then open the door without being detected.

In one embodiment of the invention, each IoT device adds a cryptographic secret to its advertising data which is made available to all IoT hubs so they can distinguish real IoT devices from fake IoT devices. In one embodiment, the cryptographic secret is set as a system attribute so that it will be first made available to the IoT service, from which it can be distributed to each of the IoT hubs using SSL or other secure communication protocol.

Figure 33:
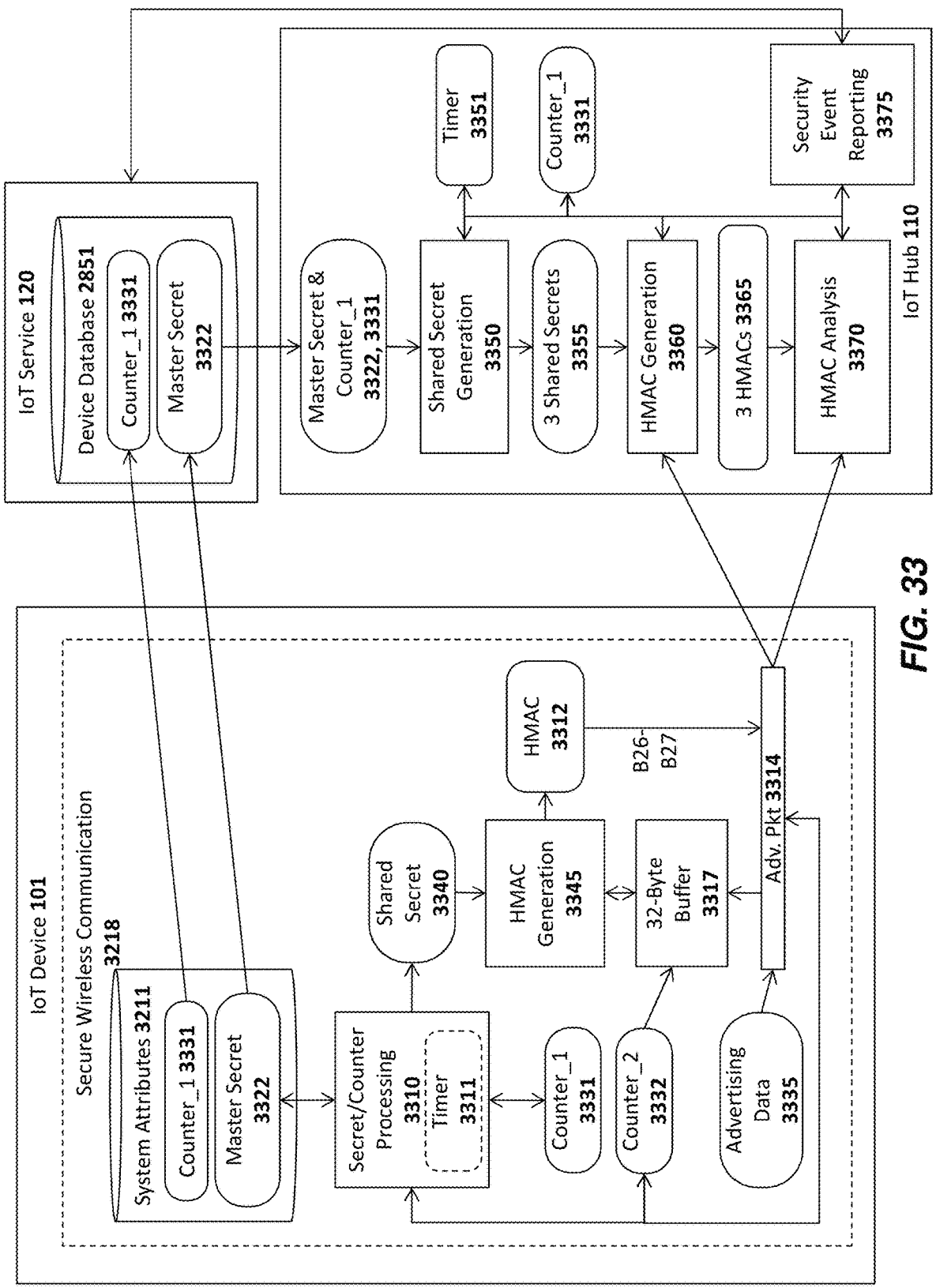
FIG. 33 illustrates one embodiment of a system and a corresponding method for secure wireless communication.

FIG. 33 illustrates operations performed by the IoT device 101, the IoT service 120, and an IoT hub 110 in accordance with one embodiment of the invention. At IoT device boot time, before the IoT device 101 is linked, the IoT device 101 may advertise to the IoT hub 110 with link request flags and connect request flags set and secret bytes set to 0 (indicating that a link/connection is being requested). A link is then made with an IoT hub or client device. After linking, secret-counter processing logic 3310 of the secure wireless communication module 3218 generates a 32 byte master secret 3322 and sets it on a system attribute 3211 to make it available to the IoT service 120 (e.g., using the attribute synchronization techniques described above).

The IoT service 120 can then make that secret available to IoT hubs 110 over SSL or another security protocol. The secret/counter processing logic 3310 creates a 32 byte counter, COUNTER_1 3331 and initializes it to 0. The secret/counter processing logic 3310 uses the 32 byte master secret 3322 in combination with the 32 byte COUNTER_1 3331 to create a 32 byte shared secret 3340. In one embodiment, keyed-hash message authentication code (HMAC)-SHA256 is used to generate the shared secret 3340 using the master secret as the key for the HMAC and COUNTER_1 as the data.

The secret/counter processing logic 3310 creates a 1 byte counter, COUNTER_2 3332, and initializes it to 0. In one embodiment, HMAC generation logic 3345 uses the shared secret to create an HMAC 3312 of the advertising flags and COUNTER_2 3332 (e.g., using SHA256). The key is the 32 bytes shared secret 3340 and the data is 32 bytes consisting of the manufacturer data from the advertising packet 3314 followed by COUNTER_2 3332 followed by a sequence of zeroes to pad out to 32 bytes. In one embodiment, a 32 byte buffer 3317 is created and zeroed out. Into the buffer it copies data from the advertising packet 3314 including the 2 byte manufacturer ID, the manufacturer data, including flags, device ID, protocol version. It also copies the current COUNTER_2 value 3332. The HMAC generation logic 3345 creates the HMAC 3312 using the shared secret 3340 as the key and the contents of the 32 byte buffer 3317 as the data.

In one embodiment, bytes 26 and 27 of the HMAC 3312 are placed into the advertising packet 3314 immediately following the COUNTER_2 value 3332. The secret/counter processing logic 3310 then sets a timer 3311 to fire based on the frequency specified in another system attribute (e.g., a timer attribute). In one embodiment, this period is 5 minutes.

In one embodiment, when the timer fires, the secret/counter processing logic 3310 increments the 32 byte COUNTER_1 and uses the 32 byte master secret in combination with the 32 byte COUNTER_1 to create a new 32 byte shared secret. The secret/counter processing logic 3310 increments the 1 byte COUNTER_2, creates a 32 byte buffer 3317 and zeroes it out. Into the buffer it copies the 2 byte manufacturer id, manufacturer data, including flags, device id, protocol version and the value of COUNTER_2. The HMAC generation logic 3345 creates an HMAC 3312 using the shared secret 3340 as the key and the 32 byte buffer 3317 as the data. Bytes 26 and 27 of the HMAC are placed into the advertising packet 3314 immediately following COUNTER_2 3332.

In one embodiment, when the advertising flags change, the secret/counter processing logic 3310 increments the 1 byte COUNTER_2, creates a 32 byte buffer 3317 and zeroes it out. Into the buffer 3317 it copies the 2 byte manufacturer ID, the manufacturer data, including flags, device ID, protocol version and COUNTER_2 3332. The HMAC generation 3345 An HMAC 3312 is created using the shared secret as the key and the 32 byte buffer as the data. Bytes 26 and 27 of the HMAC 3312 are placed into the advertising packet 3314 immediately following COUNTER_2 3332.

In one embodiment of the invention, the following security processing operations are performed on the IoT hub 110. When the IoT hub 110 receives the master secret 3322 and counter 1 3331 for the IoT device 101, shared secret generation logic 3350 uses the master secret and counter 1 (+ or −1) to generate and store three shared secrets 3355 for the IoT device 101. The hub 110 sets a timer 3351 to fire based on the frequency specified in another system attribute (e.g., 5 minutes in one embodiment). When the timer fires, the IoT hub 110 increments counter 1 and uses it (+ or −1) with the master secret 3322 to generate and store 3 new shared secrets 3355 for the IoT device 101.

In one embodiment, when the hub sees a new device for the first time, if the link and connect request bits are set in the advertising packet 3314, the secret bytes are ignored and the hub connects. If the secret bytes are not correct and the link request flag is clear, the hub flags nefarious activity to the service via security event reporting module 3375. If the IoT hub 110 does not have the shared secret for the peripheral it will ignore the peripheral until the master secret 3322 and counter 1 3331 values are received. If the IoT hub has the shared secrets for the IoT device, HMAC generation logic 3360 computes three HMACs 3365 based on the shared secrets 3355 and the flags and counter 2 3332 (from the advertising packet 3314).

In one embodiment, for each HMAC generated, HMAC analysis logic 3370 compares the first two bytes to the secret bytes in the advertising packet 3314. If no match is found, the security event reporting module 3375 reports nefarious activity to the IoT service 120, which may then transmit a notification to the end user's client.

In one embodiment, when the IoT hub sees only the secret bytes change (not flags or counter 2), it increments counter 1 3331, regenerates the shared secrets 3355, and restarts the timer 3351. HMAC generation logic 3360 generates new HMACs 3365 and HMAC analysis logic 3370 checks the new results against the current advertising packets 3314. If there is no match, the security event reporting logic 3375 reports nefarious activity to the IoT service 120.

When the IoT hub 110 detects changes to flags and/or counter 2 3332, the IoT hub compares the current shared secrets 3355 against the current advertising data 3314 (e.g., generating new HMACs 3365 to be analyzed by MHAC analysis module 3370). If the current shared secrets fail, the IoT hub increments counter 1, regenerates the shared secrets 3355, and restarts the timer 3351. The IoT hub then checks the new shared secrets 3355 against the current advertising data 3314. If there is no match, then the security event reporting module 3375 reports nefarious activity to the IoT service 120.

B. Fake IoT Hub

It might be possible for someone to use a fake IoT hub to connect to an IoT device. The connection will timeout eventually, but if an attacker keeps connecting to the IoT device, they may effectively hide it from real IoT hubs.

Figure 34:
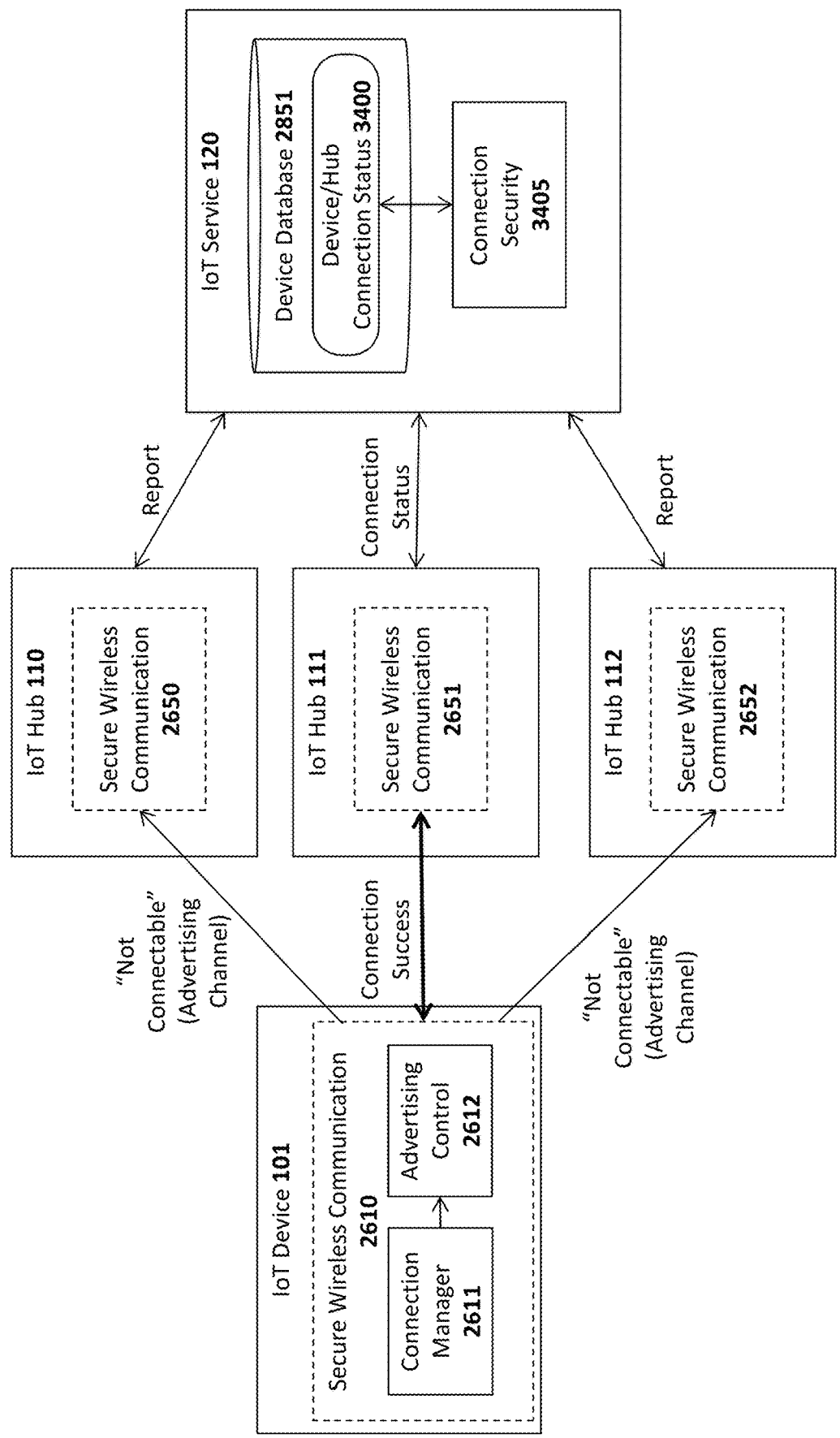
FIGS. 34-35 illustrate embodiments of the invention for detecting fake connections.
Figure 35:
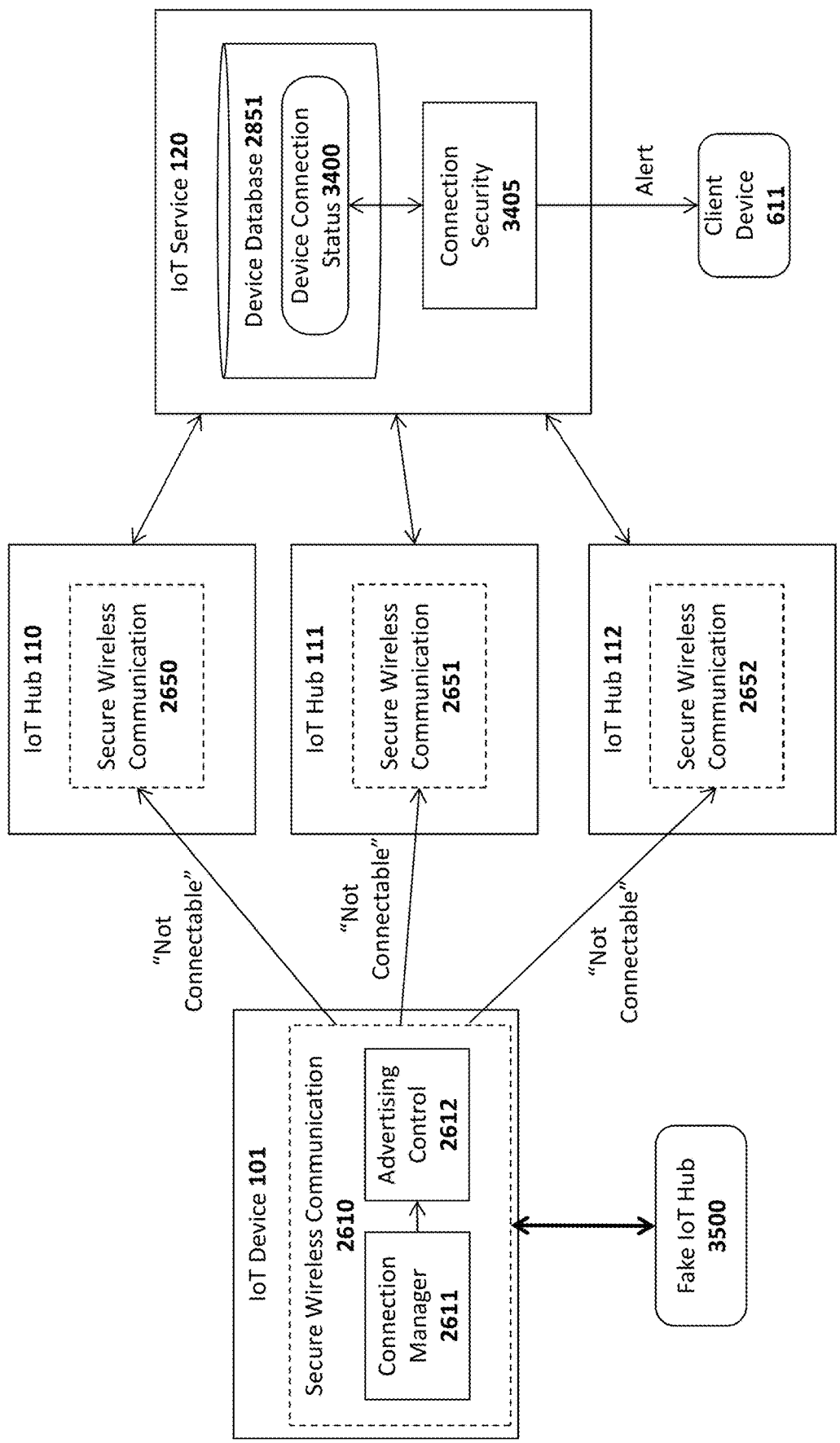

As described above with respect to FIGS. 26A-C, in one embodiment, when an IoT device 101 connects to an IoT hub 111, it advertises as "not connectable" to other IoT hubs 110, 112 that can see it. As illustrated in FIG. 35, in one embodiment, if an authentic IoT hub 110, 112 sees an IoT device advertising as "not connectable," it reports the state to the IoT service 120 (as indicated by the reporting to the IoT service 120 performed by IoT hubs 110 and 112). In one embodiment, when the IoT service 120 receives this information, it searches the device database 2851, or any other database which maintains device/hub connection status 3400 to determine which IoT hub 111 the IoT device 101 is connected to. In FIG. 34, the IoT device 101 is connected to IoT hub 111, which provides its connection status to the IoT service 120 as illustrated. Connection security module 3405 evaluates the device/hub connection status data 3400 to determine that IoT device 101 is connected to a legitimate IoT hub 111.

In contrast, if the IoT device 101 is not connected to any IoT hub, as illustrated in FIG. 35, the connection security module 3405 reports nefarious activity (e.g., in the form of an alert notification to client device 611). In particular, in this embodiment, no legitimate IoT hub 110-112 is reporting a connection with IoT device 101. Consequently, in response to one or more of the IoT hubs 110-112 communicating to the IoT service 120 that it is receiving a "not connectable" indication from the IoT device 101, in combination with the lack of a connection with a legitimate IoT hub, the connection security module 3405 will conclude that a fake IoT hub 3500 may be connecting to the IoT device 101.

C. Hide events

If an attacker can prevent an event like a door open event from being reported to the service for enough time to close the door again, the user might not be alerted that the event occurred.

Figure 36:
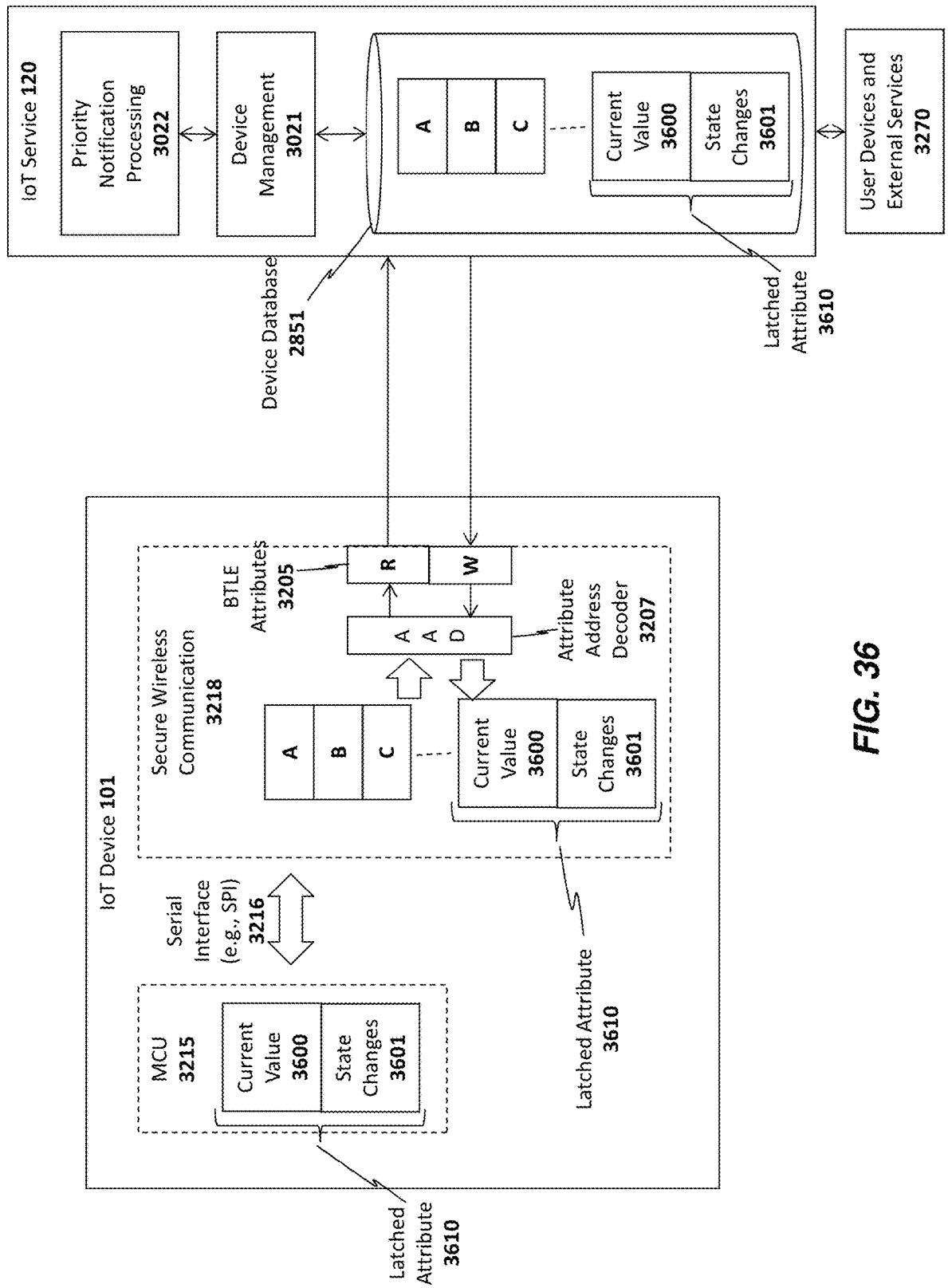
FIG. 36 illustrates one embodiment of the invention for implementing latched attributes.

One embodiment of the invention addresses this problem utilizing at least two features. First, the attribute that the door sensor is connected to is defined to be a "latched" attribute which will always report the state change as well as the current state when they send their attribute values to the service. This ensures that even though the door is closed again, the user will receive a notification that the door was opened. FIG. 36 illustrates one embodiment with a latched attribute 3610 is maintained by the MCU 3215 and/or the secure wireless communication module 3218 and ultimately synchronized with the IoT service 120 (e.g., after a connection has been reestablished). The latched attribute includes a current value 3600 indicating the current state of the sensor performing its function. For example, in the case of a door sensor, the current status may be "opened" or "closed." In addition, each latched attribute includes an indication of state changes 3601 which have occurred since the last synchronization with the IoT service 120 and/or the last time the IoT device 101 was reset. For example, if the door was opened and then closed while the IoT device 101 was unable to connect with the IoT service 120, this state change 3601 will be stored on the IoT device and then provided to the IoT service 120 once a connection has been made, notwithstanding the current value 3600. In one embodiment, the latched attribute includes a dirty flag to indicate that it is out of sync with the corresponding latched attribute 3610 on the IoT service 120.

Second, in one embodiment of the invention, acknowledgement is required from the IoT service 120 for latched attributes. So if the IoT device 101 is unable to provide the information to the IoT service 120 because of connection issues or interference by an attacker, the IoT device 101 will keep trying until it has successfully received an acknowledgement from the IoT service 120. In one embodiment, the acknowledgement is performed in the form of a set operation on a special system attribute. Only when the IoT device 101 receives the set request does it clear the dirty flag on the latched attribute 3610 to cease attempting to report the value.

SERVICE-INITIATED SOFTWARE UPDATES

Figure 37:
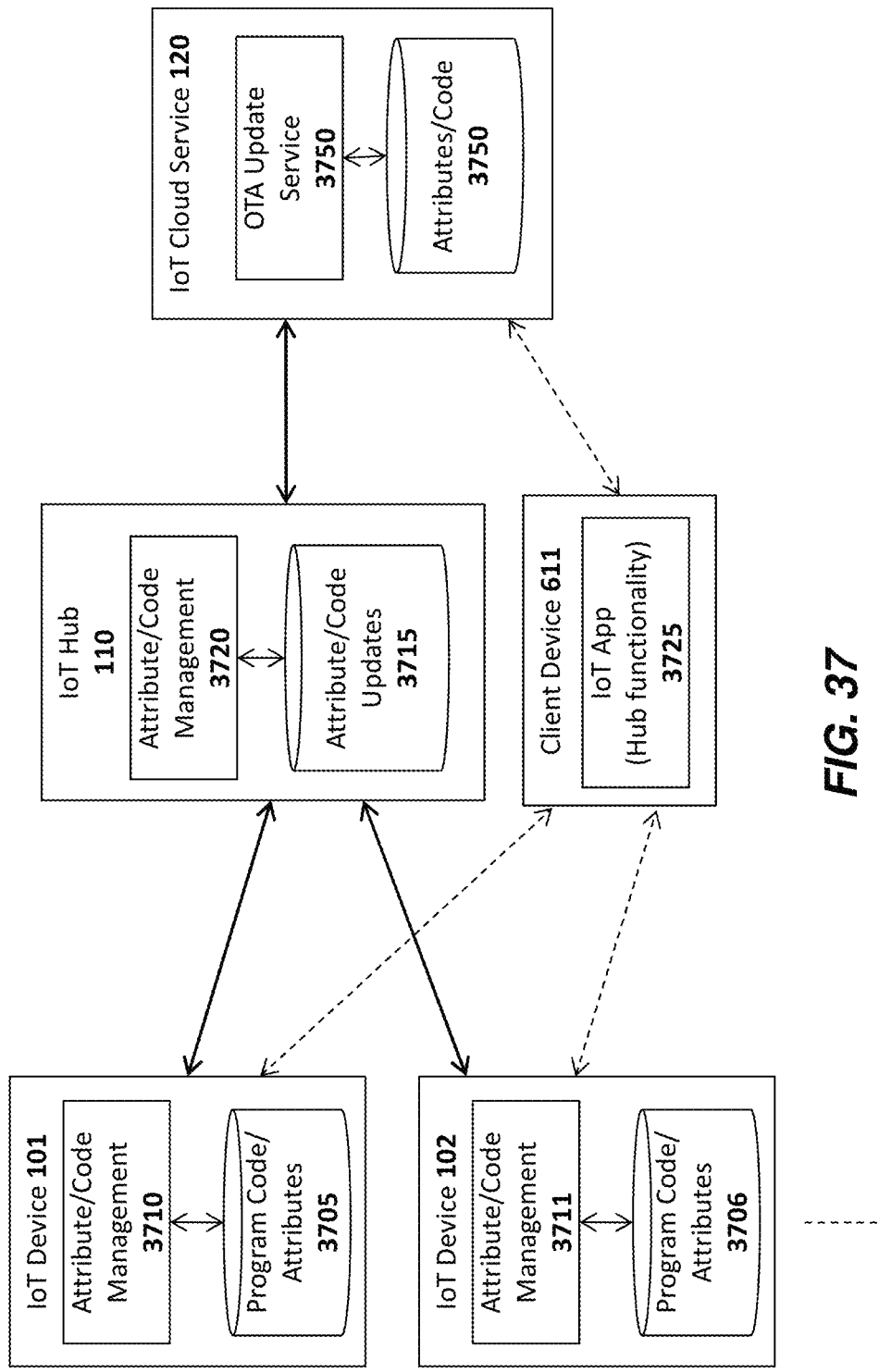
FIG. 37 illustrates one embodiment of an architecture for performing service-initiated IoT device updates.

The usual behavior for delivery of software updates is that a device makes a request to a service endpoint to check if a new software update is available. In one embodiment of the invention, illustrated generally in FIG. 37, the IoT service 120 initiates the update checks with no update checks actively initiated from IoT devices 101. In one embodiment, when an IoT device 101 is initialized it reports its current attribute state to the IoT service 120, notifying the IoT service that it is available for operation. These state changes may be reported to the IoT service 120 through various secure/encrypted channels described above. At some point, the IoT device 101 reaches a calculated state in which the service 120 considers the IoT device being available. In one embodiment, this is the state in which the IoT device 101 and IoT cloud service 120 have each arrived at a secret to use to encrypt communication (see, e.g., FIGS. 16A to 23C and associated text).

As previously described, certain implementations of the IoT device 101 may establish a direct connection to the IoT cloud service 120 rather than being coupled through an IoT hub 110 or client device with an IoT app 3725. In this implementation, the IoT device 101 may include a WiFi or other type of network interface to connect directly to the Internet.

In the illustrated implementation, the IoT cloud service 120 includes an OTA update service 3750 which manages IoT device updates using the latest attributes and/or program code 3750. In an embodiment which relies on an IoT hub 110, the OTA update service 3750 may detect when the IoT device is available upon receiving a message from the IoT device 101 which includes an indication of the current attributes and/or code installed on the IoT device 101. If newer attributes and/or program code 3750 are available, the OTA update service 3750 generates a signature over the binary containing the attributes/code, stores the binary with its signature in a secure location (e.g., on a file distribution server), and transmits a URL to the IoT hub 110 pointing to the secure location. Attribute/code management logic 3720 on the IoT hub 110 retrieves the binary and signature from the secure location, verifies the signature using a key, and distributes the binary to one or more IoT devices 101-102. As illustrated, attribute/code management logic 3710-3711 on each IoT device 101-102, communicates with the attribute/code management logic 3720 on the IoT hub to receive the binary and installs the program code/attributes 3705-3706 on each respective IoT device 101-102. The IoT hub 110 may also store the signed binary in a local storage 3715 and distribute it to IoT devices as they become available.

In an embodiment in which the IoT device 101 is connected directly to the IoT service 120, the attribute/code management logic 3710 retrieves the signed binary from the URL, verifies the signature using the key, and installs the program code/attributes.

As previously described, an IoT app 3725 running on the user's client device 611 may perform all of the functions of the IoT hub. For example, the IoT app 3725 may access the URL, retrieve the binary, and distribute it to one or more IoT devices 101-102.

Figure 38:
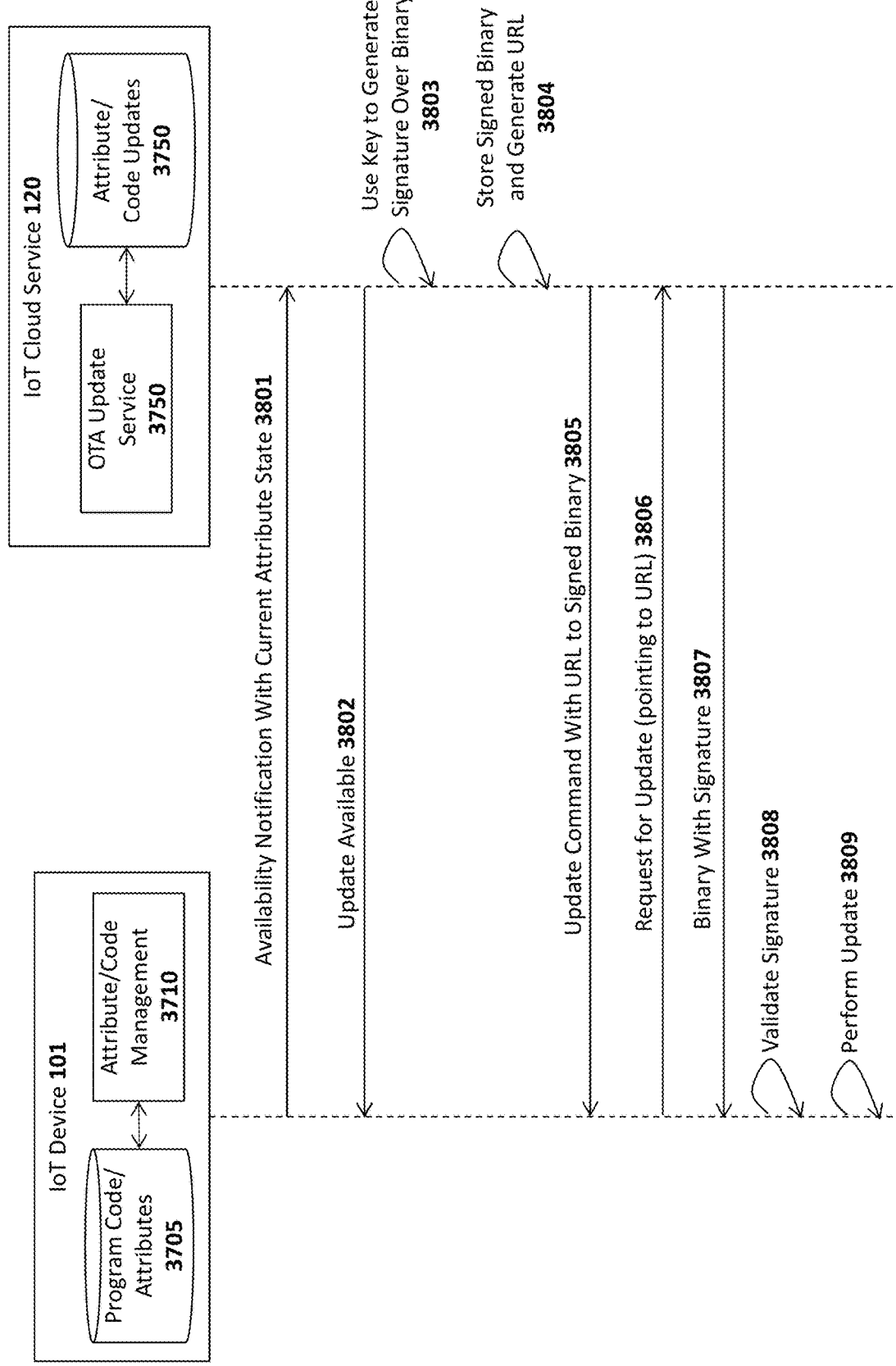
FIG. 38 illustrates a transaction diagram for service-initiated updates in which an IoT device communicates directly to an IoT service.

FIG. 38 illustrates a example of a sequence of transactions performed between the IoT device 101 and IoT cloud service 120 to update the program code/attributes of the IoT device

101. In one embodiment, the illustrated transactions are performed by attribute/code management logic 3710 running on a microcontroller of the IoT device 101 and the OTA update service 3750 running on the IoT cloud service 120.

When the IoT device is turned on and reaches a particular state of availability, at 3801 it transmits an availability notification containing an indication of its current attribute state. The current attribute state may be represented in a variety of ways including a version number, a hash number generated over the attributes, or simply an indication of the current attributes themselves. The notification 3801 may also include an indication of the code version(s) running on the IoT device 101.

If an update is available, then the OTA update service 3750 may transmit an update available notification 3802 to the IoT device. Alternatively, the notification to the IoT device may be the update command 3805 (described below). At 3803, the OTA update service 3750 uses a key to generate a signature over the attribute/code binary. In one implementation, the key is the session secret determined by the IoT device 101 and IoT cloud service 120 during session initiation as described above. However, any securely-determined key or key pair may be used.

At 3804, the OTA update service 3750 stores the signed binary in a secure storage location (e.g., on a binary distribution server) and generates a URL pointing to the location of the signed binary. While a URL is used in this embodiment, any other form of network pointer may be used. At 3805, the OTA update service 3750 transmits an update command to the attribute/code management logic 3710 of the IoT device 101 containing the URL to the signed binary.

At 3806, the attribute/code management logic 3710 transmits an update request directed to the URL and, at 3807, receives the signed binary. It validates the signature at 3808 (e.g., by using its own key to regenerate and compare the signature to the one received), and performs the update at 3809. If no software update is available, then no update command is sent at 3805 over the account channel to the IoT device 101.

Figure 39:
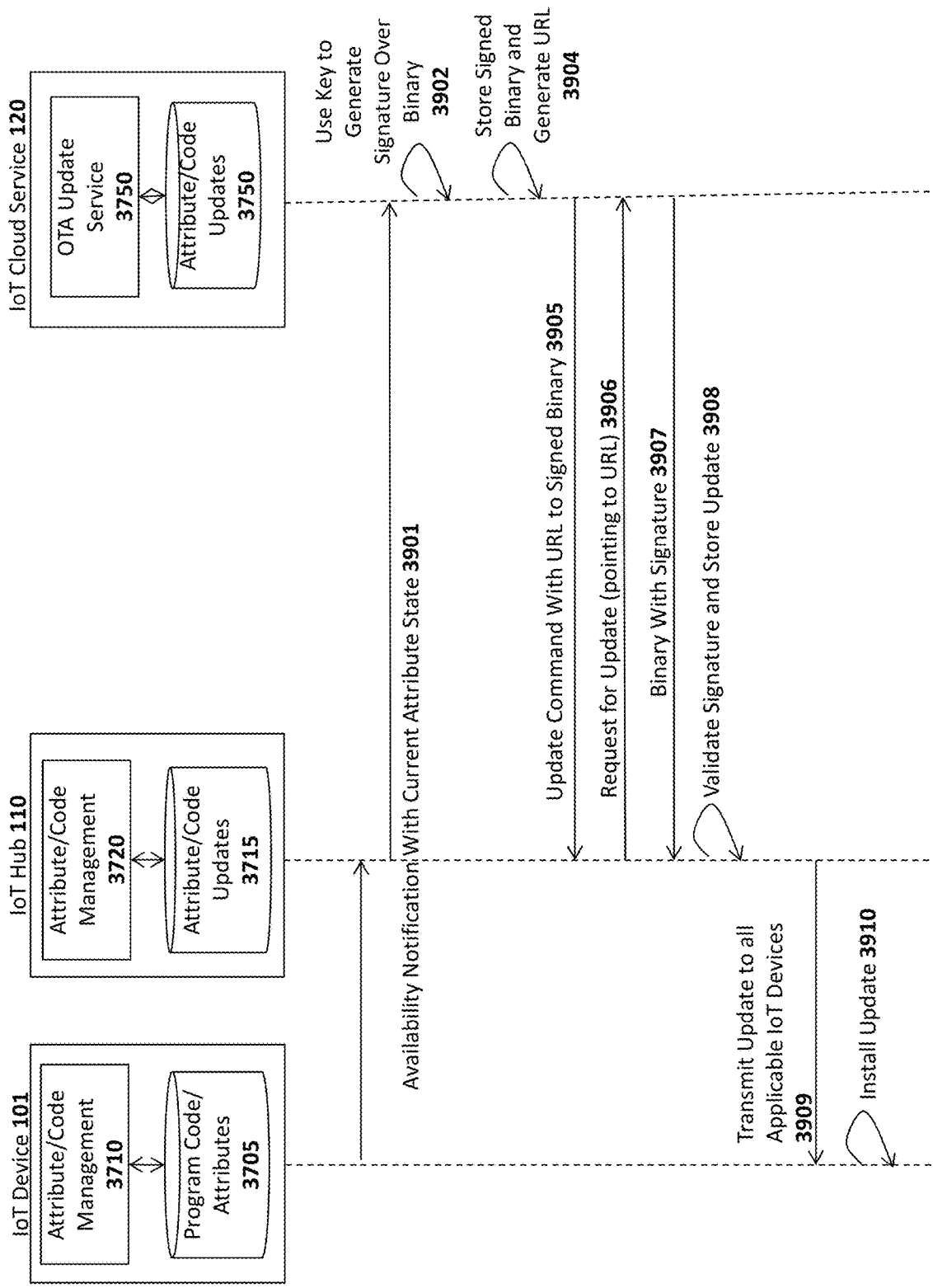
FIG. 39 illustrates a transaction diagram for service-initiated updates in which an IoT device communicates through an IoT hub to the IoT service.

FIG. 39 illustrates an embodiment in which the IoT device 101 connects to the IoT cloud service 120 via an IoT hub 110 (which may include a client device equipped with hub software). The illustrated transactions are performed by attribute/code management logic 3710 running on a microcontroller of the IoT device 101, an attribute/code management module 3720 running on the IoT hub 110, and the OTA update service 3750 running on the IoT cloud service 120.

As before, when the IoT device 101 is turned on and reaches a particular state of availability, at 3901 it transmits an availability notification containing an indication of its current attribute state. The current attribute state may be represented in a variety of ways including a version number, a hash number generated over the attributes/code, or simply an indication of the current attributes themselves. The notification 3901 may also include an indication of the code version(s) running on the IoT device 101. The IoT hub 110 forwards the notification to the IoT cloud service 120 as illustrated.

If an update is available, then at 3902 the OTA update service 3750 uses a key to generate a signature over the attribute/code binary. In one implementation, the key is the session secret determined by the IoT device 101 and IoT cloud service 120 during session initiation as described above. Alternatively, or in addition, the key may be one (or a pair) known by the IoT hub 110 and the IoT service 120 (e.g., exchanged using ECDSA as described above). However, the underlying principles of the invention are not limited to any particular type of key or key pair.

At 3904, the OTA update service 3750 stores the signed binary in a secure storage location (e.g., on a binary distribution server) and generates a URL pointing to the location of the signed binary. While a URL is used in this embodiment, any other form of network pointer may be used. At 3905, the OTA update service 3750 transmits an update command to the attribute/code management logic 3720 of the IoT device hub 110 containing the URL to the signed binary.

At 3906, the attribute/code management logic 3720 transmits an update request directed to the URL and, at 3907, receives the signed binary. It validates the signature at 3908 (e.g., by using its own key to regenerate and compare the signature to the one received). At 3903, the attribute/code management logic 3720 transmits the update to all applicable IoT devices (e.g., those that are available and out of date), and the attribute/code management logic 3710 performs the update at 3910.

Note that any of the management components 3710-3711, 3720 running on the IoT device 101 or IoT hub 110 and/or the OTA update service 3750 running on the IoT cloud service 120 may be software-based modules executed on a processor. Alternatively, these modules may be implemented, at least in part, by dedicated circuitry such as a hardware accelerator.

APPARATUS AND METHOD FOR IoT DEVICE VALIDATION

One embodiment of the invention provides secure over-the-air updates of software as described above with respect to FIGS. 37-39, where an IoT device or IoT hub checks the signature of software images before updates are applied. The embodiments described below are capable of verifying not only that the code running on a particular device is the correct code but also that it has not been modified through either unintentional code corruption or through malicious means due to a bad actor. Calculating a hash or checksum of the entire image is not sufficient because a malicious firmware image may store a pre-calculated copy of this information and return this to a challenger. While some implementations below are described specifically within the context of "firmware," the underlying principles of the invention may be implemented on any form of software including, but not limited to firmware, system software (e.g., the device operating system), and application software.

Figure 40:
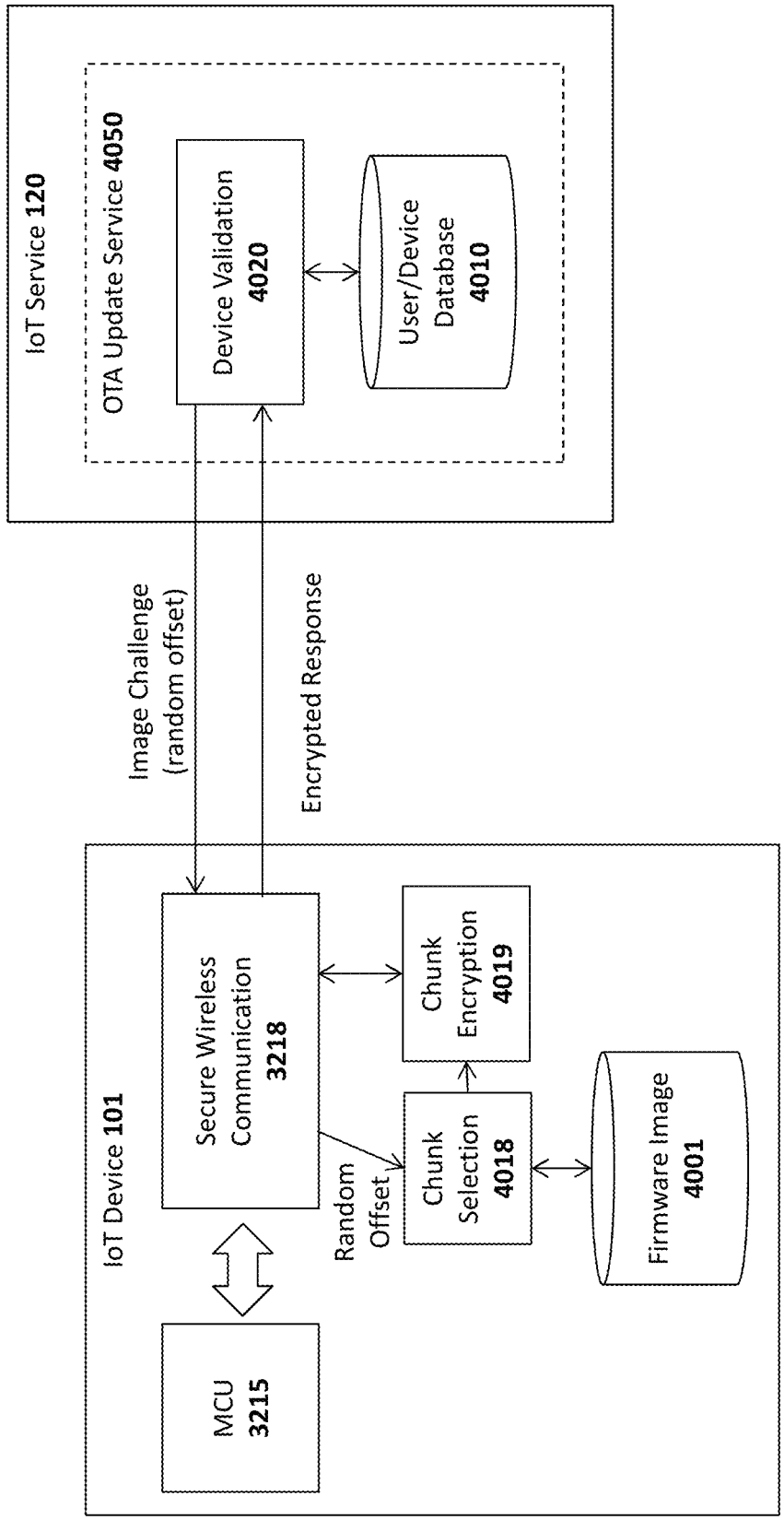
FIG. 40 illustrates one embodiment of a system for validating an IoT device.

Referring to FIG. 40, in one embodiment, an over-the-air (OTA) update service 4050 on the IoT cloud service 120 tracks the firmware versions loaded on each IoT device 101 and maintains a user/device database 4010 containing the firmware versions. For example, if an OTA update has not been performed on the IoT device 101, the factory programmed firmware version is stored in the user/device database 4010 whereas if an OTA update has been pushed, the OTA update service 4050 stores the version which was pushed in the user/device database 4050.

Thus, because of the controlled manner in which IoT devices are registered and updated, the IoT cloud service 120 will know exactly what app images and profile images are stored on the IoT device 101, and whether they are in a particular storage slot within the IoT device's 101's non-volatile memory (e.g., slot 1 or slot 2). In one embodiment, the OTA update service 4050 will also track ancillary bits which are stored on the IoT device 101. In one embodiment, the OTA update service 4050 will not track certain types of data in the database 4010 such as "flash vars" and other local ephemeral data (e.g., data which is only temporary).

Using it's intimate knowledge of the firmware image 4001 stored on each IoT device 101, a device validator 4020 transmits challenge messages to the IoT device targeting specific blocks of code to be used for validation. For example, in one embodiment, the device validator 4020 randomly selects a specific block of code within the firmware image 4001 and identifies this block of code in its challenge message. In one embodiment, the block is identified using a random offset into the firmware image 4001. A length may also be provided to indicate a length of code starting at the offset. Alternatively, a pre-programmed length may be used for each validation.

In one embodiment, a block selector 4018 on the IoT device 101 reads the block of code from the firmware image 4001 using the offset and length (pre-programmed or specified in the challenge) and a block encryption module 4019 encrypts the block using a key. In one implementation, the key comprises the current session key used to support secure communication between the secure wireless communication module 3218 and the IoT service 120. However, any key may be used. In one embodiment, the device validator 4020 validates the encrypted response, using its key to decrypt the block and compare the received block with the corresponding block in the user/device database 4010. If the blocks match, the device validator 4020 validates the IoT device 101.

In one embodiment, the block encryption module 4019 uses the key to generate a signature over the block, either in addition to or instead of encrypting the block. The device validation module 4020 then generates its own signature over the corresponding block in the user/device database 4010 and validates the IoT device 101 if the signatures match.

These embodiments guarantee that the memory needed to store all pre-calculated possible combinations of hashes on firmware blocks far exceeds the memory capacity of the IoT device 101. As a result, it is impossible for a malicious firmware image to return a canned response.

In one embodiment, as a countermeasure against compressing firmware images (e.g., to fit within the IoT device memory), non-active parts of an image can be padded with highly incompressible data to fill any available space in a slot. Manufacturer and factory-specific watermarks may be added in these locations.

In one embodiment, the IoT service 120 chains multiple challenge requests to the IoT device 101 as an additional guard against malicious program code decompressing a valid copy of the firmware. The responses to these challenge requests may have to be completed within a specified time to avoid triggering suspicion that the device is compromised. This can guard against both decompression of the correct image as well as storage of the correct image on an added external storage device.

Figure 41:
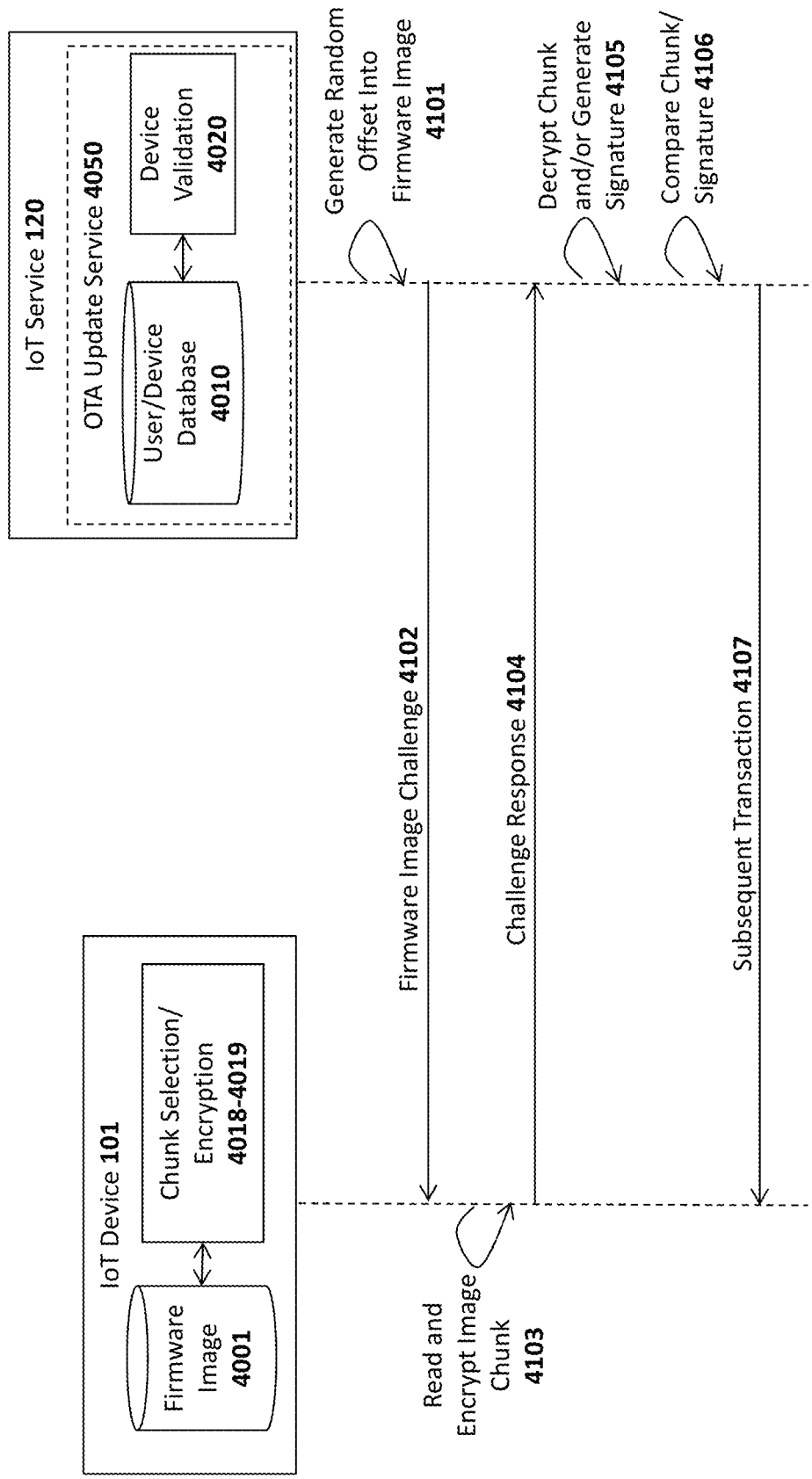
FIG. 41 illustrates a sequence of transactions for validating an IoT device.

FIG. 41 illustrates a sequence of transactions performed the IoT service 120 and IoT device 101. At 4101 the IoT service 120 generates a random offset value to identify a particular block of data within the firmware image on the IoT device 101. In one implementation, the random number is generated from within an acceptable range of values. In addition, the IoT service 120 may generate a random size value from within an acceptable range identifying the size of the firmware image block to be identified.

The IoT service 120 sends a firmware image challenge message 4102 to the IoT device 101 including the size value identifying a randomly-sized block of the firmware image starting at a random offset. In one implementation, the firmware image challenge message 4102 is wrapped in the session key currently being used in the session between the IoT device 101 and IoT service 120. This image challenge 4102 may be repeated by the IoT service 120 multiple times, and may be triggered automatically or manually after the IoT device 101 is fully linked and communicating normally with the IoT service 120.

At 4103 the IoT device 101 uses the randomly generated offset/size values to read the identified block of the firmware image 4001 and encrypts the block using the session key. In one embodiment, the IoT device 101 copies the requested block of data into a buffer to encrypt it with the session key. Alternatively, or in addition, the IoT device 101 may generate a signature/hash over the block using the session key. This embodiment may be particularly useful for efficient checks of larger blocks within the firmware image. The IoT device 101 then transmits the resulting encrypted block and/or signature in a challenge response message 4104.

At 4105 the IoT service 120 uses the session key to decrypt the block and/or generate a signature. At 4106, the decrypted block is compared to a corresponding block within the user/device database. If the decrypted block matches, then the IoT service 120 validates the IoT device 101.

If a signature/hash is used, the IoT service 120 generates a signature/hash over the corresponding block stored in the user/device database 4010 using the session key. If the generated signature/hash matches the signature/hash received from the IoT device 101, then the IoT service 120 validates the IoT device 101. Once the IoT device 101 is validated, the IoT service 120 may perform one or more transactions 4107 with the IoT device 101. If the block/signature does not match, then the IoT service 120 may perform one or more additional operations as described below.

In one embodiment, if the IoT service 120 detects a mismatch between the received block/signature at 4106, the IoT service 120 can perform various additional operations. For example, the IoT service 120 may store the mismatch for later analysis. It may also request one or more additional blocks from the firmware image and/or push a limited update to overwrite only a bad few bits or bytes in case of firmware corruption/partial erasure. In the case of a larger corruption, the IoT service 120 may push an OTA update to force a clean update. The IoT service 120 may also de-register/de-provision the IoT device 101 from the IoT service 120 if the mismatch indicates a malicious attack.

Because the firmware region and length/size are randomly chosen by the IoT service, requesting a hash of the requested image still protects against pre-hashing the firmware image as a whole because all of the permutations of possible hash results would exceed the size of the raw firmware image.

Additional actions performed by the IoT service 120 in response to a mismatch may include notifications to users, manufacturers, partners, etc. For example, the IoT service 120 may transmit a notification to the client device of the user and/or any other interested party that may need to be aware of hardware failures or factory modifications.

Note that this challenge/response implementation may also be used as part of the IoT device's 101's attestation to the IoT service 120 that it is a valid device. For example, the above techniques may be used as a final sequence of operations when registering the device to prove its authenticity. In one embodiment, the IoT service 120 uses these techniques as a tool to diagnose failing IoT devices and/or block tampered-with IoT devices from becoming available on the IoT system.

In another embodiment, an IoT device 101 asks the IoT service 120 for a verification. For example, the IoT device 101 may submit a region to the service (e.g., in hashed or encrypted form) and request the IoT service 120 to check the validity of that region of the firmware 4001. If a mis-match is found, various actions may be taken by the IoT device 101 and/or the IoT service 120 (e.g., forcing an OTA update, notifying the user/partner, etc).

APPARATUS AND METHOD FOR SECURE TRANSPORT USING IOT DEVICES

Safely shipping perishable products such as food and medicines is critical in the modern world, in both developed nations and developing nations. Excursions outside of specifically defined safe temperature ranges can allow bacterial growth to take hold in food items, or allow vaccines to be damaged to the point where they are ineffective.

One embodiment of the invention uses various features of the IoT system described herein to ensure secure transport of temperature-sensitive or vibration-sensitive products. Using the techniques described herein, when a transported product is exposed to temperatures outside of an acceptable range, the occurrence of the temperature excursion is documented, including the specific timing of the occurrence (e.g., the specific period(s) of time of the temperature excursion). In addition, one embodiment of the invention detects vibrations of a package in transit and documents periods when excessive vibrations were detected. Various other types of sensors may be used, depending on the environmental variables which may affect the transported product. Enhanced security is also provided in one embodiment to ensure that the logging of these excursions cannot be tampered with, as the shipment company might attempt to tamper with the logging system in order to alleviate a costly insurance claim.

In one embodiment, an IoT device is included within the package or crate of the product being transported. The IoT device may be equipped with temperature sensors to continually or periodically measure the temperature during transport. In addition, one embodiment of the IoT device includes accelerometers to measure the acceleration or vibration experienced by the product and may include various other sensors to detect other hazardous transportation conditions.

Figure 42:
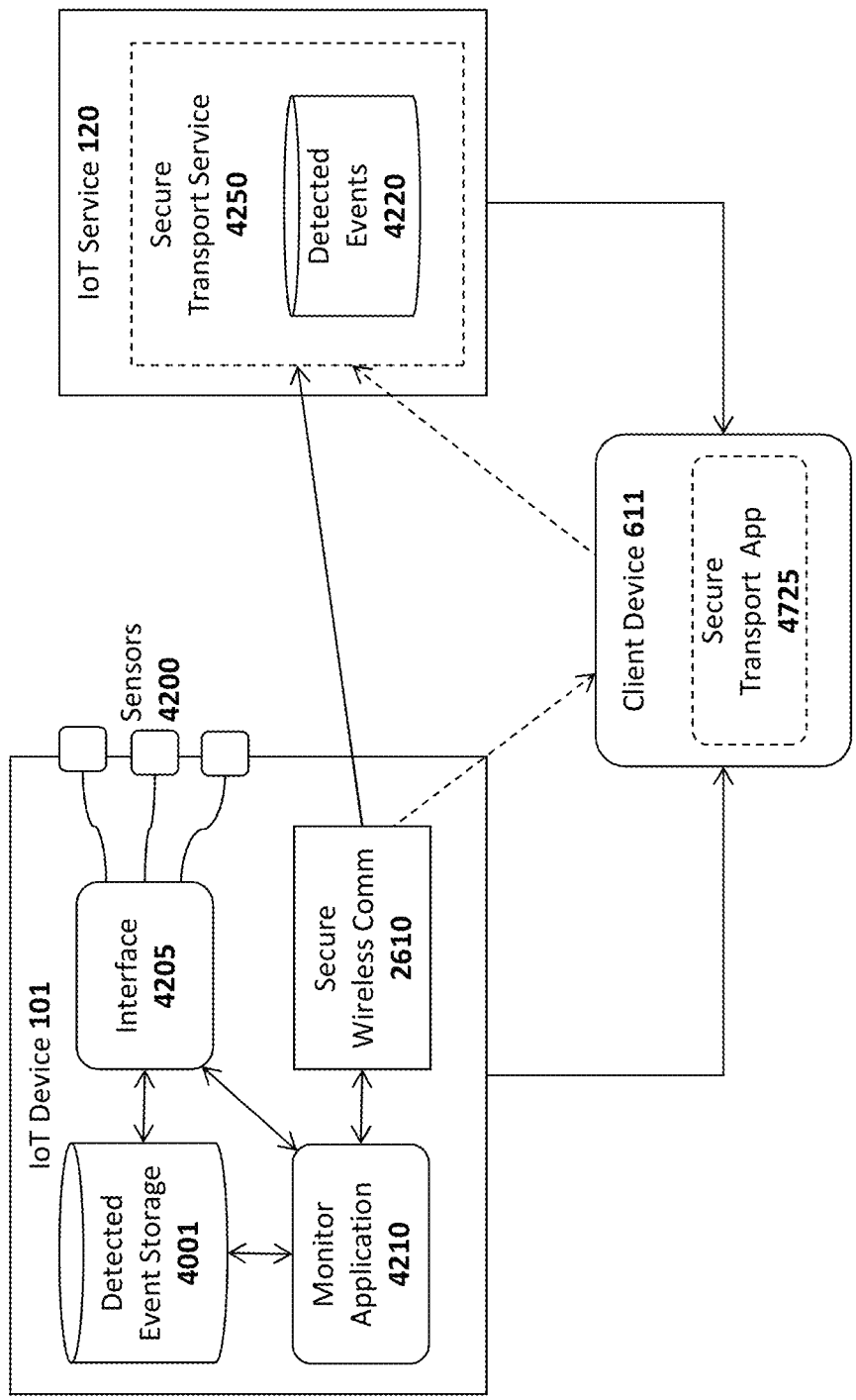
FIG. 42 illustrates one embodiment of a system for ensuring that a product is shipped in appropriate environmental conditions.

FIG. 42 illustrates one embodiment which includes an IoT device 101 included with the product being transported, an IoT service 120 with which the IoT device 101 has been securely registered (e.g., using the techniques described herein), and a client device 611 configured to communicate with the IoT device 101 and the IoT service 120.

In one embodiment, the IoT device 101 comprises one or more sensors 4200 to detect various environmental conditions experienced by the product while in transit. As mentioned, the sensors 4200 may include temperature sensors to measure the temperature during transport and/or accelerometers to measure the acceleration or vibration experienced by the product. Various other types of sensors 4200 may be used based on the type of product being shipped including, but not limited to, mechanical shock sensors, humidity sensors, X-ray dosage sensors, ionizing radiation dosage sensors, and tamper sensors.

In one embodiment, interface circuitry/logic 4205 coupled to the sensors 4200 continually or periodically reads the sensor inputs and converts the inputs to a usable format for a monitor application 4210. For example, the interface circuitry/logic 4205 may include analog-to-digital conversion circuitry to convert a voltage received from each sensor 4200 into a digital value and may also include normalization circuitry/logic to normalize the digital value based on the specific measurement units employed. For example, if the application 4210 is configured to process temperature readings in Celsius, then the digital value may be translated to a temperature reading on the Celsius scale. Alternatively, the monitor application 4210 may be configured with normalization logic to perform the normalization operation on the raw digital values received from the interface circuitry/logic 4205.

In one embodiment, if a sensor 4200 measures a value outside of a specified range, the monitor application 4210 records this as an event within an event data storage device 4001 which is implemented as a secure non-volatile memory (e.g., an encrypted Flash memory storage). For example, if the monitor application 4210 detects a temperature outside of the specified range, it may trigger an event 4001 which is then stored within the event data storage device 4001. The monitor application 4210 may continue to monitor the temperature readings provided from the temperature sensor 4200 and periodically store readings outside of the acceptable range within the event storage 4001. In addition, the monitor application 4210 may measure/calculate the amount of time that the temperature remains outside of the specified range and store events when particular temporal thresholds have been reached. In addition to the amount of time, it may calculate and store other relevant data such as the average temperature differential above/below the specified threshold, the maximum and/or minimum temperatures recorded, and any data relevant to the safe transport of the associated product.

In one embodiment, the IoT device 101 includes a secure wireless communication module 2610 to connect to the IoT service 120 and/or one or more client devices 611 within range. In one embodiment, the secure wireless communication module 2610 includes a cellular network interface to establish an independent communication channel to the IoT service 120 over the cellular network. Alternatively, or in addition, the secure wireless communication module 2610 includes a low power wireless communication interface such as a Bluetooth Low Energy interface (e.g., a Bluetooth 4.x or 5.x interface). In cases where the IoT device 101 is only equipped with a low power wireless communication interface, it may communicate with the IoT service 120 via the client device 611 (e.g., the client device 611 performs the function of an IoT hub as described above).

Users of the secure transport system described herein may install secure transport apps 4725 on client devices 611. When the shipment containing the IoT device 101 arrives, the receiver can open the secure transport app 4725 to establish a communication channel with the IoT device. Following authentication, the secure transport app 4725 reads the event data from the event storage 4001 to determine whether the product was transported safely. If any of the specified temperature thresholds, humidity thresholds, shock/vibration thresholds, or other types of dangerous conditions were detected, they are reported to the secure transport app 4725 and the user receiving the shipment can refuse delivery from the carrier if necessary. Moreover, the user receiving the shipment does not need to open the package (or other enclosure) to determine whether the products were transported safely. Rather, because the IoT device 101 is registered with an account on the IoT service 120 corresponding to the account associated with the secure transport app 4725, the secure transport app 4725 may automatically establish a wireless connection to the IoT device 101 through the shipping container.

In one embodiment, a secure transport service 4250 running on the IoT service 120 receives updates of detected events 4220 which it may record in a database associated with the account. If the IoT device 101 is capable of connecting directly over a cellular connection, it may transmit periodic updates of significant events during transport. Alternatively, if the IoT device 101 needs to connect via a client device 611, then it may establish a connection with the secure transport service 4250 at intermediate points during the trip (e.g., package sorting facilities, shipyards, etc) where client devices 611 or other IoT hub devices are within range. Users at these intermediate points along the way may access the events from the event storage 4001 or the secure transport service 4250 via the secure transport app 4725 and determine early on that the product will need to be returned, thereby alleviating the effort required to get the product to its destination, only to learn that it must be returned.

In cases where the secure transport app 4725 is not associated with the same account as the IoT device, the shipment receiver may gain access to the IoT device 101 in several ways. For example, in one embodiment, a QR code associated with the IoT device 101 on the IoT service 120 may be visible from the outside of the shipping container/package. Scanning the QR code may then provide access to the IoT device 101 via the secure transport service 4250. For example, the IoT device 101 may establish a secure connection to the IoT service 120 via the client device 611 as described herein, and the secure transport app 4725 may access the data from the IoT service 120 following authentication. In another embodiment, a shipment number or other code on the container may be mapped by the secure transport app 4625 to a specific IoT device via communication with the IoT service 120. Of course, if the IoT device 101 and authenticated secure transport app 4725 are associated with the same account on the IoT service 120, then access to the IoT device 101 may be automatically provided (as described above).

Thus, the IoT device 101 of this embodiment opportunistically uploads event data and/or other telemetry logs to the IoT service 120 when the package receiver or any other user along the way uses a secure transport app 4725 to check status. The IoT service 120 may then generate canned reports that integrate the event data and associated logs and format them into standard forms required for governmental or other regulatory checks.

While illustrated as a separate component in FIG. 42, the functions performed by the secure transport app 4725 may be integrated within a delivery service app used at delivery hubs to scan packages and determine the next route to be taken (e.g., the truck, train, etc, on which the package is to be loaded).

In addition, while the embodiments of the invention described herein focus on temperature, the same principles may be applied to other forms of sensor data. As mentioned, this may include humidity data read from humidity sensors, vibration data related to accelerometers, mechanical shock sensors, humidity sensors, radio-frequency dosage sensors (e.g., X-ray sensors), ionizing radiation dosage sensors, and tamper sensors. In short, any type of sensor capable of measuring a variable related to the safe transport of the product may be integrated on the IoT device 101 and used to ensure that the product arrives undamaged.

A method in accordance with one embodiment of the invention is illustrated in FIG. 43. The method may be implemented within the context of the processor and system architectures described above, but is not limited to any particular architecture.

At 4301, an IoT device is included with a product to be transported. For example, the IoT device may be included within the package and/or container in which the product is shipped. At 4302, environmental values are read from the sensors coupled to the IoT device during the transport of the product. As mentioned, the environmental values may include, but are not limited to, temperature values, humidity values, vibration/shock values, and RF values.

At 4303, the measured environmental values are evaluated in view of environmental value ranges associated with the product. For example, if the product is sensitive to temperature values above a temperature threshold, then the product may be compromised if the sensors have reported temperatures above the temperature threshold for a specified period of time.

In response to detecting that the measured environmental values were outside of the environmental ranges, determined at 4304, event data is generated and stored at 4305 indicating that the product may be compromised.

Various functional components are described herein as "logic" or "modules." These functional components may be hardware such as an integrated circuit (e.g., an application-specific integrated circuit, a general purpose processor, a microcontroller, etc). Alternatively, these functional components may be implemented in software executed by a processing device or using a combination of hardware and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An Internet of Things (IoT) device comprising:
   one or more sensors to measure environmental conditions during transport of the IoT device from an origin location to a destination location;
   a sensor interface coupled to the one or more sensors to convert environmental values associated with the environmental conditions from a first measurement unit in which the environmental values are measured by the one or more sensors to a second measurement unit used by a monitoring application, and to communicate the environmental values in the second measurement unit to the monitoring application;
   a storage device to store monitor application program code;
   a processor coupled to the sensor interface and storage device, the processor to process the monitor application program code to perform operations of the monitoring application based on the environmental values, the operations including determining whether one or more of the environmental values are outside of one or more corresponding value ranges for at least a specified period of time and responsively recording one or more events as event data on the storage device to indicate that the one or more of the environmental values are outside of the one or more corresponding value ranges for at least the specified period of time, and determining that a first plurality of environmental values is outside of a first corresponding value range and responsively calculating and recording an average differential between the first plurality of the environmental values and the first corresponding value range in the storage device as additional event data, wherein the environmental values, the event data, and the additional event data are securely stored in the storage device to prevent tampering; and
   a wireless communication interface to connect to an Internet of Things (IoT) service at one or more intermediate locations between the origin location and the destination location and/or at the destination location, the wireless communication interface to transmit the environmental values, the event data associated with the environmental values, and/or the additional event data to the IoT service;
   wherein the IoT service is to provide the environmental values and event data associated with the environmental values to one or more apps running on one or more client devices, the one or more apps associated with one or more accounts on the IoT service.

2. The IoT device of claim 1 wherein the event data is to further include temporal data indicating an amount of time that the one or more environmental values are outside of the corresponding value ranges.

3. The IoT device of claim 1 wherein the environmental values comprise one or more of: temperature values provided by temperature sensors, humidity values provided by humidity sensors, vibration or mechanical shock values provided by accelerometers, and radio-frequency (RF) values provided by RF detectors.

4. The IoT device of claim 1 wherein the one or more apps comprise program code to evaluate the environmental values and/or event data associated with the environmental values to determine whether a product shipped with the IoT device has been exposed to harmful environmental conditions during transport.

5. The IoT device of claim 4 wherein determining whether the product shipped with the IoT device has been exposed to harmful environmental conditions comprises determining whether one or more of the environmental values are outside of one or more corresponding value ranges for a period of time.

6. The IoT device of claim 1 wherein the wireless communication interface is to connect to the IoT service by establishing a local wireless connection to the one or more client devices connected to the IoT service.

7. A method comprising:
   including an IoT device with a product to be transported;
   measuring environmental values via sensors coupled to the IoT device during transport of the product;
   converting, via a sensor interface coupled to the sensors, environmental values associated with the environmental conditions from a first measurement unit in which the environmental values are measured by the sensors to a second measurement unit used by a monitoring application;
   communicating the environmental values in the second measurement unit to the monitoring application;
   executing monitoring application program code by a processor of the IoT device to perform operations of the monitoring application, the operations comprising:
      evaluating the environmental values based on specified environmental value ranges associated with product and responsively generating event data indicating that the one or more of the environmental values are outside of the one or more specified environmental value ranges for at least a specified period of time;
      determining that a first plurality of environmental values is outside of a first corresponding value range and responsively calculating an average differential between the first plurality of the environmental values and the first corresponding value range as additional event data;
   securely storing the environmental values, the event data, and the additional event data on a storage device of the IoT device to prevent tampering;
   transmitting, via a wireless communication interface of the IoT device, the environmental values, the event data, and/or the additional event data from the IoT device to an IoT service; and
   generating a notification that the product has been compromised on one or more apps running on one or more client devices if one or more of the environmental values are determined to be outside of the specified environmental value ranges for at least the specified period of time during transport of the product, the one or more apps associated with one or more accounts on the IoT service.

8. The method of claim 7 wherein the event data is to further include temporal data indicating an amount of time that the one or more environmental values are outside of the corresponding value ranges.

9. The method of claim 7 wherein the environmental values comprise one or more of: temperature values provided by temperature sensors, humidity values provided by humidity sensors, vibration or mechanical shock values provided by accelerometers, and radio-frequency (RF) values provided by RF detectors.

10. The method of claim 7 wherein the one or more apps comprise program code to evaluate the environmental values and/or event data associated with the environmental values to determine whether the product shipped with the IoT device has been compromised.

11. The method of claim 10 wherein determining whether the product shipped with the IoT device has been compromised comprises determining whether one or more of the environmental values are outside of one or more corresponding environmental ranges for a period of time.

12. The method of claim 7 wherein the IoT device is to connect to the IoT service by establishing a local wireless connection to the one or more client devices connected to the IoT service.

13. A system comprising:
an Internet of Things (IoT) device comprising:
one or more sensors to measure environmental conditions during transport of the IoT device from an origin location to a destination location,
a sensor interface coupled to the one or more sensors to convert environmental values associated with the environmental conditions from a first measurement unit in which the environmental values are measured by the one or more sensors to a second measurement unit used by a monitoring application, and to communicate the environmental values in the second measurement unit to the monitoring application,
a storage device to store monitor application program code,
a processor coupled to the sensor interface and storage device, the processor to process the monitor application program code to perform operations of the monitoring application based on the environmental values, the operations including determining whether one or more of the environmental values are outside of one or more corresponding value ranges for at least a specified period of time and recording one or more events as event data on the storage device to indicate that the one or more of the environmental values are outside of the one or more corresponding value ranges for at least the specified period of time, and determining that a first plurality of environmental values is outside of a first corresponding value range and responsively calculating and recording an average differential between the first plurality of the environmental values and the first corresponding value range in the storage device as additional event data, wherein the environmental values, the event data, and the additional event data are securely stored in the storage device to prevent tampering, and a wireless communication interface coupled to the processor;
an Internet of Things (IoT) service to receive transmissions from the IoT device at the destination location and/or one or more intermediate locations between the origin location and the destination location;
wherein the wireless communication interface is to transmit the environmental values, the event data associated with the environmental values, and/or the additional event data to the IoT service; and
wherein the IoT service is to provide the environmental values and event data associated with the environmental values to one or more apps running on one or more client devices, the one or more apps associated with one or more accounts on the IoT service.

14. The system of claim 13 wherein the event data is to further include temporal data indicating an amount of time that the one or more environmental values are outside of the corresponding value ranges.

15. The system of claim 13 wherein the environmental values comprise one or more of: temperature values provided by temperature sensors, humidity values provided by humidity sensors, vibration or mechanical shock values provided by accelerometers, and radio-frequency (RF) values provided by RF detectors.

16. The system of claim 13 wherein the one or more apps comprise program code to evaluate the environmental values and/or event data associated with the environmental values to determine whether a product shipped with the IoT device has been exposed to harmful environmental conditions during transport.

17. The system of claim 16 wherein determining whether the product shipped with the IoT device has been exposed to harmful environmental conditions comprises determining whether one or more of the environmental values are outside of one or more corresponding value ranges for a period of time.

18. The system of claim 13 wherein the wireless communication interface is to connect to the IoT service by establishing a local wireless connection to the one or more client devices connected to the IoT service.

19. The IOT device of claim 1 wherein the additional operations further include determining a maximum and/or a minimum value of the one or more of the environmental values.

20. The IOT device of claim 4 wherein responsive to a determination that the product shipped with the IoT device has been exposed to harmful environmental conditions during transport, the transport of the product from the origin location to the destination location is aborted.

21. The IOT device of claim 1 wherein the IoT service is to integrate and format the environmental values and event data into standard forms required for governmental or regulatory checks.

22. The IOT device of claim 1 wherein the one or more apps running on the one or more client devices are to automatically establish a respective wireless connection with the IoT device when the IoT device is registered to the one or more accounts on the IoT service associated with the one or more apps.

* * * * *